(12) United States Patent
Zhou et al.

(10) Patent No.: US 9,929,851 B2
(45) Date of Patent: Mar. 27, 2018

(54) SYSTEM AND METHODS FOR FULL DUPLEX COMMUNICATION OVER A WIRELESS NETWORK

(71) Applicant: QUALCOMM Incorporated, San Diego, CA (US)

(72) Inventors: Yan Zhou, San Diego, CA (US); Gwendolyn Denise Barriac, Encinitas, CA (US); Simone Merlin, Solana Beach, CA (US); Carlos Horacio Aldana, Mountain View, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 50 days.

(21) Appl. No.: 14/487,082

(22) Filed: Sep. 15, 2014

(65) Prior Publication Data
US 2015/0078215 A1 Mar. 19, 2015

Related U.S. Application Data

(60) Provisional application No. 61/878,567, filed on Sep. 16, 2013.

(51) Int. Cl.
*H04W 4/12* (2009.01)
*H04L 5/14* (2006.01)
*H04L 5/00* (2006.01)
*H04L 12/801* (2013.01)

(52) U.S. Cl.
CPC ............... *H04L 5/14* (2013.01); *H04L 5/003* (2013.01); *H04L 47/14* (2013.01); *H04W 4/12* (2013.01)

(58) Field of Classification Search
CPC ..... H04W 40/28; H04W 84/047; H04W 4/08; H04L 5/003
See application file for complete search history.

(56) References Cited

U.S. PATENT DOCUMENTS

2007/0268848 A1* 11/2007 Khandekar .......... H04B 7/2656
370/295
2009/0190536 A1* 7/2009 Zhang ................ H04B 7/15592
370/329

(Continued)

OTHER PUBLICATIONS

International Search Report and Written Opinion—PCT/US2014/055853—ISA/EPO—Dec. 18, 2014.

*Primary Examiner* — Khaled Kassim
*Assistant Examiner* — Syed S Ali
(74) *Attorney, Agent, or Firm* — Knobbe, Martens, Olson & Bear LLP

(57) ABSTRACT

Systems, methods, and apparatuses for full duplex communication on a wireless network are disclosed. In one aspect, one or more lists of non-effecting nodes are determined for one or more devices on the wireless network. A list of non-effecting nodes for a device identifies other network nodes or devices whose transmissions do not cause substantial interference with the device. When a full duplex communication is scheduled on the wireless network, a downlink message transmitted to the device may be performed concurrently with an uplink transmission from one of the non-effecting devices. This full duplex communication may be possible even if the device does not inherently support full-duplex communication on the wireless network.

28 Claims, 29 Drawing Sheets

(56) References Cited

U.S. PATENT DOCUMENTS

| | | | | |
|---|---|---|---|---|
| 2009/0325480 A1* | 12/2009 | Ji | ........................ | H04B 7/022 |
| | | | | 455/8 |
| 2012/0051335 A1* | 3/2012 | Kimura | ................ | H04L 1/0006 |
| | | | | 370/336 |
| 2013/0021954 A1* | 1/2013 | Montojo | .................. | H04L 5/14 |
| | | | | 370/295 |
| 2013/0137441 A1* | 5/2013 | Kruglick | ................ | H04B 7/155 |
| | | | | 455/445 |
| 2014/0004865 A1* | 1/2014 | Bhargava | .......... | H04W 74/0816 |
| | | | | 455/445 |
| 2014/0092816 A1* | 4/2014 | Ito | ........................ | H04W 72/12 |
| | | | | 370/329 |
| 2014/0301246 A1* | 10/2014 | Mathur | ............ | H04M 3/42221 |
| | | | | 370/259 |
| 2015/0016309 A1* | 1/2015 | Fang | ........................ | H04L 5/14 |
| | | | | 370/277 |
| 2015/0049679 A1* | 2/2015 | Homchaudhuri | ..... | H04W 64/00 |
| | | | | 370/329 |
| 2015/0333894 A1* | 11/2015 | Wang | .................. | H04L 5/0073 |
| | | | | 370/329 |
| 2015/0373589 A1* | 12/2015 | Kwon | .................. | H04W 28/16 |
| | | | | 370/315 |
| 2016/0007272 A1* | 1/2016 | McCann | ............... | H04W 4/001 |
| | | | | 370/254 |
| 2016/0112161 A1* | 4/2016 | Li | ........................ | H04W 28/26 |
| | | | | 370/277 |
| 2016/0295275 A1* | 10/2016 | Cholas | ............... | H04N 7/17318 |
| 2017/0078076 A1* | 3/2017 | Fang | ........................ | H04L 5/14 |
| 2017/0078400 A1* | 3/2017 | Binder | .................... | H04L 67/12 |
| 2017/0331899 A1* | 11/2017 | Binder | .................... | H04L 67/12 |
| 2017/0367147 A1* | 12/2017 | Kwon | .................. | H04W 88/04 |

* cited by examiner

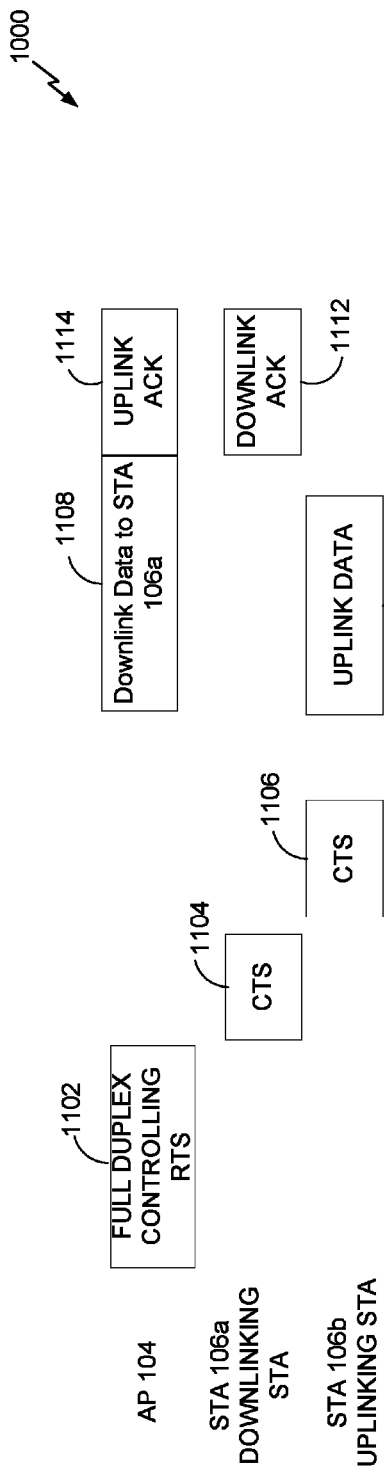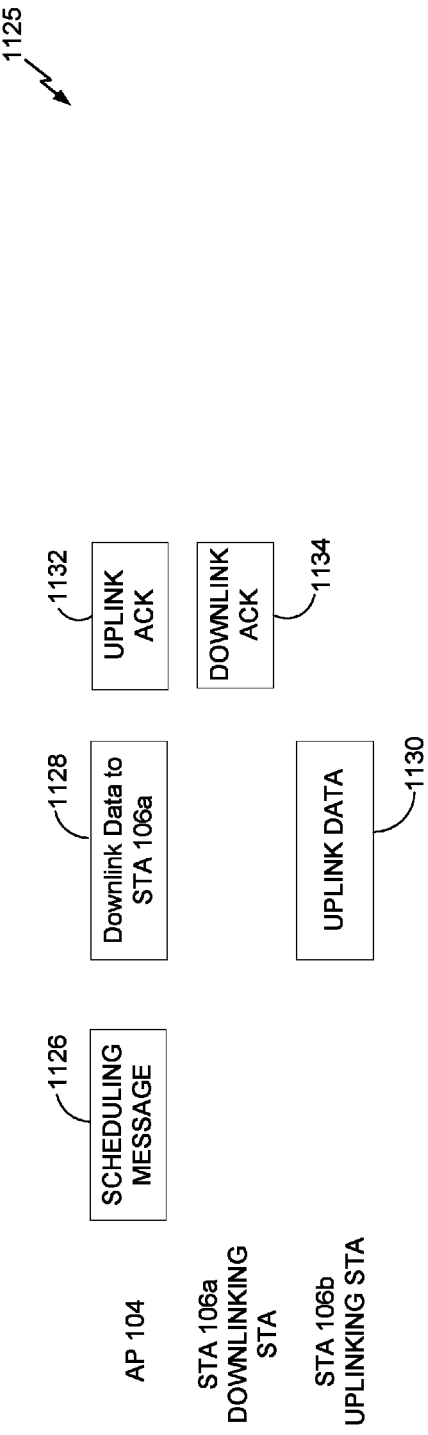

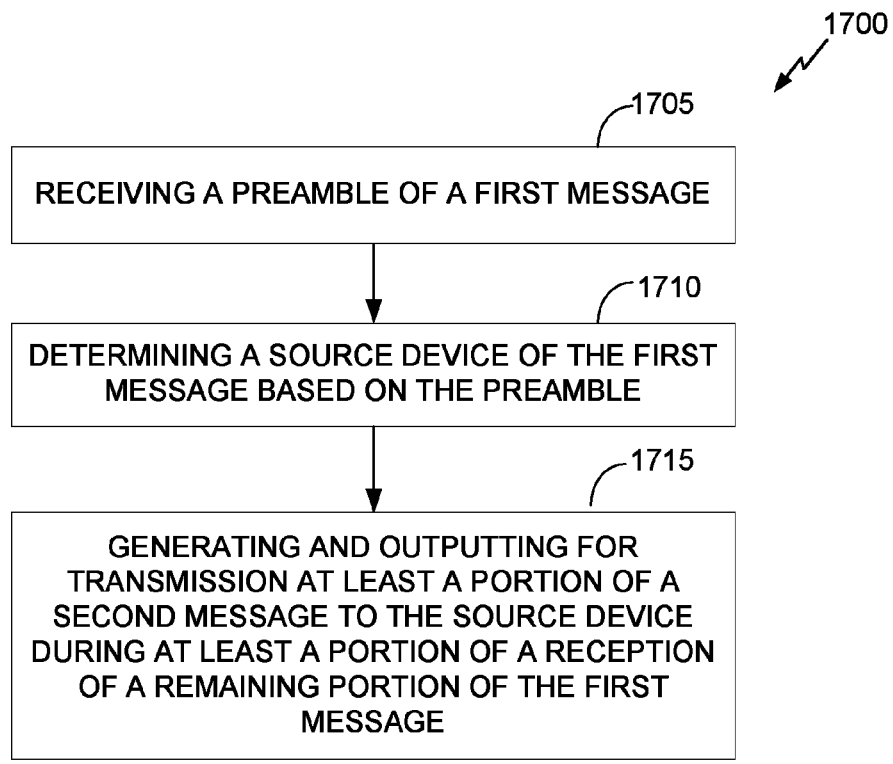

SYSTEM AND METHODS FOR FULL DUPLEX COMMUNICATION OVER A WIRELESS NETWORK

CROSS REFERENCE TO RELATED APPLICATIONS

This application claims the benefit of U.S. Provisional Application No. 61/878,567, filed Sep. 16, 2013, and entitled "SYSTEMS AND METHODS FOR FULL DUPLEX COMMUNICATION OVER A WIRELESS NETWORK" and assigned to the assignee hereof. The disclosure of this prior application is considered part of this application, and is hereby incorporated by reference in its entirety.

BACKGROUND

Field

The present application relates generally to wireless communications, and more specifically to systems, methods, and devices for full duplex communication on a wireless network.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

The use of Wi-Fi networks in conjunction with cellular networks has provided additional capabilities for wireless users. Wi-Fi networks can offer more cost effective communication when they are available. Additionally, in some environments, the throughput and bandwidth of Wi-Fi networks may exceed that of available cellular networks. However, Wi-Fi networks have traditionally employed carrier sense media access (CSMA) to arbitrate use of a wireless medium between competing devices. CSMA has traditionally enabled one transmission to occur at a time on the wireless medium. Because only one device may transmit during a particular period of time, the throughput of Wi-Fi networks has been limited. Therefore, methods and systems for improved Wi-Fi throughput would be advantageous.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include improved communications between access points and stations in a wireless network.

One aspect of this disclosure provides a method of wireless communication. In one aspect, the method includes: generating a first message to a destination device, transmitting the first message to the destination device, and receiving at least a portion of a second message from a source device at least partially concurrently with the transmission of the first message.

Another aspect discloses is an apparatus for wireless communication. The apparatus includes a processing system configured to generate a first message for transmission to a destination device and receive at least a portion of a second message from a source device at least partially concurrently with the transmission of the first message, and an interface for outputting the first message for transmission to the destination device.

Another aspect disclosed is an apparatus for wireless communication. The apparatus includes means for generating a first message to a destination device, means for transmitting the first message to the destination device, and means for receiving at least a portion of a second message from a source device at least partially concurrently with the transmission of the first message.

Another aspect disclosed is a wireless node. The wireless node includes at least one antenna, and a processing system configured to generate a first message to a destination device and transmit the first message to the destination device at least partially concurrently with receiving at least a portion of a second message from a source device.

BRIEF DESCRIPTION OF THE DRAWINGS

FIG. 11A illustrates a full duplex message exchange in one exemplary embodiment.

FIG. 11B illustrates a full duplex message exchange in one exemplary embodiment.

FIG. 17A is a flowchart of one exemplary method of wireless communication.

FIG. 17B is a functional block diagram of an exemplary wireless device that may be employed within one or more of the disclosed wireless communication systems.

DETAILED DESCRIPTION

Figure 1:
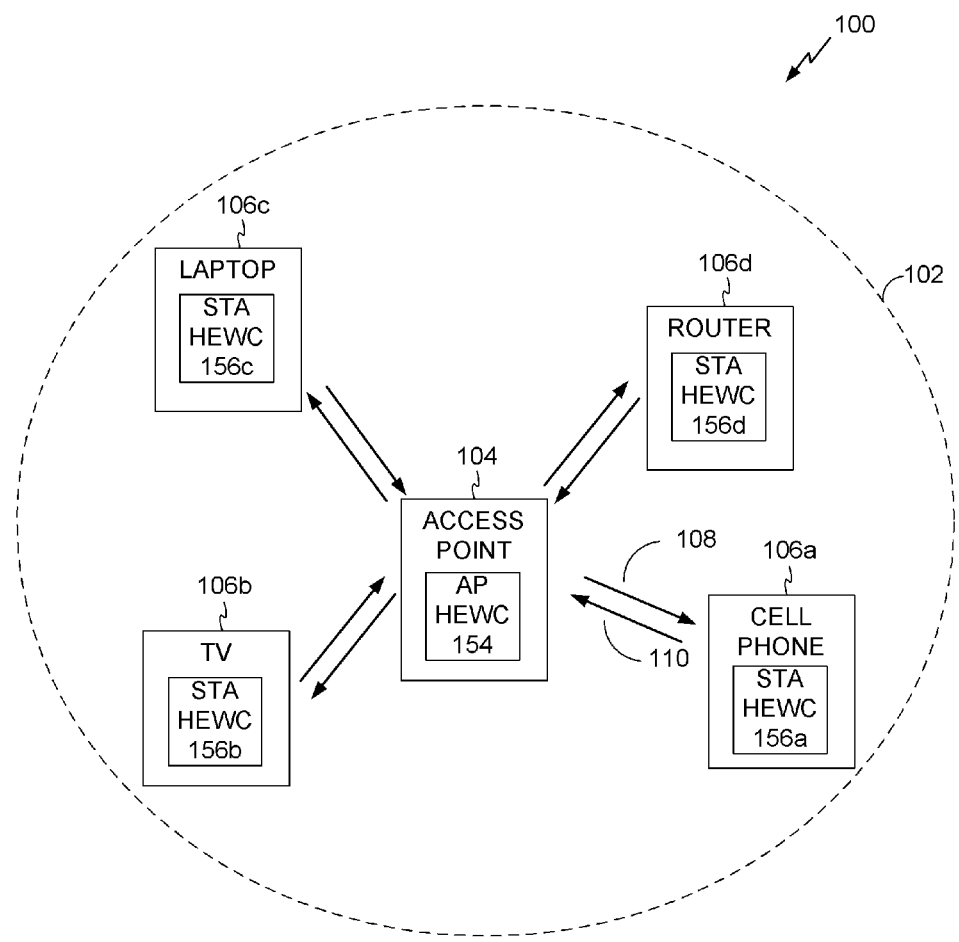
FIG. 1 shows an exemplary wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to a high-efficiency 802.11 protocol using orthogonal frequency-division multiplexing (OFDM), direct-sequence spread spectrum (DSSS) communications, a combination of OFDM and DSSS communications, or other schemes. Implementations of the high-efficiency 802.11 protocol may be used for Internet access, sensors, metering, smart grid networks, or other wireless applications. Advantageously, aspects of certain devices implementing the high-efficiency 802.11 protocol using the techniques disclosed herein may include allowing for increased peer-to-peer services (e.g., Miracast, Wi-Fi Direct Services, Social Wi-Fi, etc.) in the same area, supporting increased per-user minimum throughput requirements, supporting more users, providing improved outdoor coverage and robustness, and/or consuming less power than devices implementing other wireless protocols.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a Wi-Fi (e.g., IEEE 802.11 protocol) compliant wireless link to obtain general connectivity to the Internet or to other wide area networks. In some implementations an STA may also be used as an AP. In some implementations an STA may also be used as an AP. A STA or an AP may be referred to as a node or a wireless node in a wireless communications network. A STA or an AP may be referred to as a wireless device or an access terminal in a wireless communications network.

In some aspects, the node is a wireless node. Such wireless node may provide, for example, connectivity for or to a network (e.g., a wide area network such as the Internet or a cellular network) via a wired or wireless communication link. The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement a high-efficiency 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications. Although various systems, methods, and apparatuses are described herein with respect to a high-efficiency 802.11 standard, for example, a person having ordinary skill in the art will appreciate that the present disclosure is applicable to other wireless communication standards such as, for example, 802.11 ah.

FIG. 1 shows an exemplary wireless communication system 100 in which aspects of the present disclosure may be employed. The wireless communication system 100 may operate pursuant to a wireless standard, for example a high-efficiency 802.11 standard. The wireless communication system 100 may include an AP 104, which communicates with STAs 106 (referring generally to the STAs 106A-106D).

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with code division multiple access (CDMA) techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

In some aspects, a STA 106 may be required to associate with the AP 104 in order to send communications to and/or receive communications from the AP 104. In one aspect, information for associating is included in a broadcast by the AP 104. To receive such a broadcast, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

In an embodiment, the AP 104 includes an AP high-efficiency wireless component (HEWC) 154. The AP HEWC 154 may perform some or all of the operations described herein to enable communications between the AP 104 and the STAs 106 using the high-efficiency 802.11 protocol. The functionality of the AP HEWC 154 is described in greater detail below with respect to FIGS. 2B, 3, 4, and 5-11.

Alternatively or in addition, the STAs 106 may include a STA HEWC 156. The STA HEWC 156 may perform some or all of the operations described herein to enable communications between the STAs 106 and the AP 104 using the high-efficiency 802.11 protocol. The functionality of the STA HEWC 156 is described in greater detail below with respect to FIGS. 2B, 3, 4, and 5-11.

Figure 2A:
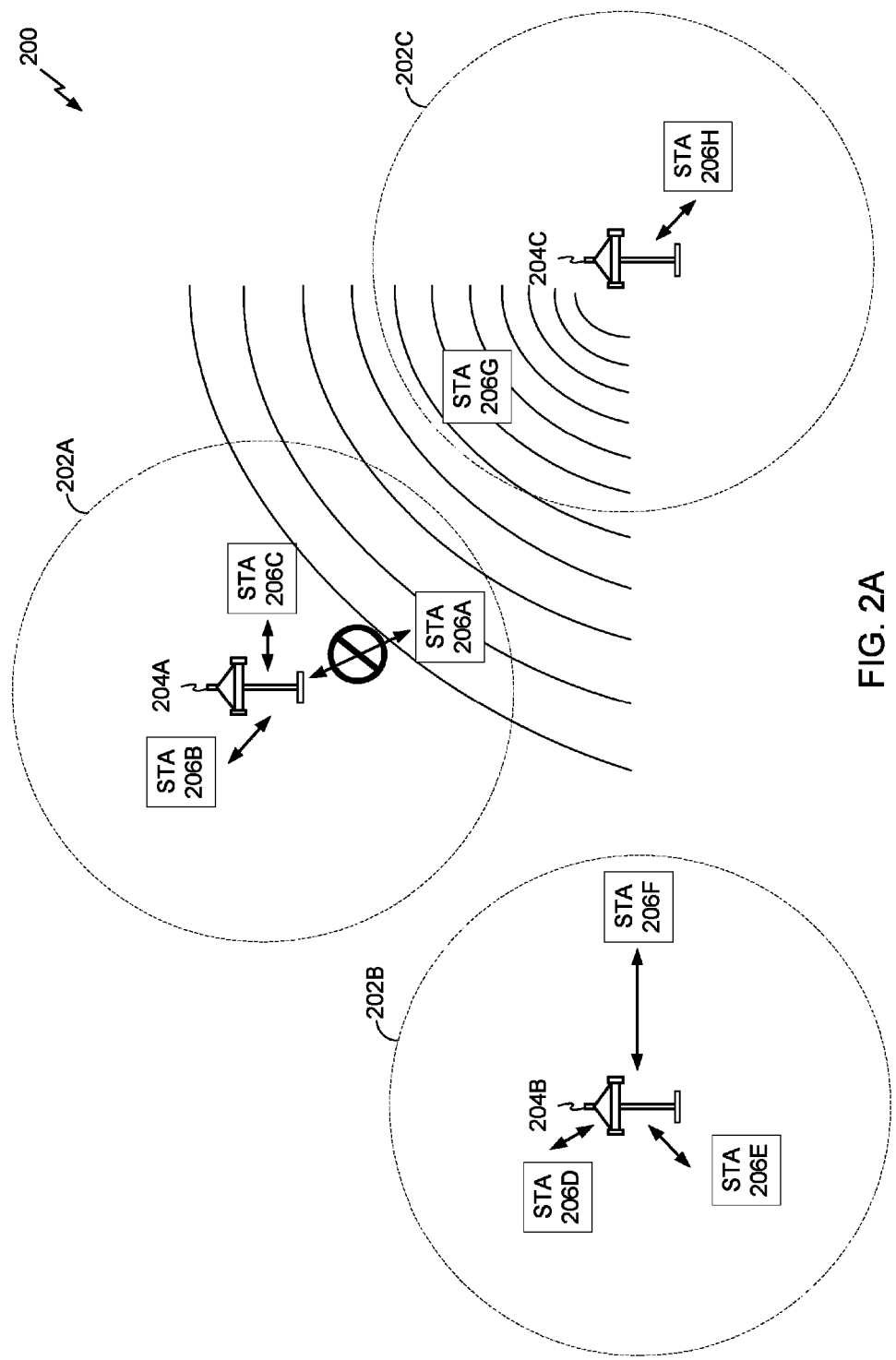
FIG. 2A shows a wireless communication system in which multiple wireless communication networks are present.

In some circumstances, a BSA may be located near other BSAs. For example, FIG. 2A shows a wireless communication system 200 in which multiple wireless communication networks are present. As illustrated in FIG. 2A, BSAs 202A, 202B, and 202C may be physically located near each other. Despite the close proximity of the BSAs 202A-202C, the APs 204A-204C and/or STAs 206A-206H may each communicate using the same spectrum. Thus, if a device in the BSA 202C (e.g., the AP 204C) is transmitting data, devices outside the BSA 202C (e.g., APs 204A-204B or STAs 206A-206F) may sense the communication on the medium.

Generally, wireless networks that use a regular 802.11 protocol (e.g., 802.11a, 802.11b, 802.11g, 802.11n, etc.) operate under a carrier sense multiple access (CSMA) mechanism for medium access. According to CSMA, devices sense the medium and only transmit when the medium is sensed to be idle. Thus, if the APs 204A-204C and/or STAs 206A-206H are operating according to the CSMA mechanism and a device in the BSA 202C (e.g., the AP 204C) is transmitting data, then the APs 204A-204B and/or STAs 206A-206F outside of the BSA 202C may not transmit over the medium even though they are part of a different BSA.

FIG. 2A illustrates such a situation. As illustrated in FIG. 2A, AP 204C is transmitting over the medium. The transmission is sensed by STA 206G, which is in the same BSA 202C as the AP 204C, and by STA 206A, which is in a different BSA than the AP 204C. While the transmission may be addressed to the STA 206G and/or only STAs in the BSA 202C, STA 206A nonetheless may not be able to transmit or receive communications (e.g., to or from the AP 204A) until the AP 204C (and any other device) is no longer transmitting on the medium. Although not shown, the same may apply to STAs 206D-206F in the BSA 202B and/or STAs 206B-206C in the BSA 202A as well (e.g., if the transmission by the AP 204C is stronger such that the other STAs can sense the transmission on the medium).

The use of the CSMA mechanism then creates inefficiencies because some APs or STAs outside of a BSA may be able to transmit data without interfering with a transmission made by an AP or STA in the BSA. As the number of active wireless devices continues to grow, the inefficiencies may begin to significantly affect network latency and throughput. For example, significant network latency issues may appear in apartment buildings, in which each apartment unit may include an access point and associated stations. In fact, each apartment unit may include multiple access points, as a resident may own a wireless router, a video game console with wireless media center capabilities, a television with wireless media center capabilities, a cell phone that can act like a personal hot-spot, and/or the like. Correcting the inefficiencies of the CSMA mechanism may then be vital to avoid latency and throughput issues and overall user dissatisfaction.

Such latency and throughput issues may not even be confined to residential areas. For example, multiple access points may be located in airports, subway stations, and/or other densely-populated public spaces. Currently, Wi-Fi access may be offered in these public spaces, but for a fee. If the inefficiencies created by the CSMA mechanism are not corrected, then operators of the wireless networks may lose customers as the fees and lower quality of service begin to outweigh any benefits.

Accordingly, the high-efficiency 802.11 protocol described herein may allow for devices to operate under a modified mechanism that minimizes these inefficiencies and increases network throughput. Such a mechanism is described below with respect to FIGS. 2B, 3, and 4. Additional aspects of the high-efficiency 802.11 protocol are described below with respect to FIGS. 5-11.

Figure 2B:
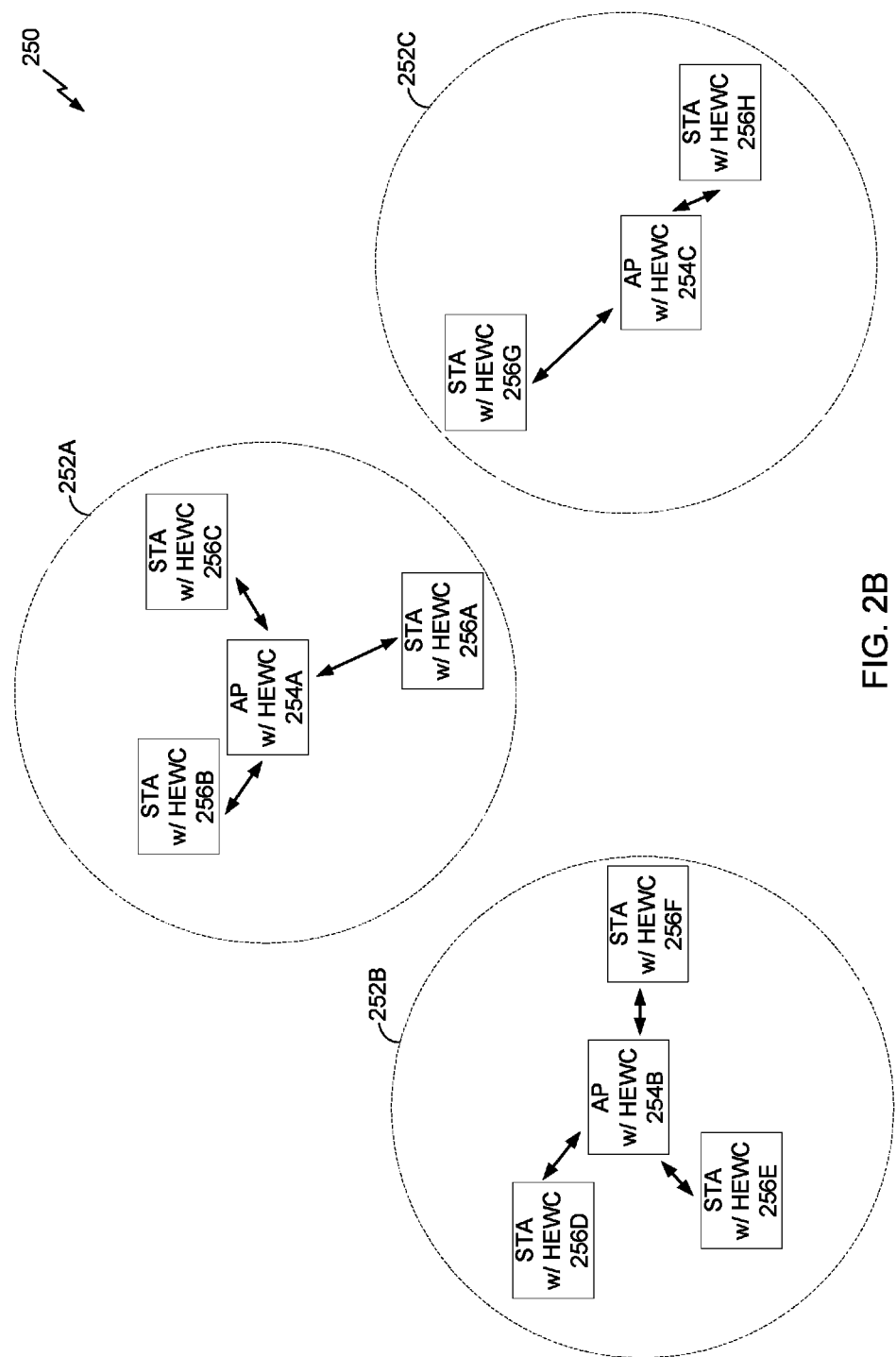
FIG. 2B shows a wireless communication system in which multiple wireless communication networks are present.

FIG. 2B shows a wireless communication system 250 in which multiple wireless communication networks are present. Unlike the wireless communication system 200 of FIG. 2A, the wireless communication system 250 may operate pursuant to the high-efficiency 802.11 standard discussed herein. The wireless communication system 250 may include an AP 254A, an AP 254B, and an AP 254C. The AP 254A may communicate with STAs 256A-256C, the AP 254B may communicate with STAs 256D-256F, and the AP 254C may communicate with STAs 256G-256H.

A variety of processes and methods may be used for transmissions in the wireless communication system 250 between the APs 254A-254C and the STAs 256A-256H. For example, signals may be sent and received between the APs 254A-254C and the STAs 256A-256H in accordance with OFDM/OFDMA techniques or CDMA techniques.

The AP 254A may act as a base station and provide wireless communication coverage in a BSA 252A. The AP 254B may act as a base station and provide wireless communication coverage in a BSA 252B. The AP 254C may act as a base station and provide wireless communication coverage in a BSA 252C. It should be noted that each BSA 252A, 252B, and/or 252C may not have a central AP 254A, 254B, or 254C, but rather may allow for peer-to-peer communications between one or more of the STAs 256A-256H. Accordingly, the functions of the AP 254A-254C described herein may alternatively be performed by one or more of the STAs 256A-256H.

In an embodiment, the APs 254A-254C and/or STAs 256A-256H include a high-efficiency wireless component. As described herein, the high-efficiency wireless component may enable communications between the APs and STAs using the high-efficiency 802.11 protocol. In particular, the high-efficiency wireless component may enable the APs 254A-254C and/or STAs 256A-256H to use a modified mechanism that minimizes the inefficiencies of the CSMA mechanism (e.g., enables concurrent communications over the medium in situations in which interference would not occur). The high-efficiency wireless component is described in greater detail below with respect to FIG. 4.

As illustrated in FIG. 2B, the BSAs 252A-252C are physically located near each other. When, for example, AP 254A and STA 256B are communicating with each other, the communication may be sensed by other devices in BSAs 252B-252C. However, the communication may only interfere with certain devices, such as STA 256F and/or STA 256G. Under CSMA, AP 254B would not be allowed to communicate with STA 256E even though such communication would not interfere with the communication between AP 254A and STA 256B. Thus, the high-efficiency 802.11 protocol operates under a modified mechanism that differentiates between devices that can communicate concurrently and devices that cannot communicate concurrently. Such classification of devices may be performed by the high-efficiency wireless component in the APs 254A-254C and/or the STAs 256A-256H.

In an embodiment, the determination of whether a device can communicate concurrently with other devices is based on a location of the device. For example, a STA that is located near an edge of the BSA may be in a state or condition such that the STA cannot communicate concurrently with other devices. As illustrated in FIG. 2B, STAs 206A, 206F, and 206G may be devices that are in a state or condition in which they cannot communicate concurrently with other devices. Likewise, a STA that is located near the center of the BSA may be in a station or condition such that the STA can communicate with other devices. As illustrated in FIG. 2, STAs 206B, 206C, 206D, 206E, and 206H may be devices that are in a state or condition in which they can communicate concurrently with other devices. Note that the classification of devices is not permanent. Devices may transition between being in a state or condition such that they can communicate concurrently and being in a state or condition such that they cannot communicate concurrently (e.g., devices may change states or conditions when in motion, when associating with a new AP, when disassociating, etc.).

Furthermore, devices may be configured to behave differently based on whether they are ones that are or are not in a state or condition to communicate concurrently with other devices. For example, devices that are in a state or condition such that they can communicate concurrently may communicate within the same spectrum. However, devices that are in a state or condition such that they cannot communicate concurrently may employ certain techniques, such as spatial multiplexing or frequency domain multiplexing, in order to communicate over the medium. The controlling of the behavior of the devices may be performed by the high-efficiency wireless component in the APs 254A-254C and/or the STAs 256A-256H.

In an embodiment, devices that are in a state or condition such that they cannot communicate concurrently use spatial multiplexing techniques to communicate over the medium. For example, power and/or other information may be embedded within the preamble of a packet transmitted by another device. A device in a state or condition such that the device cannot communicate concurrently may analyze the preamble when the packet is sensed on the medium and decide whether or not to transmit based on a set of rules.

Figure 3:
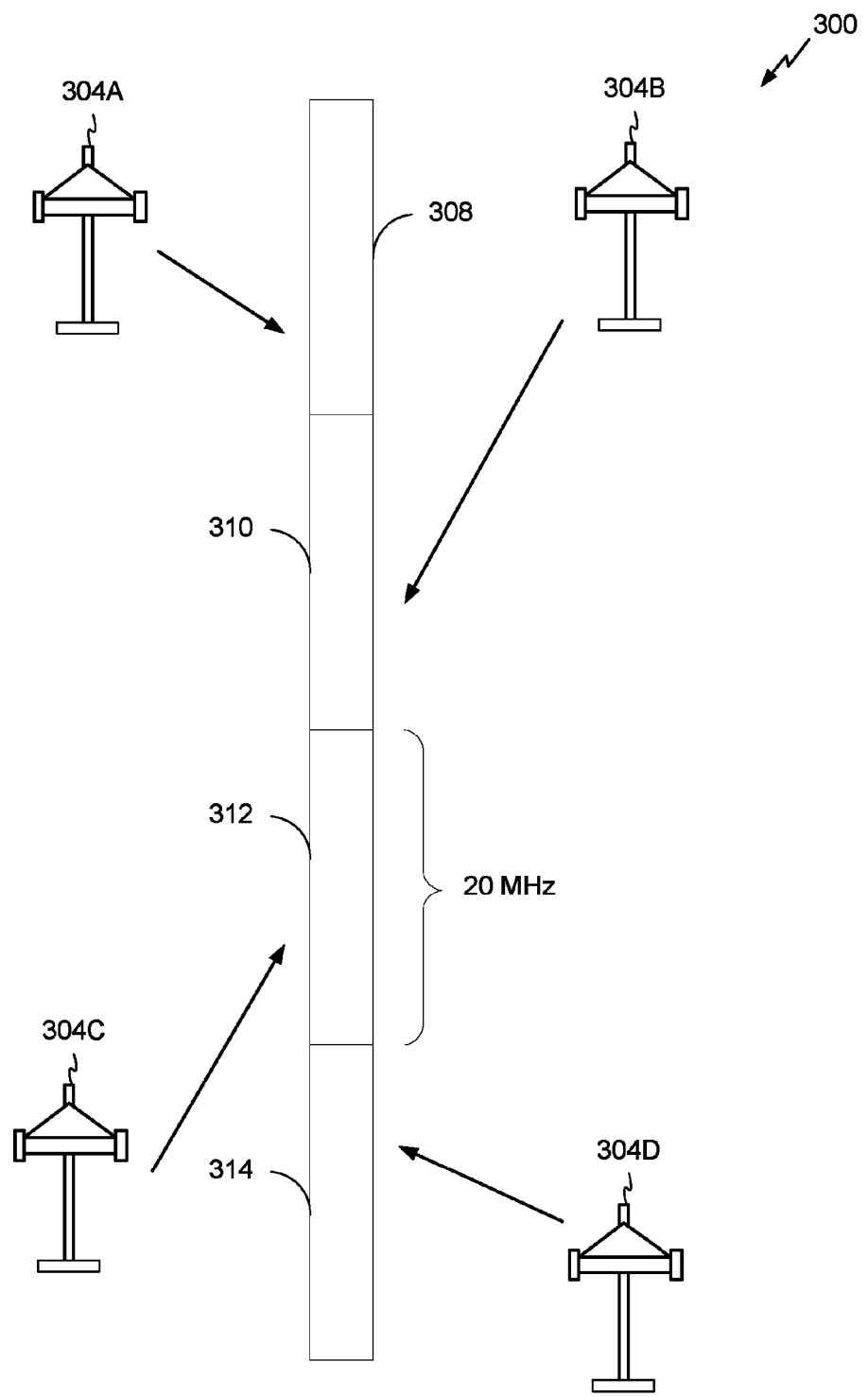
FIG. 3 shows frequency multiplexing techniques that may be employed within the wireless communication systems of FIG. 1, FIG. 2A, or FIG. 2B.

In another embodiment, devices that are in a state or condition such that they cannot communicate concurrently use frequency domain multiplexing techniques to communicate over the medium. FIG. 3 shows frequency multiplexing techniques that may be employed within the wireless communication systems 100 of FIG. 1 and 250 of FIG. 2B. As illustrated in FIG. 3, an AP 304A, 304B, 304C, and 304D may be present within a wireless communication system 300. Each of the APs 304A, 304B, 304C, and 304D may be associated with a different BSA and include the high-efficiency wireless component described herein.

As an example, the bandwidth of the communication medium may be 80 MHz. Under the regular 802.11 protocol, each of the APs 304A, 304B, 304C, and 304D and the STAs associated with each respective AP attempt to communicate using the entire bandwidth, which can reduce throughput. However, under the high-efficiency 802.11 protocol using frequency domain multiplexing, the bandwidth may be divided into four 20 MHz segments 308, 310, 312, and 314 (e.g., channels), as illustrated in FIG. 3. The AP 304A may be associated with segment 308, the AP 304B may be associated with segment 310, the AP 304C may be associated with segment 312, and the AP 304D may be associated with segment 314.

In an embodiment, when the APs 304A-304D and the STAs that are in a state or condition such that the STAs can communicate concurrently with other devices (e.g., STAs near the center of the BSA) are communicating with each other, then each AP 304A-304D and each of these STAs may communicate using a portion of or the entire 80 MHz medium. However, when the APs 304A-304D and the STAs that are in a state or condition such that the STAs cannot communicate concurrently with other devices (e.g., STAs near the edge of the BSA) are communicating with each other, then AP 304A and its STAs communicate using 20 MHz segment 308, AP 304B and its STAs communicate using 20 MHz segment 310, AP 304C and its STAs communicate using 20 MHz segment 312, and AP 304D and its STAs communicate using 20 MHz segment 314. Because the segments 308, 310, 312, and 314 are different portions of the communication medium, a first transmission using a first segment would not interfere with a second transmission using a second segment.

Thus, APs and/or STAs, even those that are in a state or condition such that they cannot communicate concurrently with other devices that include the high-efficiency wireless component can communicate concurrently with other APs and STAs without interference. Accordingly, the throughput of the wireless communication system 300 may be increased. In the case of apartment buildings or densely-populated public spaces, APs and/or STAs that use the high-efficiency wireless component may experience reduced latency and increased network throughput even as the number of active wireless devices increases, thereby improving user experience.

Figure 4:
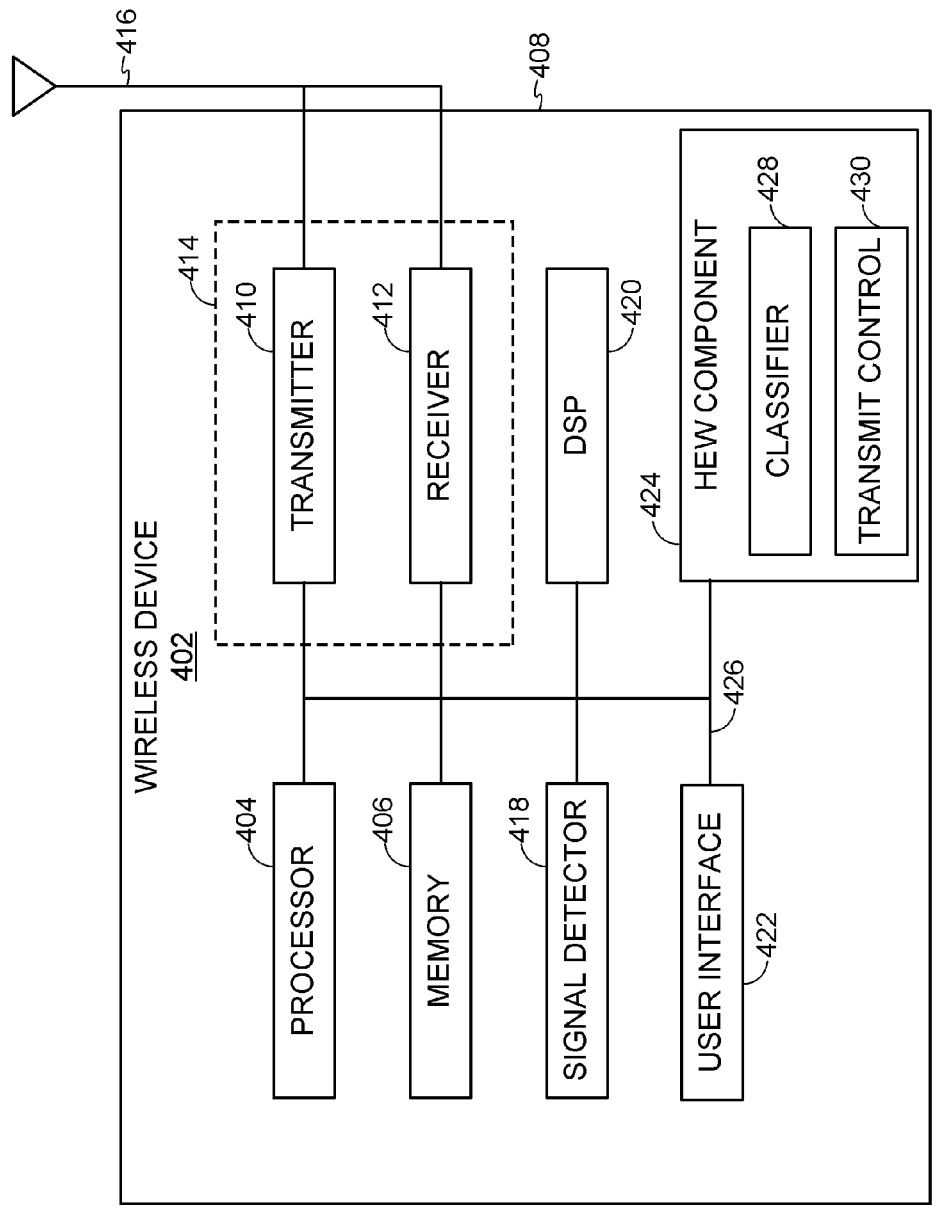
FIG. 4 shows an exemplary functional block diagram of a wireless device 402 that may be employed within the wireless communication systems 100, 200, 250, and/or 300 of FIGS. 1, 2A, 2B, and 3.

FIG. 4 shows an exemplary functional block diagram of a wireless device 402 that may be employed within the wireless communication systems 100, 200, 250, and/or 300 of FIGS. 1, 2A, 2B, and 3. The wireless device 402 is an example of a device that may be configured to implement the various methods described herein. For example, the wireless device 402 may comprise the AP 104, one of the STAs 106, one of the APs 254, one of the STAs 256, and/or one of the APs 304.

The wireless device 402 may include a processor 404 which controls operation of the wireless device 402. The processor 404 may also be referred to as a central processing unit (CPU). Memory 406, which may include both read-only memory (ROM) and random access memory (RAM), may provide instructions and data to the processor 404. A portion of the memory 406 may also include non-volatile random access memory (NVRAM). The processor 404 typically performs logical and arithmetic operations based on program instructions stored within the memory 406. The instructions in the memory 406 may be executable to implement the methods described herein.

The processor 404 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 402 may also include a housing 408 that may include a transmitter 410 and/or a receiver 412 to allow transmission and reception of data between the wireless device 402 and a remote location. The transmitter 410 and receiver 412 may be combined into a transceiver 414. An antenna 416 may be attached to the housing 408 and electrically coupled to the transceiver 414. The wireless device 402 may also include (not shown) multiple transmitters, multiple receivers, multiple transceivers, and/or multiple antennas.

The transmitter 410 can be configured to wirelessly transmit messages, which can be referred to as "paging messages" that are configured to indicate to wireless devices whether or not the wireless devices need to wake up from a doze state and enter an awake state as discussed below. For example, the transmitter 410 can be configured to transmit paging messages generated by the processor 404, discussed above. When the wireless device 402 is implemented or used as a STA 106, the processor 404 can be configured to process paging messages. When the wireless device 402 is implemented or used as an AP 104, the processor 404 can also be configured to generate paging messages.

The receiver 412 can be configured to wirelessly receive paging messages. When the wireless device 402 is implemented or used as a STA 106, the transmitter 410 can be configured to transmit requests for data in response to the paging messages. For example, the wireless device 402 can be configured to transmit a Power-Saving Poll (PS-Poll) as will be described herein with respect to FIG. 4. When the wireless device 402 is implemented or used as an AP 104, the transmitter 410 can be further configured to transmit data to the one or more STAs 106. When the wireless device 402 is implemented or used as a STA 106, the transmitter 410 can be configured to transmit an acknowledgment to the data received from the AP 104.

The wireless device 402 may also include a signal detector 418 that may be used in an effort to detect and quantify the level of signals received by the transceiver 414. The signal detector 418 may detect such signals as total energy, energy per subcarrier per symbol, power spectral density and other signals. The wireless device 402 may also include a digital signal processor (DSP) 420 for use in processing signals. The DSP 420 may be configured to generate a packet for transmission. In some aspects, the packet may comprise a physical layer data unit (PPDU).

The wireless device 402 may further comprise a user interface 422 in some aspects. The user interface 422 may comprise a keypad, a microphone, a speaker, and/or a display. The user interface 422 may include any element or component that conveys information to a user of the wireless device 402 and/or receives input from the user.

The wireless devices 402 may further comprise a high-efficiency wireless component 424 in some aspects. The high-efficiency wireless component 424 may include a classifier unit 428 and a transmit control unit 430. As described herein, the high-efficiency wireless component 424 may enable APs and/or STAs to use a modified mechanism that minimizes the inefficiencies of the CSMA mechanism (e.g., enables concurrent communications over the medium in situations in which interference would not occur).

The modified mechanism may be implemented by the classifier unit 428 and the transmit control unit 430. In an embodiment, the classifier unit 428 determines which devices are in a state or condition such that they can communicate concurrently with other devices and which devices are in a state or condition such that they cannot communicate concurrently with other devices. In an embodiment, the transmit control unit 430 controls the behavior of devices. For example, the transmit control unit 430 may allow certain devices to transmit concurrently on the same medium and allow other devices to transmit using a spatial multiplexing or frequency domain multiplexing technique. The transmit control unit 430 may control the behavior of devices based on the determinations made by the classifier unit 428.

The various components of the wireless device 402 may be coupled together by a bus system 426. The bus system 426 may include a data bus, for example, as well as a power bus, a control signal bus, and a status signal bus in addition to the data bus. Those of skill in the art will appreciate the components of the wireless device 402 may be coupled together or accept or provide inputs to each other using some other mechanism.

Although a number of separate components are illustrated in FIG. 4, those of skill in the art will recognize that one or more of the components may be combined or commonly implemented. For example, the processor 404 may be used to implement not only the functionality described above with respect to the processor 404, but also to implement the functionality described above with respect to the signal detector 418 and/or the DSP 420. Further, each of the components illustrated in FIG. 4 may be implemented using a plurality of separate elements.

The wireless device 402 may comprise an AP 104, a STA 106, an AP 254, a STA 256, and/or an AP 304, and may be used to transmit and/or receive communications. That is, any of AP 104, STA 106, AP 254, STA 256, or AP 304 may serve as transmitter or receiver devices. Certain aspects contemplate signal detector 418 being used by software running on memory 406 and processor 404 to detect the presence of a transmitter or receiver.

Referring again to FIG. 1, the STA 106 can have a plurality of operational modes. For example, the STA 106 can have a first operational mode referred to as an active mode. In the active mode, the STA 106 can always be in an "awake" state and actively transmit/receive data with the AP 104. Further, the STA 106 can have a second operational mode referred to as a power save mode. In the power save mode, the STA 106 can be in the "awake" state or a "doze" or "sleep" state where the STA 106 does not actively transmit/receive data with the AP 104. For example, the receiver 412 and possibly DSP 420 and signal detector 418 of the STA 106 can operate using reduced power consumption in the doze state. Further, in the power save mode, the STA 106 can occasionally enter the awake state to listen to messages from the AP 104 (e.g., paging messages) that indicate to the STA 106 whether or not the STA 106 needs to "wake up" (e.g., enter the awake state) at a certain time so as to be able to transmit/receive data with the AP 104.

Accordingly, in certain wireless communication systems 100, the AP 104 can transmit paging messages to a plurality of STAs 106 in a power save mode in the same network as the AP 104, indicating whether or not there is data buffered at the AP 104 for the STAs 106. The STAs 106 can also use this information to determine whether they need to be in an awake state or a doze state. For example, if an STA 106 determines it is not being paged, it can enter a doze state. Alternatively, if the STA 106 determines it can be paged, the STA 106 can enter an awake state for a certain period of time to receive the page and further determine when to be in an awake state based on the page. Further, the STA 106 can stay in the awake state for a certain period of time after receiving the page. In another example, the STA 106 can be configured to function in other ways when being paged or not being paged that are consistent with this disclosure.

In some aspects, paging messages can include a bitmap (not shown in this figure), such as a traffic identification map (TIM). In certain such aspects, the bitmap can include a number of bits. These paging messages can be sent from the AP 104 to STAs 106 in a beacon or a TIM frame. Each bit in the bitmap can correspond to a particular STA 106 of a plurality of STAs 106, and the value of each bit (e.g., 0 or 1) can indicate the state the corresponding STA 106 should be in (e.g., doze state or awake state) to be able to receive Buffed Units that the AP 104 has for that particular STA. Accordingly, the size of the bitmap can be directly proportional to the number of STAs 106 in the wireless communications system 100. Therefore, a large number of STAs 106 in the wireless communications system 100 can result in a large bitmap.

In some aspects, STAs 106 that sleep for a long time may not wake up to read any TIM messages. For example, a STA 106 can decide to sleep through one or more TIM messages in an extended sleep mode. In this case, the STA 106 can advertise to the AP 104 that the STA 106 may not read any TIM messages. Accordingly, the AP 104 may not include the corresponding identifiers in the TIM message. In various aspects, the STAs 106 may notify the AP 104 that they may not wake up for one or more TIM messages (i.e., that they are operating in the aforementioned power saving mode) using a control message, or immediately during association.

For STAs 106 that have notified the AP 104 in this manner, the AP 104 may not include identifiers in the TIM message, even if it has BUs intended for them. STAs 106 can claim their BUs by sending a PS-Poll at any time to the AP 104. In an embodiment, AP 104 can immediately send the buffered unit (BU) in response to the PS-Poll. In another embodiment, the AP 104 can respond to the PS-Poll with an acknowledgment (ACK), and deliver the BU at a later time. In yet another embodiment, the AP 104 may not immediately respond (neither with ACK nor with BU) to a PS-Poll. The AP 104 can instead reply with a Cumulative ACK frame sent after a given scheduled time after the TIM message.

In various aspects, the STA 106 can specify the waiting time to deliver the BU via the PS-Poll (for a dynamic indication), an association request, a probe request, and/or another management frame sent to the AP (for a static indication). In other aspects, the AP 104 can specify the waiting time to deliver the BU via an ACK frame, a TIM element (for a dynamic indication), a beacon, an association response, a probe response, or other management frames sent to the STA 106 (for a static indication). The STA 106 can go to sleep for the waiting time duration. The STA 106 can acknowledge correct reception of the BU by sending an ACK. The STA 106 can then go back to sleep.

Figure 5:
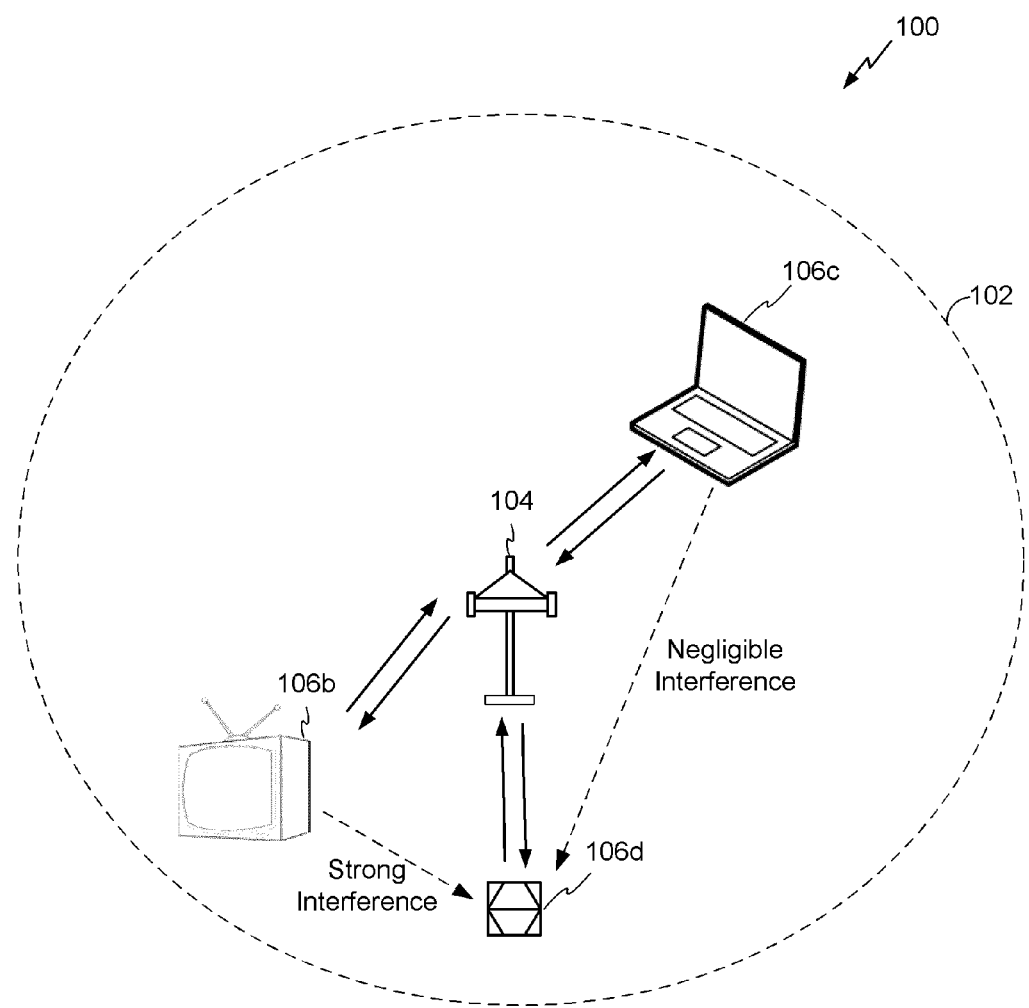
FIG. 5 illustrates a plurality of messages transmitted between an access point and three stations in the wireless communication system 100.

FIG. 5 illustrates a plurality of messages transmitted between an access point and three stations in one or more of the wireless communication systems 100, 200, or 250. FIG. 5 shows three stations, 106b-d. FIG. 5 illustrates that each of the STAs 106b-d transmits and receives messages with the AP 104. Perhaps because of a physical distance between the stations 106b-d, or perhaps based on the transmission power of one or more of the STAs 106b-d, the interference experienced by each of the STAs 106b-d may vary when one of the other STAs 106b-d transmits on the communications network. For example, FIG. 5 shows that STA 106c experiences negligible interference when STA 106d transmits on the communications network. Similarly, STA 106d experiences negligible interference when STA 106c transmits on the communications network.

In contrast, STA 106d experiences strong interference when STA 106b transmits on the communications network.

Generally, interference experienced by a first station when a second station transmits may be based on the strength of the transmitted signal when received by the first station. If the strength of the transmitted signal when received by the first station is above a threshold, some aspects may consider that the second station "interferes" with the first station. Similarly, if the strength of the transmitted signal when received by the first station is equal to or below the threshold, these aspects may consider that the second station does not "interfere" with the first station. The threshold may be set such that if a received signal is below the threshold, other communications may be successfully performed by the first station concurrently with reception of the signal from the second station. A set of "non-interfering" stations may be determined for one or more stations in a communications network. By understanding the set of "non-interfering" stations for a particular or first station, it may be determined which other stations may perform communication on the wireless network concurrently with the first station. For example, a second station may be selected from the set of non-interfering stations, and communications with that selected second station may be performed concurrently with communications with the first station. For example, data may be transmitted to the first station while data is received from the second station. Because the second station does not interfere with the first station, the concurrent communications may not be problematic for the first station, even if the first station does not explicitly support concurrent communications, such as full duplex communications, where two nodes are capable of transmitting to each other at the same time.

Figure 6:
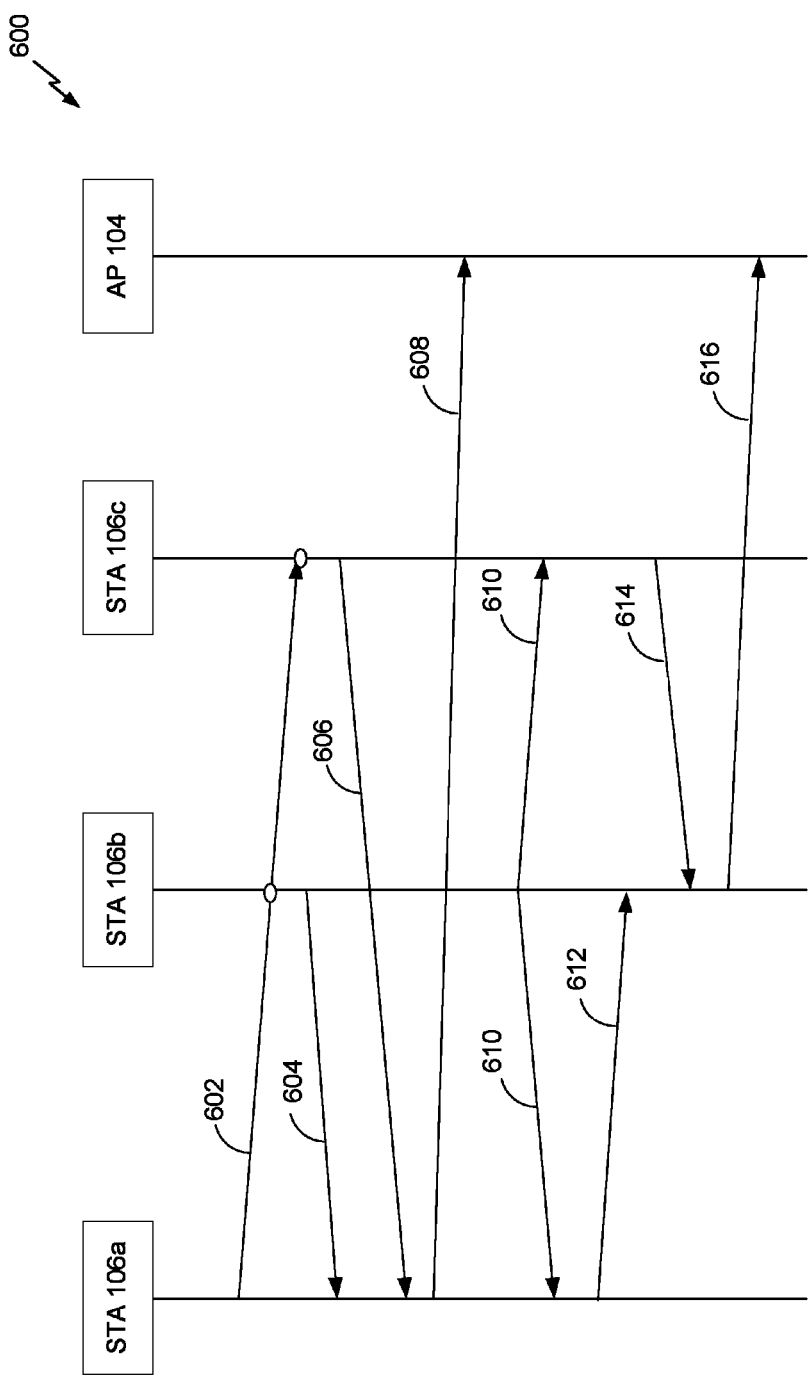
FIG. 6 is a sequence diagram illustrating an exchange of messages between three stations and an access point.

FIG. 6 is a sequence diagram illustrating an exchange of messages between three stations and an access point in one or more of the wireless communication systems 100, 200, or 250. The exchanged messages enable the stations to determine one or more signal strength metrics of transmissions of the other stations. These signal strength metrics may enable determination of a "non-interfering" set of stations corresponding to each other station, as described above. In the illustrated example, the signal strength metrics are transmitted to the access point after they are determined. A list identifying the non-interfering or non-effecting nodes for each station may then be maintained by the AP 104 for use in scheduling full duplex transmissions between the AP 104 and one or more of the STAs 106a-c. A measurement message, such as message 602 or any measurement message discussed herein, may be any wireless message. In some aspects, a measurement message may be a data or management frame. In some aspects, the measurement message may be a message specifically assigned for measurement purposes, while in other aspects, the measurement message may be just another wireless message.

The sequence of messages illustrated in FIG. 6 begins with a measurement message 602 transmitted by the STA 106a. The message 602 is received by the STA 106b and the STA 106c. The measurement message 602 may also be received by other devices (not shown) or the AP 104. The measurement message 602 may be multicast or broadcast. In some other aspects, the measurement message 602 may be unicast to a device other than STAs 106b-c.

Upon receiving the measurement message 602, each of receiving nodes STA 106b-c determines one or more signal strength metrics associated with the received measurement message 602. For example, in some aspects, one or more of the receiving devices 106b-c may determine a received signal strength indication (RSSI) based on the measurement message 602. After determining the signal strength metrics, STA 106*b* transmits a measurement response message 604 to the STA 106*a*. The measurement response message 604 may be transmitted in response to the measurement message 602. The measurement response message 604 may indicate one or more of the signal strength metrics determined by STA 106*b* based on measurement message 602. STA 106*c* also transmits a measurement response message 606 to the node that transmitted the measurement message 602, in this case, STA 106*a*. The measurement response message 606 indicates one or more signal strength metric(s) determined by STA 106*c* based on the received measurement message 602. After collecting signal strength metrics from STAs 106*b-c*, STA 106*a* transmits a metrics data message 608 to the AP, indicating a list of non-effecting nodes for STA 106*a*. For example, in some aspects, the metrics data message 608 may indicate the signal strength metrics collected by STA 106*a* from each of STAs 106*b-c*. Alternatively, STA 106*a* may transmit a list of STAs with signal strength metrics of message 602 that are below a threshold. This list of STAs may represent a list of non-effecting nodes of the STA 106*a*. The AP 104*a* may then use the information provided in the metrics data message 608 when scheduling uplink transmissions from STA 106*a* that will utilize full duplex scheduling.

FIG. 6 next shows STA 106*b* transmitting a measurement message 610. This measurement message is received by at least STA 106*a* and STA 106*c*. AP 104 may also receive the message 610, as well as other devices (not shown). The measurement message 610 may be multicast or broadcast. In some aspects, the measurement message may be a unicast message not addressed to either STA 106*a* or STA 106*c*. Upon receiving the measurement message 610, both stations 106*a* and 106*c* determine one or more signal strength metrics based on the received measurement message 610. After determining the signal strength metrics, each of STAs 106*a* and STA 106*c* transmit measurement response messages 612 and 614 respectively back to STA 106*b*. The measurement response messages 612 and 614 indicate the determined signal strength metrics, similar to as discussed above with respect to measurement response messages 604 and 606. After receiving the signal strength metrics from STAs 106*a* and STA 106*c*, STA 106*b* transmits a metrics data message 616 to AP 104. The message 616 may indicate the signal strength metrics of STAs 106*a* and 106*c*, or may include a list of devices (STAs) with signal strength metrics below a threshold, similar to the metrics data message 608 discussed above. The list of devices or signal strength metrics provided in metrics data message 616 to the AP 104 may enable the AP 104 to determine a list of non-effecting nodes of the STA 106*b*. This information may be used by the AP 104*b* when scheduling uplink transmissions from STA 106*b* using full duplex scheduling.

In some other aspects, upon determining signal strength metrics of the measurement messages 602 and/or 610, one or more of the STAs 106*a-c* may transmit a signal strength indication of the received message(s) 602 and/or 610 directed to the AP 104, instead of back to the STA that initiated transmission of the measurement message 602 or 610. This is shown in FIG. 7.

Figure 7:
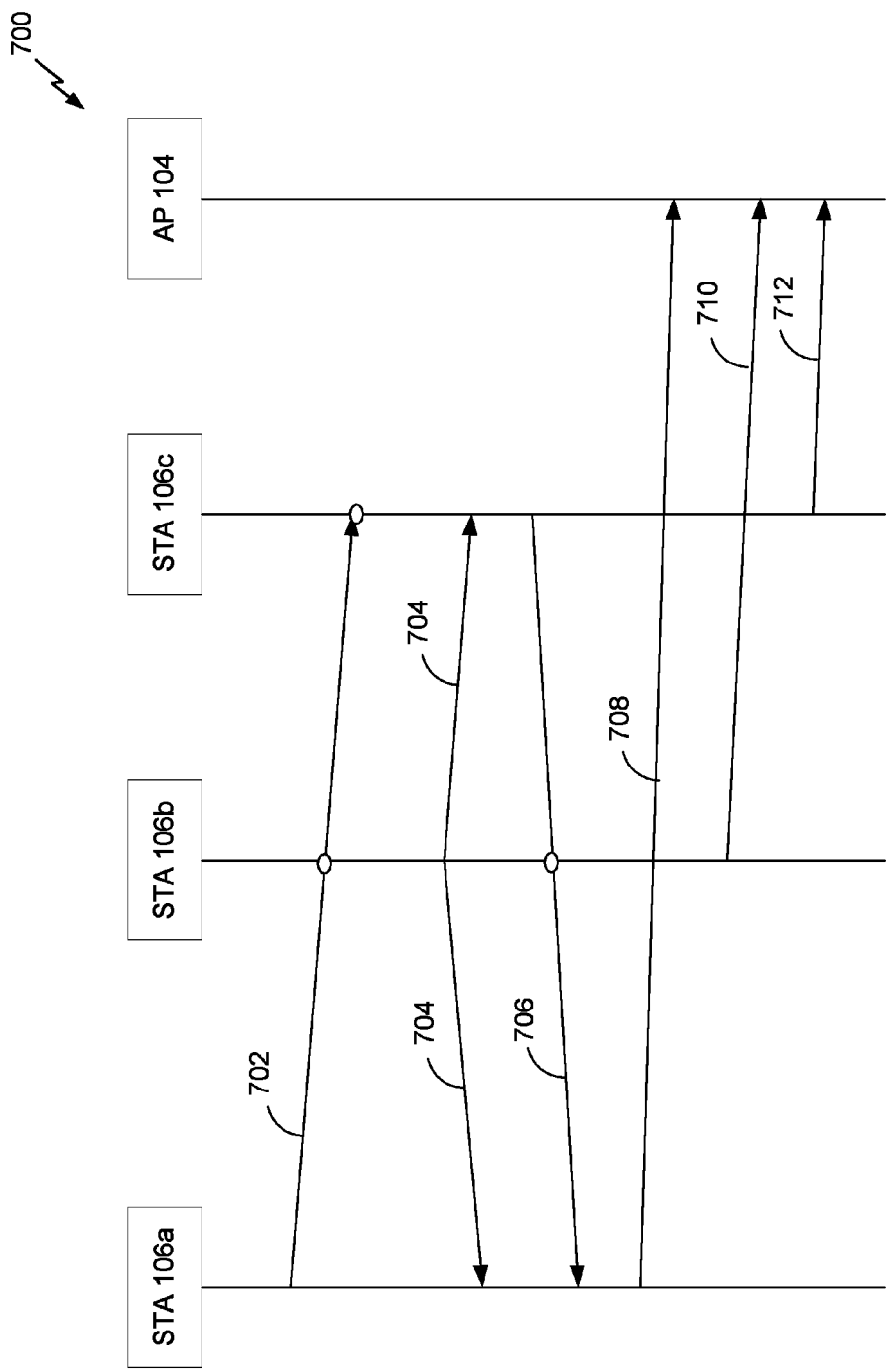
FIG. 7 is a sequence diagram illustrating an exchange of messages between three stations and an access point.

FIG. 7 is a sequence diagram illustrating an exchange of messages between three stations and an access point in one or more of the wireless communication systems 100, 200, or 250. The exchanged messages enable the stations to determine one or more signal strength metrics of the transmissions of the other stations. These signal strength metrics are then transmitted to the access point. In some aspects, this exchange of messages identifies one or more non-affecting nodes for each of the stations 106*a-c*. As described above, a non-affecting (non-interfering) node may be a node (station) that won't interfere with a specific other station's 106 reception of data packets from the AP 104. For example, if a transmission from STA 106A will not affect STA 106B's reception from the AP 104, then STA 106A is a non-affecting node of STA 106B. In some aspects, whether or not a STA 106A is a non-affecting node at STA 106B may be determined by looking at the RSSI of STA 106A at STA 106B. A list identifying the non-affecting nodes for each station may then be maintained by the AP 104 for use in scheduling full duplex transmissions between the AP 104 and one or more of the STAs 106*a-c*.

Message exchange 700 begins with STA 106*a* transmitting a measurement message 702. The measurement message 702 is received by at least the STA 106*b* and the STA 106*c*. Measurement message 702 may also be received by the AP 104 and/or other devices (not shown). The measurement message 702 may be multicast or broadcast. Alternatively, the measurement message may be unicast to a device other than STA 106*b-c* or to one of STA 106*b-c*. Upon receiving the measurement message 702, each of at least STAs 106*b-c* determine one or more signal strength metrics based on the received measurement message 702. For example, in some aspects, the STAs 106*b-c* may determine a received signal strength indication (RSSI) of the measurement message 702.

FIG. 7 next shows STA 106*b* transmitting a measurement message 704, which is received by at least STAs 106*a* and 106*c*. Upon receiving the message 704, each of at least STAs 106*a* and 106*c* determine one or more signal strength metrics based on the received measurement message 704. For example, in some aspects, the STAs 106*a* and 106*c* may determine a received signal strength indication (RSSI) of the measurement message 704.

FIG. 7 next shows STA 106*c* transmitting a measurement message 706, which is received by at least STAs 106*a* and 106*b*. Upon receiving the message 706, each of at least STAs 106*a* and 106*b* determine one or more signal strength metrics based on the received measurement message 706. For example, in some aspects, the STAs 106*a* and 106*b* may determine a received signal strength indication (RSSI) of the measurement message 706.

Next, FIG. 7 shows each of STAs 106*a-c* transmitting a metrics data message 708, 710, and 712 respectively. Each of metrics data messages 708, 710, and 712 may include the signal strength metrics determined by each of STAs 106*a-c* respectively and/or a list of stations that have signal strength metrics determined by each of the STAs 106*a-c* respectively that fall below one or more thresholds. The AP 104 may utilize this information provided in each of metrics data messages 708, 710, and 712 to determine a list of non-affecting nodes for each of STAs 106*a-c* respectively. Note that FIG. 7 differs from FIG. 6 in that each of the STAs 106*a-c* does not transmit the signal strength metrics to other stations, such as a station originating a measurement message upon which a signal strength metric is based, as shown in FIG. 6. Instead, in the message exchange of FIG. 7, the signal strength metrics and/or list of un-affecting nodes is transmitted to the AP 104. Note that in some aspects, the particular order of messages transmitted in FIG. 7 may vary from that shown.

Figure 8:
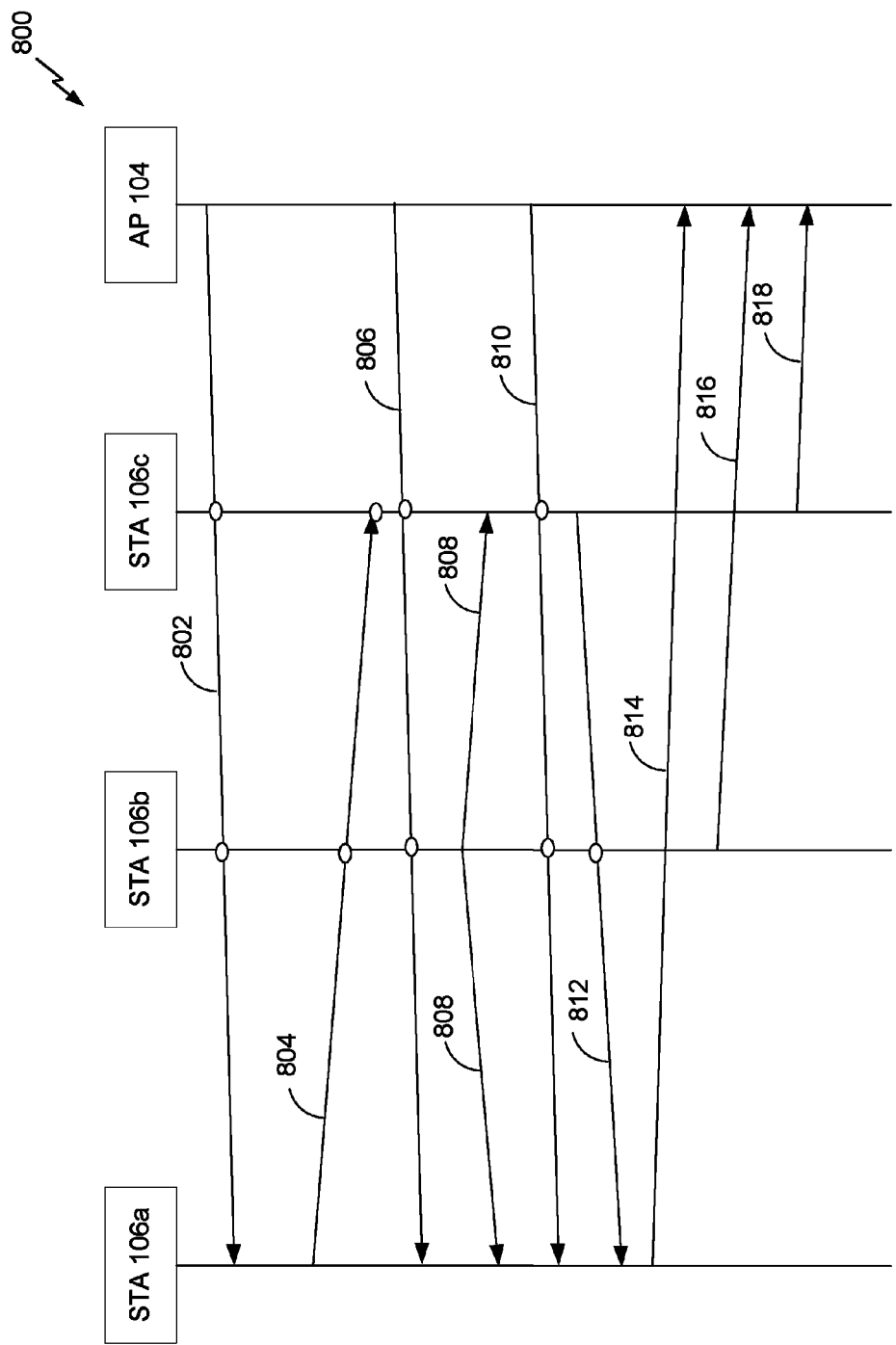
FIG. 8 is a sequence diagram illustrating an exchange of messages between three stations and an access point.

FIG. 8 is a sequence diagram illustrating an exchange of messages between three stations and an access point in one or more of the wireless communication systems 100, 200, and/or 250. The exchanged messages enable the stations to determine one or more signal strength metrics of transmissions of the other stations. These signal strength metrics are then transmitted to the access point. In some aspects, this exchange of messages identifies one or more non-effecting nodes for each of the stations 106a-c. A list identifying the non-effecting nodes for each station may then be maintained by the AP 104 for use in scheduling full duplex transmissions between the AP 104 and one or more of the STAs 106a-c.

Message exchange 800 begins with a command message 802 transmitted by the AP 104. The command message 802 is received by at least the stations 106a-c. In some aspects, the command message 802 may be multicast or broadcast. The command message 802 indicates that station 106a should transmit a measurement message, and other stations receiving the command message 802 should determine one or more signal strength metrics based on the measurement message transmitted by STA 106a. Upon receiving the command message 802, the STA 106a transmits the measurement message 804, which is received by at least the stations 106b-c. Similar to the process described above with respect to FIGS. 6 and 7, upon receiving the measurement message 804, each of STAs 106b-c determine one or more signal strength metrics, such as an RSSI, based on the measurement message 804. The AP then sends a command message 806, which is received by at least STAs 106a-c. The command message 806 indicates STA 106b should transmit a measurement message, and other stations receiving the command message 806 should determine one or more signal strength metrics based on the measurement message transmitted by STA 106b. In response to receiving the command message 806, STA 106b transmits the measurement message 808, which is received by at least STAs 106a and 106c. Upon receiving the measurement message 808, each of at least STAs 106a and 106c determine one or more signal strength metrics based on the received measurement message 808. AP 104 then sends a command message 810, indicating STA 106c should send a measurement message, and other devices receiving command message 810 should perform signal strength measurements based on the measurement message transmitted by STA 106c. Upon receiving the command message 810, STA 106c transmits the measurement message 812, which is received by at least STAs 106a-b. Upon receiving the measurement message 812, each of STAs 106a-b determines one or more signal strength metrics based on the received measurement message 812. At some later time, each of STAs a-c transmits a metrics data message 814, 816, and 818 respectively to the AP 104. The metrics data messages 814, 816, and 818 indicate one or more of the signal strength metrics determined by each of STAs 106a-c respectively during the message exchange 800. Additionally or alternatively, each of the metrics data messages 814, 816, and 818 indicate a list of non-effecting stations based on the message exchange 800. For example, each of the STAs 106a-c may include in the metrics data messages 814, 816, and 818 respectively a list of devices whose signal strength metrics were below (and in some sub-aspects equal to) one or more thresholds. In some other aspects, the list of devices may include only those devices with signal strength metrics above (and in some sub-aspects equal to) one or more thresholds. In some aspects the STAs 106a-c may receive the one or more thresholds from the AP 104.

In some aspects, command messages 802, 806, and 810 are the same message. For example, a single command message may be multicast or broadcast to devices STA 106a-c simultaneously. In some aspects, responses to the common command message may be transmitted on different sub-channels, such that the responses can be set at least partially concurrently. This common command message may, in some aspects, indicate that each of the STA 106a-c should transmit a measurement message on a different sub-channel, such as a different OFDM channel. The assignment of each device to a particular sub-channel may be communicated by the common command message by including a mapping of device identifiers to OFDM channels for a plurality of devices on the wireless network in the command message itself. In the illustrated embodiment, this mapping may include mappings for one or more of STAs 106a-c.

In some aspects, a device receiving a measurement message over a particular sub-channel may determine the origin of the measurement message based on the mapping included in the common command message. In this way, the mapping in the common command message serves two purposes. First, it may be used by transmitters of measurement messages to know which sub-channel they should transmit their measurement messages on. Second, it may be used by receivers of measurement messages to understand from which device a received measurement message originated from.

In some aspects, a non-affecting/non-interfering report may be triggered by an uplink transmission from a STA 106. For example, a STA 106A may send an uplink data packet to the AP 104, which may send a special acknowledgement packet and paging information to STAs 106 with pending downlink data packets. If a STA 106B is paged, then it will respond if STA 106A is a non-affecting/non-interfering STA 106, for example, if the RSSI received before the acknowledgement packet is less than a threshold. Then, the AP 104 may select one of the STAs 106 from all of the STAs 106 that responds and sends out a full duplex schedule. For example, the AP 104 may select the STA 106 with the most buffered downlink data packets.

Figure 9A:
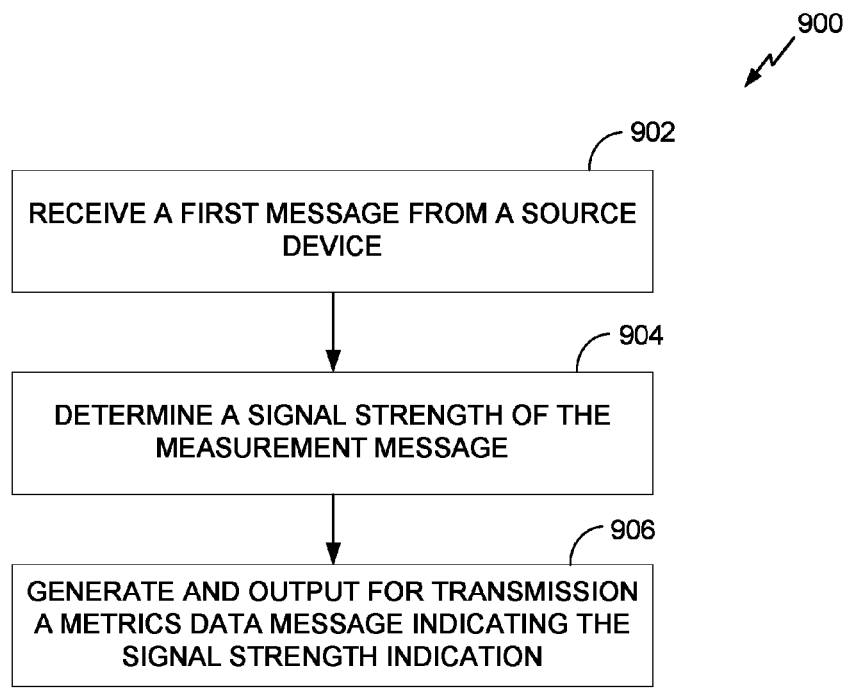
FIG. 9A is a flowchart of one exemplary method of wireless communication.

FIG. 9A is a flowchart of one exemplary method of wireless communication within one or more of the wireless communications systems 100, 200 and/or 250. In some aspects, process 900 may be performed by the wireless device 402, illustrated in FIG. 4. In some aspects, process 900 may enable a station to collect signal strength information on the transmissions of other wireless nodes. By measuring the signal strength of these transmissions, the station may facilitate the determining of a set of "unaffecting" or "non-interfering" stations or nodes for that particular station. When downlink messages are received by a downlinking station, an uplink station may be selected from the set of non-interfering stations or nodes for the downlinking station. Because the uplink station does not interfere with the downlinking station, uplinking and downlinking can be performed simultaneously, even if the downlinking station does not support full duplex transmissions.

In block 902, a measurement message is received from a source device. In some aspects, the measurement message is a data message. In some aspects, the measurement message is a management message. In some aspects, a plurality of measurement messages may be received from a plurality of devices, each measurement message being received on a different sub-carrier. For example, each measurement message may be received on a different OFDM channel.

In some aspects, process 900 also includes receiving a control message indicating a sub-carrier and/or OFDM channel upon which the device performing process 900 should transmit a measurement message. In response, process 900 includes transmitting a measurement message on the indicated sub-carrier in response to receiving the control message.

In some aspects, receipt of the measurement message may be preceded by receipt of a measurement control message. The measurement control message may indicate that the device performing process 900 should measure the signal strength of the measurement message received in block 902. For example, in aspects where the measurement message is just a normal data or management frame, a device performing process 900 may not typically measure the signal strength of the measurement message. However, receipt of the measurement control message may trigger a device performing process 900 to measure the signal strength of the measurement message, as described below with respect to block 904.

In block 904, a signal strength of the measurement message is determined. If multiple measurement messages are received, for example, on different sub-carriers as described above, multiple signal strength measurements are determined in block 904.

In block 906, a metrics data message is generated and output for transmission (i.e., transmitted) indicating the signal strength indication(s). In some aspects, the metrics data message is output for transmission to the source device. If the measurement message was received on a specific sub-carrier, in some aspects, the metrics data message may be sent back to the source device on the same or a corresponding sub-carrier. If multiple measurement messages were received on multiple sub-carriers as described above, multiple metrics data messages may be transmitted in block 906 to the multiple source devices that transmitted the measurement messages, with each metrics data message transmitted on a sub-carrier (such as an OFDM channel) corresponding to the sub-carrier on which the corresponding measurement message was received.

In some aspects, the metrics data message is transmitted to a device other than the source device. For example, in some aspects, the source device is a station and the metrics data message is transmitted to an access point. In some aspects, the metrics data message is transmitted during a contention period on a wireless network.

In some aspects, a device performing process 900 may collect multiple signal strength measurements from multiple source devices. These multiple measurements will be transmitted as part of the same metrics data message. In some aspects, a device performing process 900 collects signal strength measurements until either they reach a maximum number, a threshold period of time elapses, or it receives a message indicating the measurements should be transmitted. When one or more of these conditions are satisfied in various aspects, the metrics data message may be transmitted. In some aspects, a device performing process 900 may receive a metrics timing message, indicating parameters that control when or how the metrics data message is transmitted. For example, a metrics timing message may indicate that metrics data messages should be sent periodically, for example, every one, two, three, four, five, 10, 15, or 30 minutes, or any time period in between. In some aspects, only signal strength measurements below (and in some sub-aspects equal to) a signal strength threshold are included in the metrics data message. In some other aspects, only signal strength measurements above (and in some sub-aspects equal to) a signal strength threshold may be included in the metrics data message. For example, signal strength measurements below the signal strength threshold may identify "non-affecting" or "non-interfering" nodes for the device performing process 900. Information identifying only these nodes may be transmitted in block 906 in some aspects.

In some aspects, the metrics data message is generated and transmitted in response to receiving a metrics request message that requests signal strength information. In some aspects, this metrics request message is received from an access point.

In aspects where multiple measurement messages are received on multiple sub-carriers, process 900 may include receiving a mapping message indicating a first mapping of device identifiers to sub-carriers. The mapping message may be received from an access point. Process 900 may use this first mapping to determine from which device a particular measurement message was received, based on the sub-carrier the particular measurement message was received on.

A device may receive a plurality of measurement messages, and determine a plurality of signal strength measurements. These signal strength measurements may then be communicated to another wireless device, for example, an access point, by the receiving device. To communicate this signal strength information, process 900 may create a second mapping of device identifiers to signal strength measurements. The second mapping maps device identifiers to the determined signal strength information. The device identifiers may be determined based on the first mapping. The second mapping may be included in the metrics data message. For example, the metrics data message may indicate the second mapping or at least a portion of the second mapping.

Figure 9B:
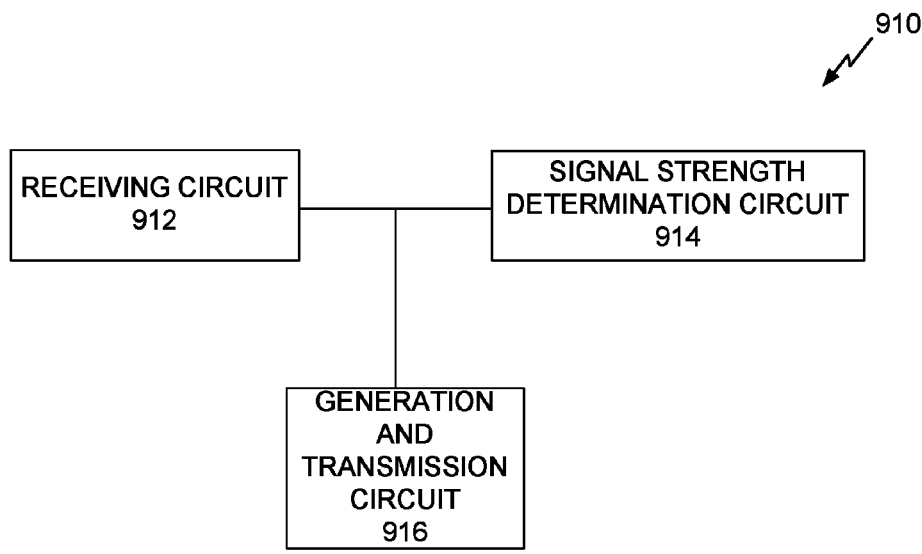
FIG. 9B is a functional block diagram of an exemplary wireless device that may be employed within one or more of the disclosed wireless communication systems.

FIG. 9B is a functional block diagram of an exemplary wireless device 910 that may be employed within the wireless communication systems 100, 200, or 250. The device 910 comprises a receiving circuit 912, a signal strength determination circuit 914 and a generation and transmission circuit 916. The receiving circuit 912 may be configured to perform one or more of the functions discussed above with respect to the block 902 illustrated in FIG. 9A. In some aspects, the receiving circuit 912 may include the receiver 412. The device 910 further comprises a signal strength determination circuit 914. The signal strength determination circuit 914 may be configured to perform one or more of the functions discussed above with respect to block 904 above. In some aspects, the signal strength determination circuit 914 may include the processor 404. The device 910 further comprises a generation and transmission circuit 916. The generation and transmission circuit 916 may be configured to perform one or more of the functions discussed above with respect to block 906 above. In some aspects, the generation and transmission circuit 916 may include the transmitter 410 and/or processor 404.

Figure 9C:
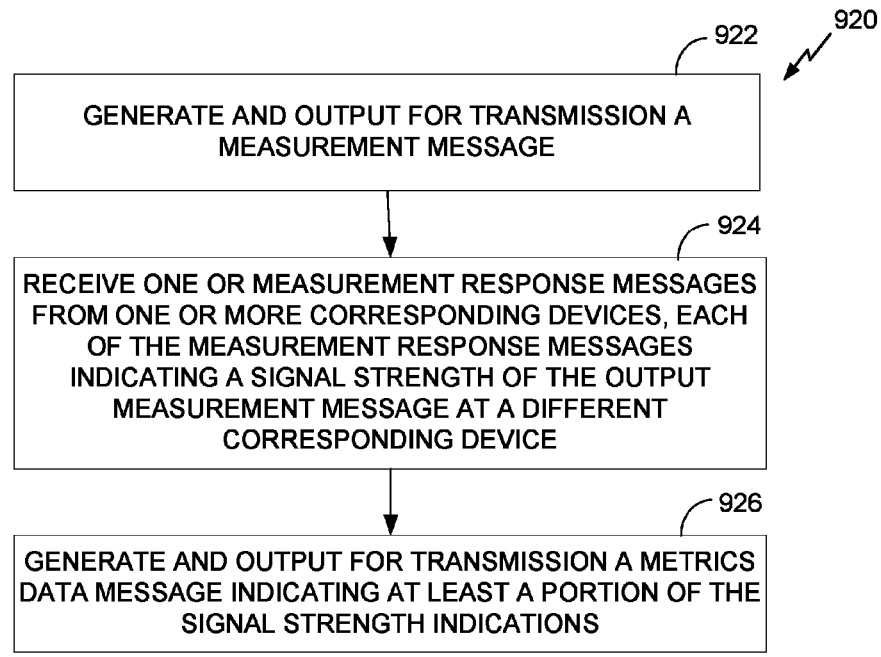
FIG. 9C is a flowchart of one exemplary method of wireless communication.

FIG. 9C is a flowchart of one exemplary method of wireless communication within one or more of the wireless communications systems 100, 200, and/or 250. In some aspects, process 920 may be performed by the wireless device 402, illustrated in FIG. 4. In some aspects, process 920 may be performed by a station on a wireless network. In some aspects, process 920 may enable a station to collect information on which other nodes or stations on the wireless network it may interfere with. To accomplish this, a device or station performing process 900 transmits a message, and other devices or stations on the network measure the message's received signal strength. These other devices then transmit that information back to the device or station. The station can therefore collect a list of stations that it does or does not (or both) interfere with. This information may be useful in determining whether the device performing process 900 can simultaneously transmit while any of the other stations are receiving downlink communications. If the uplink station does not interfere with the downlinking station, uplinking and downlinking can be performed simultaneously, even if the downlinking station does not support full duplex transmissions.

In block 922, a measurement message is generated and output for transmission (i.e., transmitted). In some aspects, the measurement message is a data or management frame. In some aspects, the measurement message specifically indicates that one or more nodes on a wireless network receiving the measurement message should measure a signal strength of the message when received at the one or more nodes. In some aspects, the measurement message is transmitted with either a broadcast or multicast address. This may enable the message to be received by multiple devices on the wireless network, which can then measure a signal strength of the message.

In some aspects, process 920 includes receiving a measurement command message. This measurement command message may be received from an access point. The measurement command message may indicate to a device performing process 920 that it should generate and transmit the measurement message of block 922.

In block 924, one or more measurement response messages are received from one or more corresponding devices. The corresponding devices may have received the measurement message generated and transmitted in block 920. When the measurement message was received by the corresponding devices, they may have measured its signal strength. This information may have then been transmitted back to the device performing process 924. Each measurement response message received indicates a signal strength of the transmitted measurement message when it is received at a different corresponding device.

In block 926, a message with signal strength metrics, or equivalent metrics, is transmitted. This metrics data message indicates at least a portion of the signal strength indications received in block 924. In some aspects, the metrics data message is transmitted to an access point. In some aspects, the metrics data message is transmitted in response to receiving a metrics data request message, with the metrics data request message requesting that the metrics data message be transmitted. The metrics data request message may be transmitted by an access point, with the metrics data message also transmitted to the same access point in some aspects.

Figure 9D:
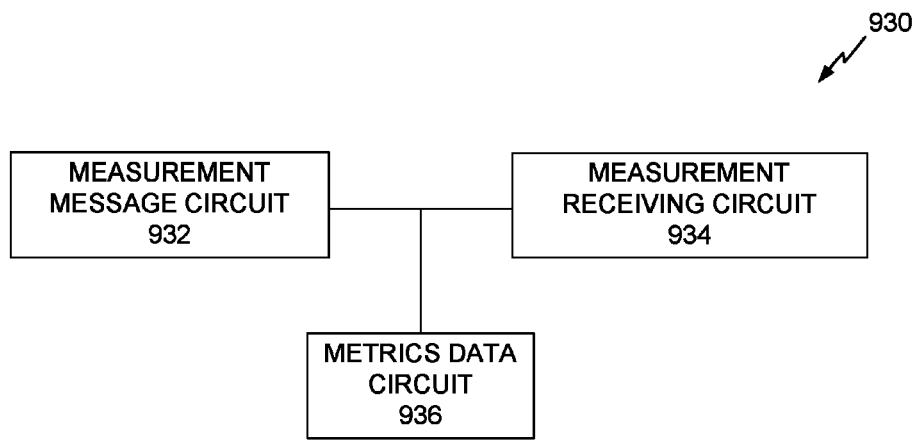
FIG. 9D is a functional block diagram of an exemplary wireless device that may be employed within one or more of the disclosed wireless communication systems.

FIG. 9D is a functional block diagram of an exemplary wireless device 910 that may be employed within the wireless communication systems 100, 200, or 250. The device 930 comprises a measurement message circuit 932, a measurement receiving circuit 934 and a metrics data circuit 936. The measurement message circuit 932 may be configured to perform one or more of the functions discussed above with respect to the block 922 illustrated in FIG. 9C. In some aspects, the measurement message circuit 932 may include the processor 404 and/or the transmitter 410. The device 930 further comprises a measurement receiving circuit 934. The measurement receiving circuit 934 may be configured to perform one or more of the functions discussed above with respect to block 924 above. In some aspects, the measurement receiving circuit 934 may include the receiver 412 and/or the processor 404. The device 930 further comprises a metrics data circuit 936. The metrics data circuit 936 may be configured to perform one or more of the functions discussed above with respect to block 926 above. In some aspects, the metrics data circuit 926 may include the processor 404 and/or the transmitter 410.

Figure 10A:
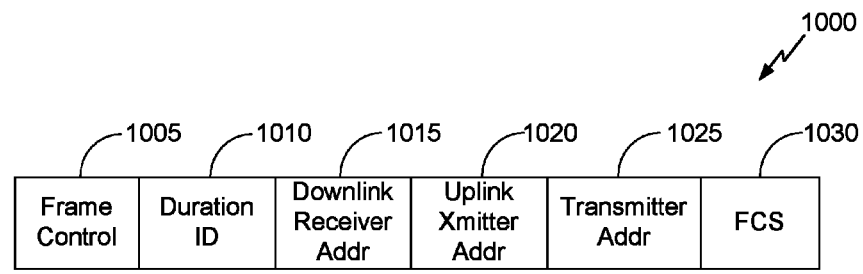
FIG. 10A shows an exemplary full duplex request-to-send frame 1000.

FIG. 10A shows an exemplary full duplex request-to-send frame 1000 that may be transmitted in one or more of the wireless communications systems 100, 200, and/or 250 in some aspects. The full duplex request to send frame 1000 may be used to schedule a full duplex transmission on a wireless network, such as an 802.11 network. The full duplex request-to-send frame 1000 includes six fields, a frame control field 1005, a duration id field 1010, a downlink receiver address field 1015, an uplink transmitter address field 1020, a transmitter address field 1025, and a frame check sequence field 1030. In some aspects, the request-to-send frame 1000 may include additional fields without departing from the methods and systems disclosed.

In some aspects, the frame control field 1005 may indicate that the frame 1000 is a full duplex request-to-send frame. For example, in these aspects, the frame control field 1005 may indicate the frame 1000 is not an 802.11 standard "half-duplex" request-to-send frame. In some other aspects, the frame control field 1005 may indicate the frame 1000 is a standard 802.11 "half-duplex" request-to-send frame. In these aspects, another field, such as a new field, not shown, may indicate that the frame 1000 is a full duplex request-to-send frame. The downlink receiver address field 1015 indicates an address of a device that will receive data during a transmission opportunity defined by the frame 1000. In some aspects, the downlink receiver address field 1015 performs a similar function to a receiver address field in a 802.11 standard request-to-send frame. The uplink transmitter address field 1020 indicates an address of a device that should send uplink data during a transmission opportunity defined by the request-to-send field. For example, the transmission opportunity may be defined by a duration of a network allocation vector (NAV) set as a result of reception of the request to send frame 1000. In some aspects, the NAV may include a time duration from the end of a scheduling frame to the end of the time indicated in the NAV. The duration id field 1010 indicates the duration of the transmission opportunity. For example, the duration id may indicate a time period for which the NAV should be set when the frame 1000 is received. The time period indicated by the duration id field 1010 may include time for two clear-to-send frames, the uplink and downlink data transmission, and an inter-frame spacing time. The transmitter address field 1025 indicates an address of a device transmitting the request-to-send frame 1000. In some aspects, the transmitter address field 1025 performs a similar function of a transmitter address field of an 802.11 standard request-to-send frame. The frame check sequence field 1030 performs a function similar to the frame check sequence field in a standard 802.11 request-to-send frame.

Figure 10B:
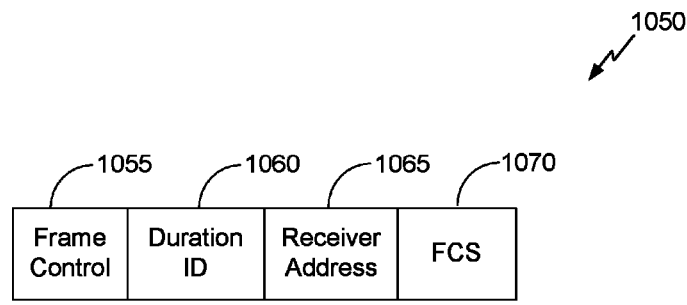
FIG. 10B shows an exemplary full duplex clear-to-send frame 1050.

FIG. 10B shows an exemplary full duplex clear-to-send frame 1050 that may be transmitted in one or more of the wireless communications systems 100, 200, and/or 250 in some aspects. The full duplex clear-to-send frame 1000 includes four fields, a frame control field 1055, a duration id field 1060, a receiver address field 1065, and a frame check sequence field 1070. In some aspects, CTS frames may be transmitted by both the downlink packet recipient as well as the node designated to send uplink data. If both devices transmit CTS frames, the order of which device transmits first may be pre-negotiated. The order, as well as the request for CTSs, may also be indicated in the full duplex RTS message.

In some aspects, the frame control field 1005 may indicate that the frame 1000 is a full duplex clear-to-send frame. For example, in these aspects, the frame control field 1055 may indicate the frame 1000 is an 802.11 full duplex clear-to-send frame.

The duration id field 1060 may indicate a requested duration of a transmission opportunity indicated by a preceding request-to-send message. For example, in some aspects, if a device sending the clear-to-send frame 1050 is requesting to maintain a transmission opportunity or NAV duration equivalent to that specified in a previously received request-to-send frame, the duration ID field may be set to the duration ID from the request-to-send minus the time for any overhead due to any CTS messages. If a device transmitting the request to send frame is requesting a longer duration than that specified in a previously received request-to-send frame, the duration id field 1060 may be set to a value longer than the duration which would be expected if using the duration ID from the previously received RTS.).

In some aspects, at least one additional field, not shown, may be included in the clear-to-send frame 1050. This additional field may indicate whether the transmitter of the clear-to-send frame is requesting a longer duration transmission opportunity or NAV.

The receiver address field 1065 indicates an address of a device that will receive uplink data during a transmission opportunity defined by a preceding request-to-send frame. The frame check sequence field 1070 performs a function similar to the frame check sequence field in a standard 802.11 request-to-send frame.

Figure 10C:
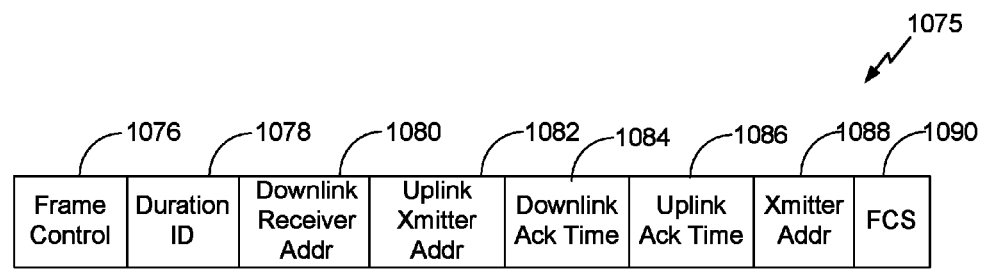
FIG. 10C shows an exemplary full duplex scheduling frame 1075.

FIG. 10C shows an exemplary full duplex scheduling frame 1075 that may be transmitted in one or more of the wireless communications systems 100, 200, and/or 250 in some aspects. The full duplex scheduling frame 1075 includes eight fields, a frame control field 176, a duration id field 1078, a downlink receiver address field 1080, an uplink transmitter address field 1082, a downlink acknowledgment time indication field 1084, an uplink acknowledgment time indication field 1086, a transmitter address field 1088, and a frame check sequence (FCS) field 1090. Note that the ACK times can be pre-negotiated and based off the end of the packet, and in this case the ACK time fields would not be needed. In some aspects, the scheduling frame 1075 may be a full duplex request-to-send frame. In some other aspects, the frame control field 1076 may identify the scheduling message 1075 as a frame other than a request-to-send frame. The downlink receiver address field and uplink transmitter address field function similarly to fields 1015 and 1020 respectively, described above. The downlink acknowledgment time field 1084 indicates when an acknowledgment for downlink data transmitted to the device identified by field 1080 should be transmitted. The uplink acknowledgment time field 1086 indicates when an acknowledgment for the uplink data transmitted by the device identified by field 1082 will be transmitted. Some aspects of scheduling message 1075 may include additional fields. For example, fields indicating one or more of a second, third, and fourth downlink receiver address, uplink receiver address, downlink acknowledgement time, and/or uplink acknowledgment time may be included in the scheduling message 1075.

Figure 10D:
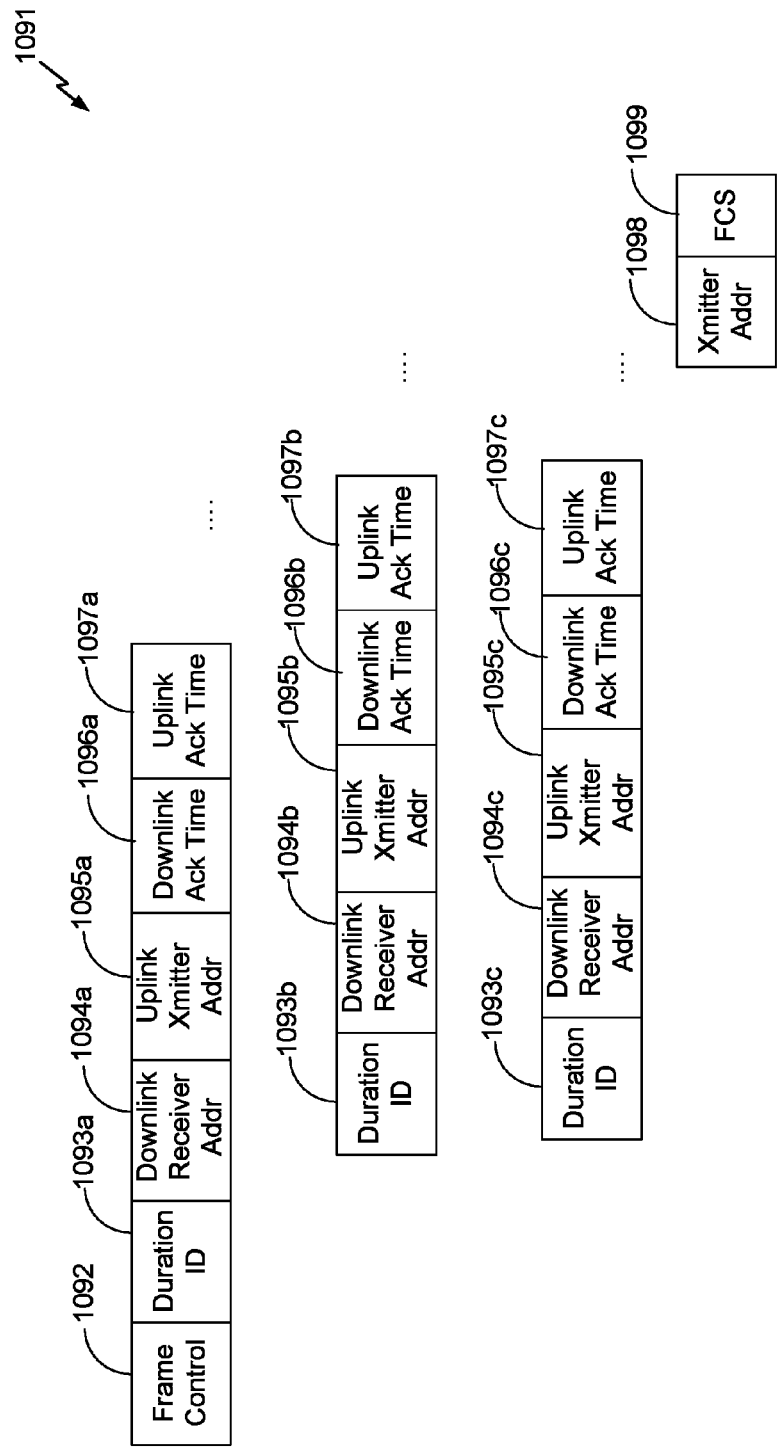
FIG. 10D shows an exemplary full duplex scheduling frame 1091.

FIG. 10D shows an exemplary full duplex scheduling frame 1091 that may be transmitted in one or more of the wireless communications systems 100, 200, and/or 250 in some aspects. The full duplex scheduling frame 1091 includes a variable number of fields. These fields include, a frame control field 1092, one or more duration id fields 1093, one or more downlink receiver address fields 1094, one or more uplink transmitter address fields 1095, one or more downlink acknowledgment time indication fields 1096, one or more uplink acknowledgment time indication fields 1097, a transmitter address field 1098, and a frame check sequence (FCS) field 1099. Note that the ACK times may be pre-negotiated and based on the end of a transmission (which can be inferred from the duration ID), and hence the ACK time fields would not be necessary.

In some aspects, the scheduling frame 1091 may be a request-to-send frame. In some other aspects, the frame control field 1092 may identify the scheduling message 1091 as a frame other than a request-to-send frame. The downlink receiver address fields 1094 and uplink transmitter address fields 1095 function similarly to fields 1015 and 1020 respectively, described above. The downlink acknowledgment time fields 1096 indicate when an acknowledgment for downlink data transmitter to the device identified by fields 1094 should be transmitted. The uplink acknowledgment time fields 1097 indicate when an acknowledgment for the corresponding uplink data transmitted by the device identified by field 1095 will be transmitted. The Scheduling frame in 10D can be used to schedule multiple pairs of uplink and downlink transmissions in some aspects. This is shown, in part, by fields 1093b-1097b, and 1093c-1097c in FIG. 10D.

The order of the fields 1093a-1097a relative to fields 1093b-1097b define an order in which full duplex downlink/uplink transmissions occur on the wireless network during the transmission opportunity identified by the scheduling message. For example, the downlink/uplink devices identified by fields 1094a and 1095a transmit data before downlink/uplink devices identified by fields 1094b and 1095b, assuming these fields occur after fields 1094a and 1095a in the scheduling message 1091.

Note that in some aspects, scheduling frame 1091 may be generated to indicate more than one downlink receiver for a single uplink transmission For example, 1094a could specify two downlink addresses. The duration ID 1093a would also have to specify the duration of each of the downlinks. Furthermore 1096a would have to specify two ACK times for the two downlink packets. Again, if the rules on ACK times are pre-negotiated, then these ACK time fields would not have to be included.

In some aspects, scheduling frame 1091 may be generated to indicate more than one uplink transmitter for a single downlink transmission. For example, 1095a could contain two uplink addresses, and the duration 1093a could contain two uplink durations 1097a would also have to contain the times to ACK the two uplink transmissions.

FIG. 11A illustrates a full duplex message exchange in one or more of the communications systems 100, 200, and/or 250 in exemplary aspects. The message exchange shown in FIG. 11A may be implemented when an access point is capable of full duplex transmissions but one or more stations are unable to perform full duplex transmissions.

Full duplex message exchange 1100 begins with the AP transmitting a full duplex controlling request-to-send (RTS) message 1102. In one aspect, the RTS 1102 may conform to the format of the request-to-send message 1000 shown in FIG. 10A. The RTS 1102 indicates a device that should perform uplink data transmission during a period of time indicated by the RTS message 1102. For example, the period of time may be indicated by a duration field of the RTS message. The RTS message 1102 also indicates a device that will receive downlink data during the period of time. In the message exchange 1100 of FIG. 11A, the RTS message 1102 indicates the STA 106a will receive downlink data and the STA 106b will transmit uplink data.

STA 106a transmits a clear-to-send (CTS) message 1104 in response to receiving the RTS message 1102. The uplinking STA 106b also transmits a CTS message 1106. In some aspects, the CTS message 1106 may conform with the format of clear-to-send message 1050 as discussed with respect to FIG. 10B. Note that whether or not to send the CTS may be indicated in the RTS, and the order of the CTS may also be given there. Alternatively, whether to send CTSs and also their order may be pre-negotiated.

The AP then transmits the downlink data 1108 simultaneously with the uplink data 1110. In some aspects, the uplink data 1110 may be transmitted by the STA 106b after the downlink data to allow time for channel estimation by the STA 106b. In some aspects, one or both of packets 1108 and/or 1110 may include additional training fields. In some aspects, a transmitter of the shorter packet of packets 1108 and 1110 may pad the shorter packet to make the shorter packet complete its transmission at the same time as the longer packet. This may assist surrounding nodes receiving the shorter packet's transmission in determining that the medium is still occupied by the longer packet.

The downlink STA 106a then acknowledges the downlink transmission 1108 with downlink acknowledgment 1112, while the AP 104 acknowledges the uplink data 1110 transmitted by STA 106b via uplink acknowledgment 1114. These acknowledgements may be transmitted in full duplex simultaneously. In some aspects, the acknowledgments 1112 and 1114 may be transmitted SIPS time after the longest of the transmissions 1108 and 1110 completes. The ACKs may also be staggered.

FIG. 11B illustrates a full duplex message exchange in one or more of the communications systems 100, 200, and/or 250 in one exemplary embodiment. The message exchange shown in FIG. 11B may be implemented when an access point is capable of full duplex transmissions but one or more stations are unable to perform full duplex transmissions.

Full duplex message exchange 1125 begins with the AP transmitting a scheduling message 1126. In some aspects, the scheduling message 1126 may substantially conform to the scheduling message 1075 shown in FIG. 10C. The scheduling message 1126 may indicate a downlink device and an uplink device for a transmission opportunity defined by the scheduling message. The scheduling message may also indicate a duration of the transmission opportunity. In some aspects, the transmission opportunity may begin when the AP 104 begins data transmission. The scheduling message may further indicate when acknowledgements for the uplink data and downlink data should be transmitted. In some aspects, the scheduling message 1126 may comprise multiple time slots, wherein each time slot may be specific to different pairs of uplink and downlink devices. Additionally, in some aspects, the acknowledgement packet start time may be indicated based on a maximum duration of two data packets to be communicated during a time slot of the scheduling message 1126. Additionally, in some aspects, an AP 104 may reserve a NAV in the scheduling message 1126 and may send a contention free (CF) end to early terminate the full duplex communication or the NAV if the reserved NAV is not filled. For example, if AP 104 reserves 10 ms in the NAV for uplink transmissions from a STA 106 but determines from the message that the entire reserved 10 ms will not be used, the AP 104 may send a CF-end to terminate the communication before the reserved NAV duration elapses.

In the aspect illustrated by FIG. 11B, the uplink data transmission must be no longer than the duration indicated by the scheduling message 1126. Additionally, the STA 106b may pad the uplink data 1130 to ensure that the transmission of the uplink data 1130 completes at the same time as the transmission of the downlink data 1128. This may ensure that surrounding nodes know the medium is occupied by downlink data 1128.

In some aspects, STA 106b may begin transmission of the uplink data 1130 after transmission of the downlink data 1128 begins. This may provide an opportunity for channel estimation by the STA 106b. In some aspects, the scheduling message 1126 may indicate that the acknowledgements 1132 and 1134 of the uplink data 1130 and downlink data 1128 respectively are to be transmitted in full duplex at the completion of the transmission of the downlink/uplink data, as shown by FIG. 11B. Alternatively, the scheduling message 1126 may indicate that the acknowledgements are to be staggered, such that only one of acknowledgements 1132 and 1134 are transmitted during a particular time.

Figure 12:
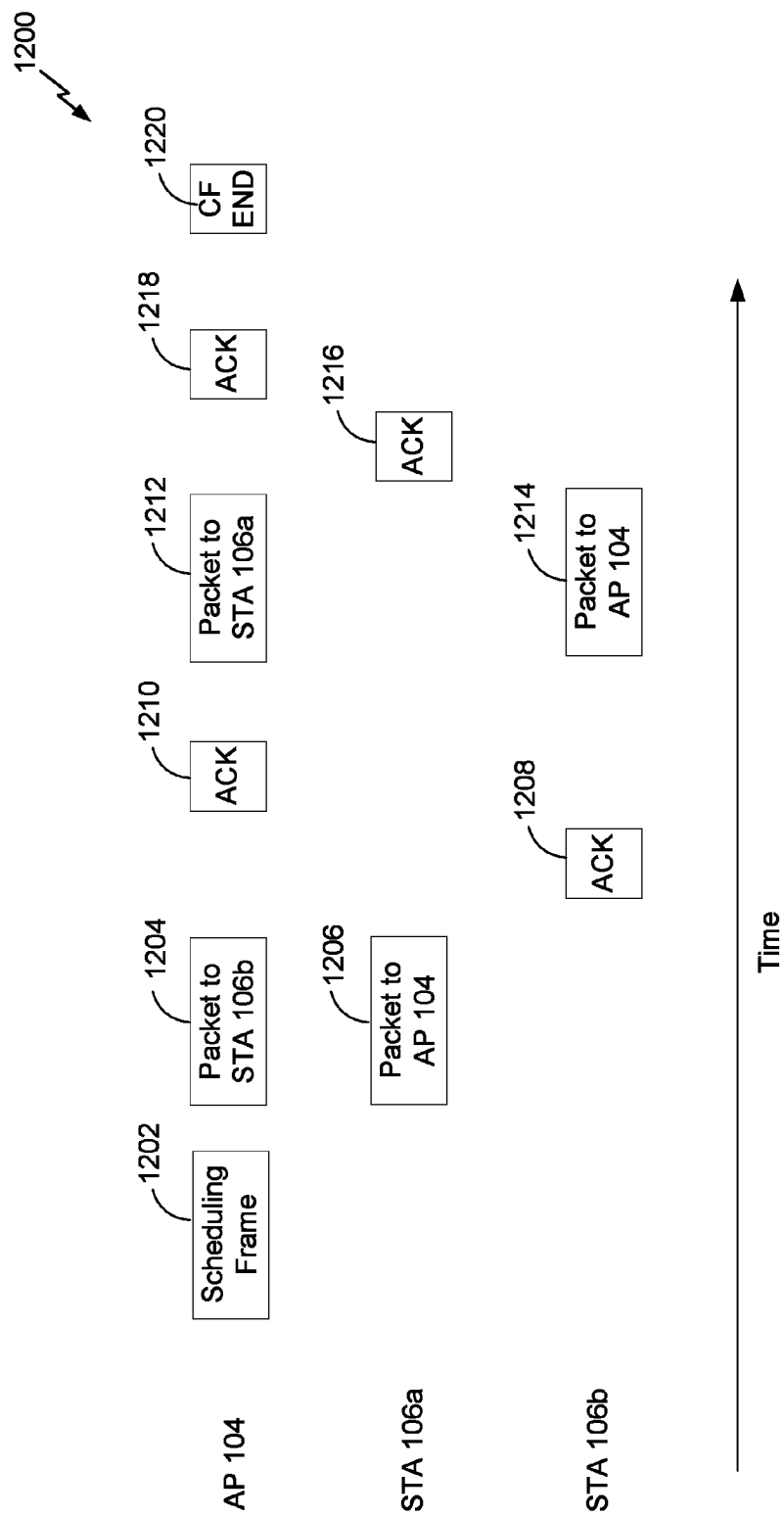
FIG. 12 illustrates a full duplex message exchange in one exemplary embodiment.

FIG. 12 illustrates a full duplex message exchange that may be performed in one or more of the wireless communications systems 100, 200, and/or 250 in some aspects. The message exchange shown in FIG. 12 may be implemented when an access point is capable of full duplex transmissions but one or more stations are unable to perform full duplex transmissions. Message exchange 1200 demonstrates the use of a scheduling message to schedule multiple full duplex transmissions. Note that in this case, the ACKs are shown to be staggered. By staggering the acknowledgment of full duplex transmissions, the reliability of reception of the acknowledgments may be improved.

Full duplex message exchange 1200 begins with the AP transmitting a scheduling message 1202. In some aspects, the scheduling message 1202 substantially conforms with the scheduling message 1075 shown in FIG. 10C. The scheduling message 1202 may define an order of downlink/uplink node pairs. For example, the scheduling message 1202 may conform to the message format shown in FIG. 10D. The AP 104 can determine a total duration of a NAV based on a sum of the duration of downlink data to be sent to the downlink nodes in each pair.

Acknowledgements for the uplink and downlink data 1206 and 1204 respectively may be staggered in this embodiment. In some aspects, the timing for transmitting the acknowledgments 1208 and 1210 may be indicated by the scheduling frame 1202. By not utilizing full duplex transmissions for the acknowledgements, the acknowledgements may be received more reliably. This may facilitate each node specified by the scheduling frame 1202 to transmit either uplink or downlink data, and to determine when it should transmit the specified uplink data or receive a downlink transmission.

In the illustrated aspect of FIG. 12, the scheduling message 1202 may indicate the following node pairs:

TABLE 1

| Timeslot within NAV | RECEIVING DOWNLINK | TRANSMITTING UPLINK |
|---|---|---|
| 1 | STA 106b | STA 106a |
| 2 | STA 106a | STA 106b |

In conformance with the timeslots as defined by Table 1, after the scheduling frame 1202 is transmitted by the AP 104, the AP transmits data packet 1204 to the STA 106b, while the STA 106a transmits uplink data 1206 to the AP 104. After data transmission is complete, the STA 106b acknowledges the downlink data 1204 with acknowledgement 1208. The AP 104 then acknowledges uplink data 1206 by transmitting acknowledgment 1210 to STA 106*a* Note that the order of the ACKs could also be reversed.

In accordance with "timeslot" 2 of Table 1 above, AP 104 then transmits downlink data 1212 to STA 106*a* while STA 106*b* transmits uplink data 1214 to the AP 104. Each of downlink data 1212 and uplink data 1214 are then acknowledged by acknowledgement packets 1216 and 1218 respectively. In some aspects, the AP 104 may transmit a CF end frame 1220 to terminate the NAV reserved by the scheduling frame 1202.

Figure 13:
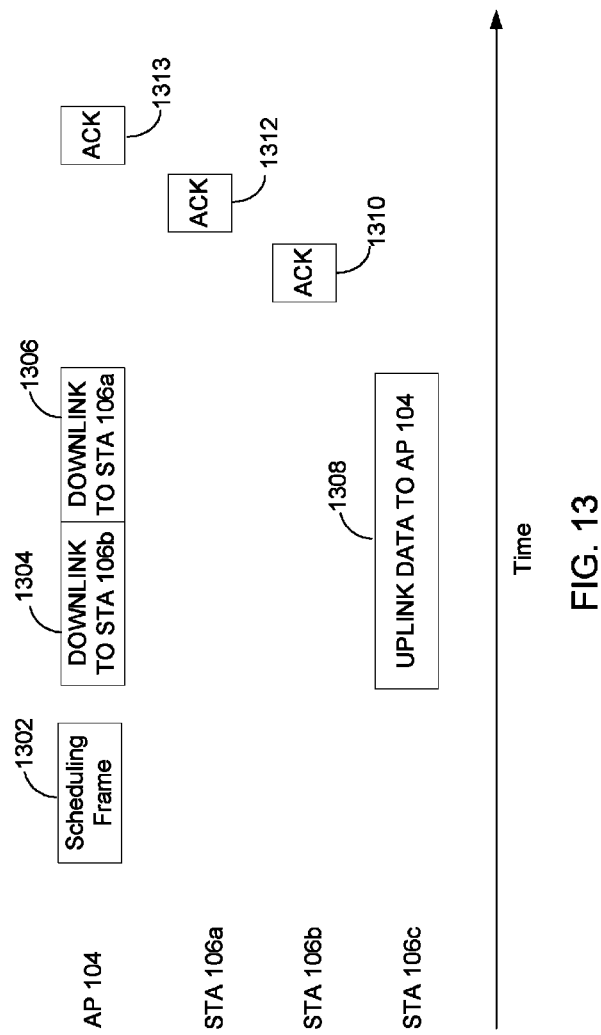
FIG. 13 illustrates a full duplex message exchange in one exemplary embodiment.

FIG. 13 illustrates a full duplex message exchange in one exemplary embodiment. The message exchange shown in FIG. 13 may be implemented when an access point is capable of full duplex transmissions but one or more stations are unable to perform full duplex transmissions. Message exchange 1300 shows the scheduling of a full duplex transmission such that two separate downlink transmissions may occur concurrently with one uplink transmission. This may be advantageous when, for example, a station has a large amount of data to uplink to an access point, and the access point has at least two shorter transmissions available to downlink to two or more stations.

Full duplex message exchange 1300 begins with the AP transmitting a scheduling message 1302. In some aspects, the scheduling message 1302 substantially conforms with the scheduling message 1075 shown in FIG. 10C or the scheduling message 1091 shown in FIG. 10D. The scheduling message 1302 defines a start time for each of a set of nodes. The scheduling frame can indicate when the ACKs should be transmitted, or the ACK order can be pre-negotiated. For instance, it can be pre-negotiated that ACKs in response to downlink data should go before the ACKS in response to uplink data, and that the order of the ACKs should match the chronological order of the packets as scheduled in the scheduling message. Uplink and downlink acknowledgement messages may be transmitted simultaneously or in a staggered fashion. Different uplink ACKs (in response to downlink data) may be staggered.

In the illustrated aspect of FIG. 13, scheduling message 1302 may indicate data as shown in Table 2

TABLE 2

| START TIME/Duration | RECEIVING DOWNLINK | TRANSMITTING UPLINK |
|---|---|---|
| 300 | STA 106b | STA 106c |
| 700 | STA 106a | STA 106c |

In some other aspects (not shown), multiple devices may transmit uplink data during the transmission of one downlink. For example, scheduling message 1302 may, in other non-illustrated aspects, indicate data as shown in Table 3 below:

TABLE 3

| START TIME/Duration | RECEIVING DOWNLINK | TRANSMITTING UPLINK |
|---|---|---|
| 300 | STA 106b | STA 106a |
| 700 | STA 106b | STA 106c |

Figure 14A:
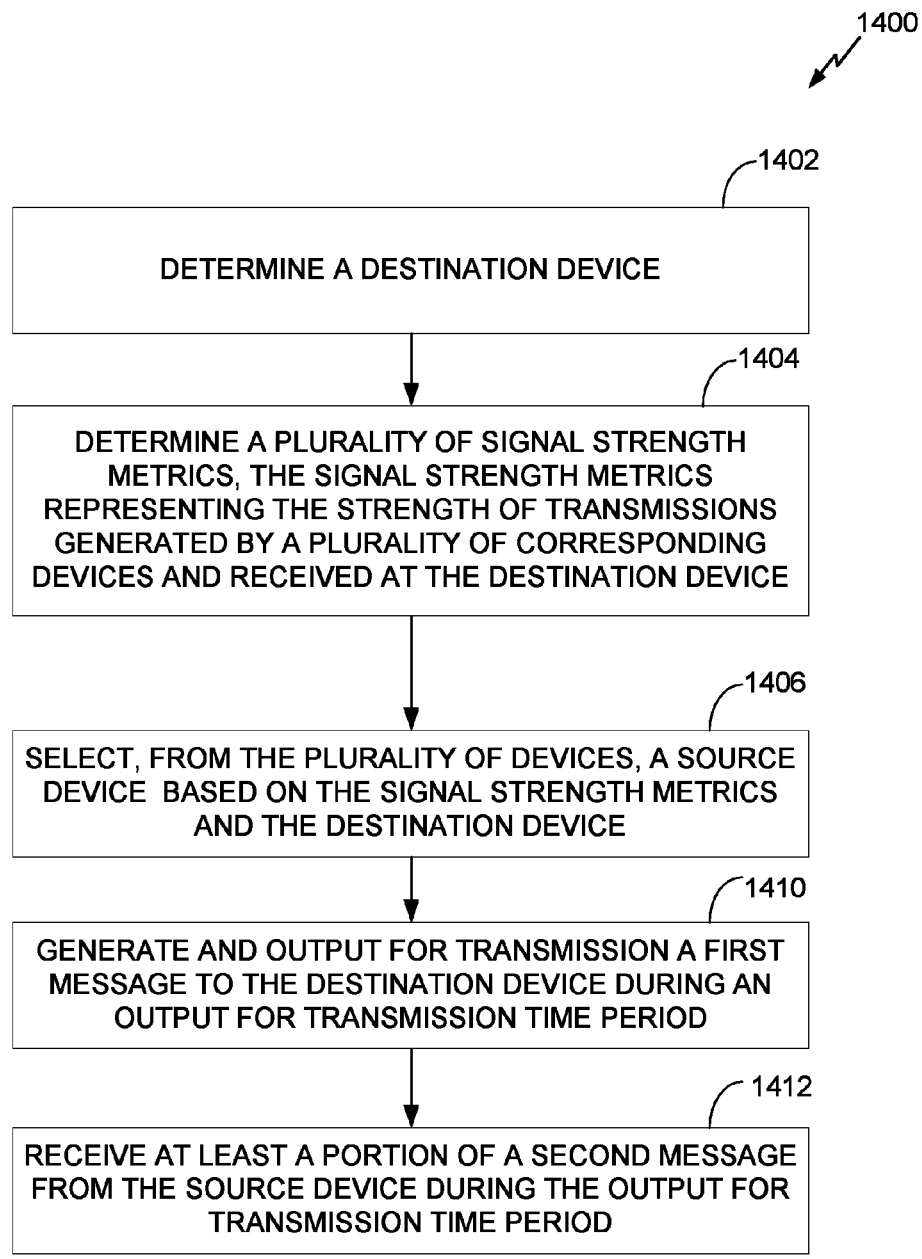
FIG. 14A is a flowchart of one exemplary method of wireless communication.

FIG. 14A is a flowchart of one exemplary method of wireless communication in one or more of the wireless communications systems 100, 200, and/or 250. In some aspects, process 1400 may be performed by the wireless device 402, illustrated in FIG. 4. Process 1400 may provide a method for scheduling full duplex transmissions in a network environment that includes an access point capable of full duplex transmission, but one or more stations that do not support full duplex transmissions. As discussed above, this may be accomplished in some aspects by scheduling uplink messages from stations that will not interfere with stations receiving downlink messages at the same time. As discussed above, a set of "unaffecting" or "non-interfering" stations or nodes may be determined for one or more other stations or nodes on a wireless network. When a downlink message is scheduled for a station, an uplink message may be scheduled from one of the stations in the set of "unaffecting" or "non-interfering" stations. This may provide for increased throughput on a wireless network that includes stations that do not support full duplex transmissions.

In block 1402, a destination device is determined. In some aspects, the destination device may be selected based on one or more queues of data waiting to be sent to one or more of the plurality of devices.

In block 1404, a plurality of signal strength metrics are determined. The plurality of signal strength metrics represent the strength of transmissions generated by a plurality of corresponding devices and received at the destination device. For example, in some aspects, a signal strength metric may provide a measurement of a received signal strength indication (RSSI) of a message transmitted by a first device of a pair of devices when the message is received by a second device of the pair. As shown in FIG. 5 and the corresponding description above, by understanding the signal strength of transmissions by devices when received by other devices, it may be determined which devices are subject to interference by the transmission of certain other devices. In some other aspects, the plurality of signal strength metrics may be based on a physical distance between the destination device and the plurality of corresponding devices.

In some aspects, process 1400 may include receiving a plurality of metrics or signal strength indication messages from at least a portion of the plurality of devices. Each of these signal strength indication messages may indicate a signal strength of a transmission received from another of the plurality of devices. For example, the signal strength of a transmission of a first device of a pair of devices and received by a second device of the pair of devices may be indicated by each of the signal strength indication messages. The second device of each pair may transmit the signal strength indication message to a device performing process 1400, which receives the message. The signal strength metrics may be determined based on this plurality of received messages.

In block 1406, a source device is selected from the plurality of devices based on the signal strength metrics and the destination device. In some implementations, the source device may be selected for at least the reason that transmissions from the source device do not interfere with the destination device. For example, based on the determined signal strength metrics of block 1402, a set of potential source devices may be determined. The potential source devices may be determined based on the destination device. For example, data represented by the following table may be determined:

TABLE 4

| Potential Source Device | Signal strength at destination device |
|---|---|
| Device 1 | 5 |
| Device 2 | 15 |
| Device 3 | 10 |

Note that Table 4 is provided as an example only, and the units of signal strength are arbitrary. The values in the signal strength column are only meant to convey a relative signal strength. For example, the signal strength of transmissions by Device 2 received at the destination device is 15, which is higher than the signal strength of transmissions received at the destination device from device 1 (which has a signal strength of 5).

In this example, process 1400 may determine that devices with a signal strength in Table 4 equal to or above a strength threshold cannot perform simultaneous communications with the destination device, because they will cause "too much" interference at the destination device. In other words, a potential source device may be selected based on its corresponding signal strength measurement being below a signal strength threshold. For example, in an example implementation utilizing Table 4, the strength threshold may be twelve (12) in some implementations. In these implementations, device 2 would be ruled out as a potential source device, because its signal strength measurement (15) is above the example signal strength threshold (12). These implementations may then select between either device 1 or device 3 as a source device. In some implementations, selection of a device from a set of devices with signal strength metrics below the strength threshold may be based on an amount of data available from the potential source device, if known. In some implementations, the selection may be based on an amount of time since a previous transmission from each of the potential source devices. For example, if device 1's last transmission was more recent than device 3's last transmission, device 1 may be selected as the source device.

In some aspects of process 1400, physical distances between pairs of devices may be determined. For example, in some aspects, process 1400 may include receiving a plurality of distance indication messages, with each distance indication message indicating a physical location of at least one of the plurality of devices. In some aspects, the signal strength metrics may be determined at least in part on the physical distances. In some aspects, the selection of a source device may be based on its physical distance from the destination device.

In block 1410, a first message is generated and output for transmission (i.e., transmitted) to the destination device during a transmission time period. In some aspects, this message may be a downlink message from an access point to a station. While not shown explicitly in FIG. 14A, process 1400 may further include generating and transmitting a scheduling message to the selected source device indicating the source device is granted permission to transmit a second message during the transmission time period. In some aspects, the scheduling message indicates a duration of time allocated to transmit the second message. In some aspects, the scheduling message may grant permission to transmit the second message as uplink data. In some aspects, the scheduling message may indicate a time period for acknowledging the transmission of the second message. In some aspects, the scheduling message may indicate a time period for acknowledging the transmission of the first message.

In block 1412, a second message is received from the source device during the transmission time period. In some aspects, the second message is received while the first message is being transmitted. Because the source device was selected for its relatively low level of interference with the destination device, the destination device is able to receive the first message while the source device is transmitting the second message without significant interference from the source device's transmission.

In some aspects of process 1400, the scheduling message discussed above may be generated so as to indicate a second source device that is granted permission to transmit a third message (which may be uplink data in some aspects) during a second transmission opportunity that is also identified by the scheduling message. In some aspects, the second source device may be selected in a similar manner as the first source device as discussed above. In some aspects, the scheduling message may be generated to indicate a second destination device that will receive a fourth message during the second transmission opportunity. The second destination device may be selected in a manner similar to that described above for the first destination device. In some aspects, the second transmission opportunity may be determined based on an end time of the first transmission opportunity. In some aspects, the scheduling message is a request-to-send message. In some other aspects, the scheduling message is a downlink data message.

In some aspects, the second destination device may receive downlink data at least partially concurrently with the second source device transmitting uplink data. For example, process 1400 may further include transmitting second downlink data to the second destination device while at least partially receiving second uplink data from the second source device. In some aspects, the scheduling message discussed above may be generated to indicate a time period for acknowledging second downlink data and a time period for acknowledging second uplink data. Accordingly, process 1400 may further include transmitting an acknowledgement to the second source device and receiving an acknowledgement from the second destination device.

In some aspects, the scheduling message discussed above is further generated such that it indicates a third source device is granted permission to transmit third uplink data during the second transmission opportunity or a third transmission opportunity identified by the scheduling message. The scheduling message may further indicate a start time for the third uplink data within the second transmission opportunity or third transmission opportunity.

In some aspects, the scheduling message discussed above is further generated such that it indicates a third destination device that will receive third downlink data during the second transmission opportunity. The scheduling message may further indicate a start time for the third downlink data within the second transmission opportunity. In some aspects, the scheduling message is also generated to indicate a time for acknowledging the third downlink data. Some aspects of process 1400 further include receiving a first acknowledgment of the transmitted first message, and transmitting a second acknowledgement of the second (uplink) message.

In some aspects, process 1400 further includes receiving and decoding a clear-to-send message, the clear-to-send message indicating a duration of time requested for an uplink transmission. For example, either the first or second source devices (or both) may transmit a clear-to-send message indicating a requested duration of time needed to transmit their uplink data. In some aspects, in response to receiving the clear-to-send message(s), process 1400 may generate a transmit a second scheduling message indicating one or more duration(s) of time allocated to an uplink transmission from one or both source devices. The duration(s) indicated in the second scheduling message may be compatible with the duration requested in one or more of the clear-to-send messages described above.

In some aspects, the duration of one or more of the uplink messages is equivalent to the duration corresponding downlink messages. For example, in some aspects, the duration of an uplink message may be limited to a maximum of the duration of a downlink message scheduled for the same transmission opportunity. In some aspects, process 1400 may include padding either the first message or the second downlink data message. Alternatively, in some aspects, the received second message may be decoded and determined to include one or more pad bytes. In some aspects, generation of the first message may include one or more training fields in the message(s). In some aspects, process 1400 includes performing channel estimation before the second (uplink) message is received.

Figure 14B:
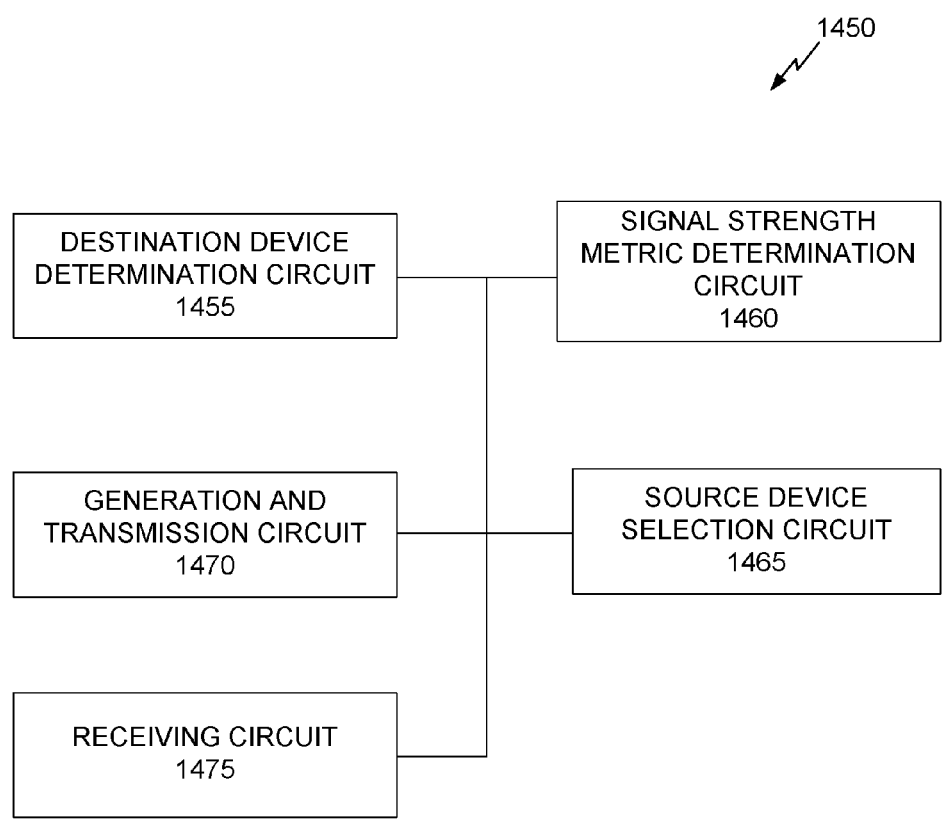
FIG. 14B is a functional block diagram of an exemplary wireless device that may be employed within one or more of the disclosed wireless communication systems.

FIG. 14B is a functional block diagram of an exemplary wireless device 1450 that may be employed within the wireless communication systems 100, 200, and/or 250. The device 1450 comprises a destination device determination circuit 1455, a signal strength metric determination circuit 1460, a source device selection circuit 1465, a generation and transmission circuit 1470, and a receiving circuit 1475. The destination device determination circuit 1455 may be configured to perform one or more of the functions discussed above with respect to block 1402 illustrated in FIG. 14A. In some aspects, the destination device determination circuit 1455 may include the processor 404. The device 1450 further comprises a signal strength metric determination circuit 1460. The signal strength metric determination circuit 1460 may be configured to perform one or more of the functions discussed above with respect to the block 1404 illustrated in FIG. 14A. The signal strength metric determination circuit 1460 may include one or more of the processor 404 and/or the DSP 420. The device 1450 further comprises a source device selection circuit 1465. The source device selection circuit 1465 may be configured to perform one or more of the functions discussed above with respect to block 1406 illustrated in FIG. 14A. In some aspects, the source device selection circuit 1465 may include the processor 404. The device 1450 further comprises a generation and transmission circuit 1470. The generation and transmission circuit 1470 may be configured to perform one or more of the functions discussed above with respect to block 1410 illustrated in FIG. 14A. In some aspects, the generation and transmission circuit 1470 may include the transmitter 410 and/or the processor 404. The device 1450 further comprises a receiving circuit 1475. The receiving circuit 1475 may be configured to perform one or more of the functions discussed above with respect to block 1412 illustrated in FIG. 14A. In some aspects, the receiving circuit 1475 may include the receiver 412.

Figure 15:
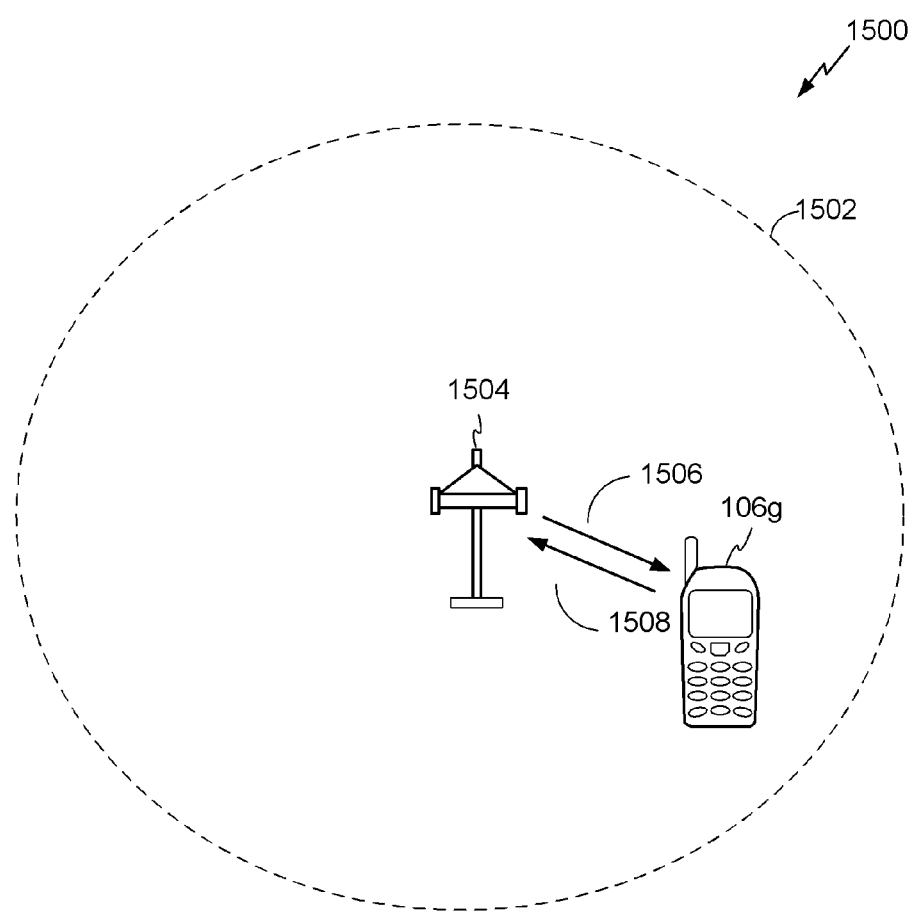
FIG. 15 illustrates an example of a wireless communication system in which aspects of the present disclosure may be employed.

FIG. 15 illustrates an example of a wireless communication system 1500 in which aspects of the present disclosure may be employed. The wireless communication system 1500 may operate pursuant to a wireless standard, for example the 802.11 standard. The wireless communication system 1500 includes an AP 1504, which communicates with STAs 106. In some aspects, the wireless communication system 1500 is one or more of the wireless communication systems 100, 200, or 250.

As shown in FIG. 15, the AP 1504 communicates with a basic service set 1502. One device operating within the BSS 1502 is STA 106g. The AP 1504 transmits messages 1506 to the STA 106a. The STA 106g transmits messages 1506 to the AP 1504. In this disclosed embodiment, both the AP 1504 and the STA 106g are capable of full duplex communication. Therefore, in some aspects, messages 1502 and 1504 may be exchanged between the AP 1504 and the STA 106g simultaneously on the same channel. The following aspects relate at least to communication systems such as communication system 1500, where both the AP 1504 and the STA 106g are capable of performing full duplex communications.

While FIG. 15 shows only one station 106g, one of skill in the art would appreciate that a plurality of devices and/or stations such as 106g may communicate with the AP 1504 in the communications system 1500. Additionally, the communications system 1500 may also include some stations that are not capable of performing full duplex communications, as shown, for example, in the communications systems 100, 200, and 250. Therefore, in some aspects, an AP 1504, such as AP 1504 shown in FIG. 15, may be the AP 104, AP 204a-c, or AP 254A-c, but may also include the capability to communicate in full duplex with a single station, such as STA 106g. In some aspects, the AP 1504 may sense whether each station with which it is communication can communicate in full duplex. If it cannot, then the AP may communicate with that station with one or more of the methods described previously, such as process 1200 discussed with respect to FIG. 12A. If the station can communicate in full duplex, then one or more of the methods discussed below may be utilized to communicate with the station.

Figure 16A:
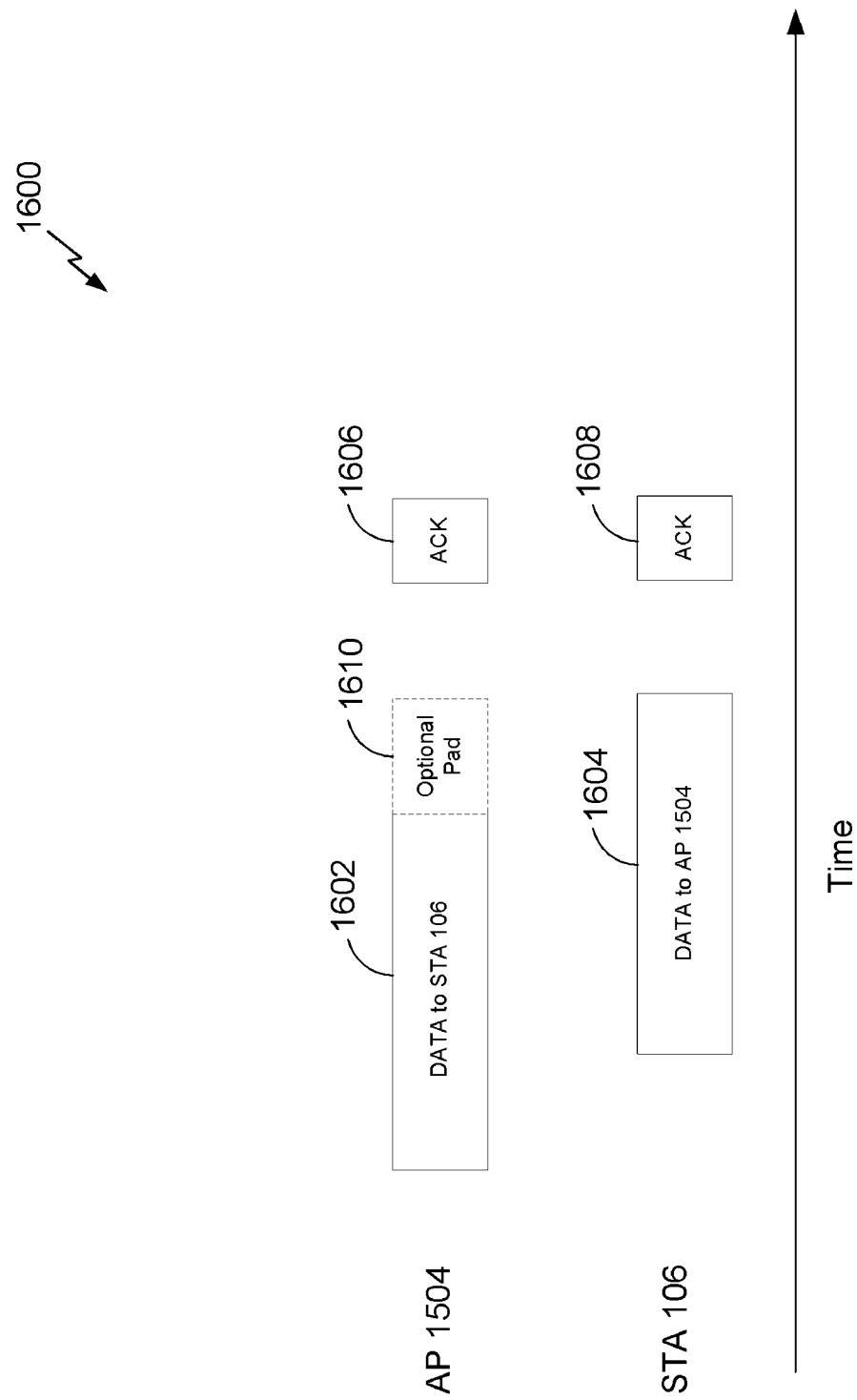
FIG. 16A illustrates a full duplex message exchange between an AP and a STA in one exemplary embodiment.

FIG. 16A illustrates a full duplex message exchange between an AP 1504 and a STA 106 in one exemplary embodiment of the wireless communications system 1500. The message exchange shown in FIG. 16A may be implemented when both the AP and the STA are capable of full duplex transmissions. Note that while communication exchange 1600 illustrates communication between an AP and a STA, the communication exchange 1600 could be performed between two STAs in some aspects. Communication exchange 1600 shows the use of data padding to ensure both an uplink and downlink transmission occur at substantially the same time. This may prevent at least a portion of an uplink transmission from being corrupted by interference generated by another wireless node where the uplink transmission is below a preamble or other detection threshold at the other wireless node.

Full duplex message exchange 1600 begins with the AP 1504 transmitting a data message 1602 to the STA 106. Upon initiating reception of the data packet 1602, the STA 106 first decodes a mac header included in the data packet 1602. As part of decoding the MAC header, STA 106 determines that the packet 1602 is transmitted by the AP 1504. For example, the STA 106 may identify a station address of the AP 1504 in the MAC header of the data packet 1602 that corresponds to the AP 1504. If the STA 106 has data available to send to the AP 1504 (for example, based on the station address identified in the MAC header), the STA 106 may imitate transmission of data packet 1604 to the AP 1504 while reception of the data packet 1602 is still in progress, as shown by the overlap of data packets 1602 and 1604 in FIG. 16.

After completion of the transmission of both data packets 1602 and 1604, each of AP 1504 and STA 106 transmits acknowledgements 1606 and 1608 for data packets 1602 and 1604 respectively. Each of the AP 1504 and STA 106 may determine when to transmit acknowledgements 1606 and 1608 respectively by decoding a duration field in each of data packets 1604 and 1602 respectively. For example, each of AP 1504 and STA 106 may determine an acknowledgment transmission time based on a maximum of the duration of the packet being transmitted and the duration of the packet being received.

In some aspects, the reception of the data packet 1602 may be corrupted by the transmission of data packet 1604 by the STA 106. This corruption may be caused by un-canceled self-interference at the beginning of transmission of the data packet 1604.

In some aspects, the risk of corruption may be reduced by the AP sending dummy data for a small interval once it sees that the STA 105 is transmitting. While the dummy data is being transmitted, the STA 106 may perform a channel estimate.

In some aspects, STA 106 may also buffer undecoded data from the data packet 1602 while transmitting data and while the channel estimate is being performed. The STA 106 may also decode data from the packet 1602, which was being stored in the buffer, based on the determined channel estimate.

In some other aspects, the reception of data packet 1604 by the AP 1504 may be affected by another device (not shown) on the wireless network. For example, this other device may begin transmission of its own data packet (not shown) after transmission of the data packet 1602 is completed. For example, this other device may determine the medium is available after transmission of data packet 1602 completes. To reduce the probability of this occurring, in some aspects, the AP 1504 may pad the length of the data packet 1602 such that transmission of the data packet 1602 completes at the same time that transmission of data packet 1604 completes. This is shown by pad 1610 in FIG. 16.

An alternative solution to this potential problem is for the STA 106 to transmit data packet 1604 such that the transmission of packet 1604 completes before or at the same time as the transmission of data packet 1602.

Figure 16B:
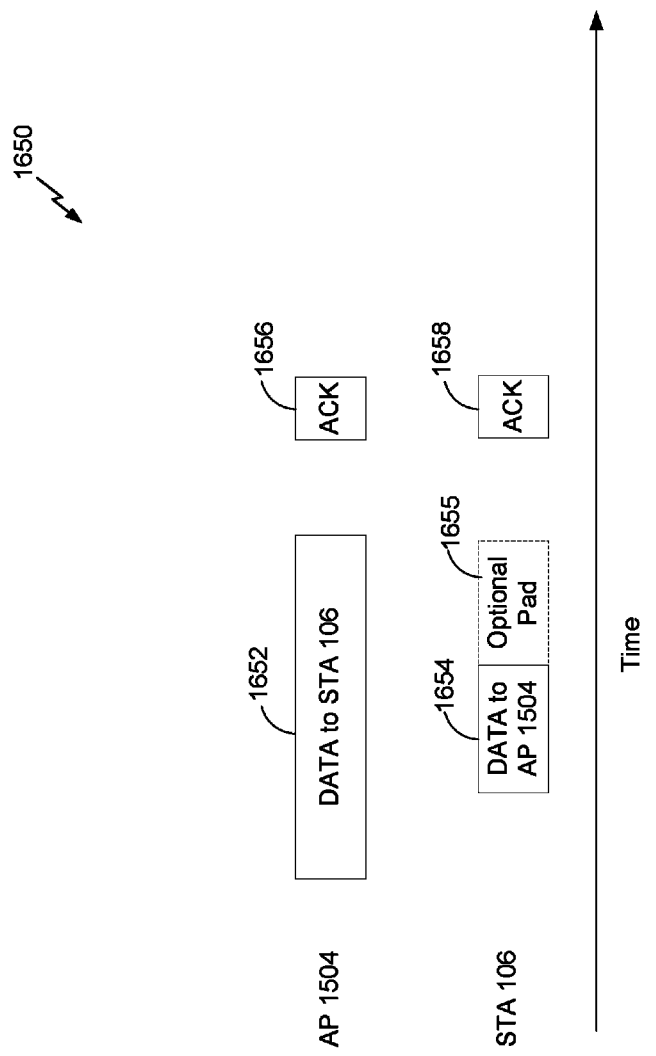
FIG. 16B illustrates a full duplex message exchange between an AP and a STA in one exemplary embodiment.

FIG. 16B illustrates a full duplex message exchange between an AP 1504 and a STA 106 in one exemplary embodiment of the wireless communications system 1500. The message exchange shown in FIG. 16B may be implemented when both the AP and the STA are capable of full duplex transmissions. Note that while communication exchange 1650 illustrates communication between an AP and a STA, the communication exchange 1650 could be performed between two STAs in some aspects.

Full duplex message exchange 1650 begins with the AP 1504 transmitting a data message 1602 to the STA 106. Upon initiating reception of the data packet 1652, the STA 106 first decodes a mac header included in the data packet 1652. As part of decoding the MAC header, STA 106 determines that the packet 1652 is transmitted by the AP 1504. For example, the STA 106 may identify an address of the AP 1504 in the MAC header of the data packet 1652 that corresponds to the AP 1504. If the STA 106 has data available to send to the AP 1504, the STA 106 may imitate transmission of data packet 1654 to the AP 1504 while reception of the data packet 1652 is still in progress, as shown by the overlap of data packets 1652 and 1654 in FIG. 16B.

After completion of the transmission of both data packets 1652 and 1654, each of AP 1504 and STA 106 transmits acknowledgements 1656 and 1658 for data packets 1652 and 1654 respectively. Each of the AP 1504 and STA 106 may determine when to transmit acknowledgements 1656 and 1658 respectively by decoding a duration field in each of data packets 1654 and 1652 respectively. For example, each of AP 1504 and STA 106 may determine an acknowledgment transmission time based on a maximum of the duration of the packet being transmitted and the duration of the packet being received. In another embodiment, the ACK is sent directly after the downlink data 1652. (with a small guard time in between) In this case, STA 106 will not send data beyond the end of the downlink data message 1652.

In some aspects, the reception of the data packet 1652 may be corrupted by the transmission of data packet 1654 by the STA 106. This corruption may be caused by un-canceled self-interference at the beginning of transmission of the data packet 1654.

In some aspects, the risk of corruption may be reduced by AP 1504 transmitting dummy data when it receives the beginning of the data packet 1654. While the dummy data is being transmitted, the STA 106 may perform a channel estimate.

In some aspects, STA 106 may also buffer undecoded data from the data packet 1652 while the channel estimate is being performed. Because STA 106 now has a channel estimate available, the risk of corruption caused by un-canceled self-interference may be reduced. The STA 106 may also decode data from the packet 1652, which was being stored in the buffer, based on the determined channel estimate.

In some other aspects, the reception of data packet 1652 by the STA 106 may be affected by another device (not shown) on the wireless network. For example, this other device may begin transmission of its own data packet (not shown) after transmission of the data packet 1654 is completed. For example, this other device may determine the medium is available after transmission of data packet 1654 completes. To reduce the probability of this occurring, in some aspects, the STA 106 may pad the length of the data packet 1655 such that transmission of the data packet 1654 completes at the same time that transmission of data packet 1652 completes. This is shown by pad 1655 in FIG. 16B.

An alternative solution to this potential problem is for the STA 106 to transmit data packet 1654 such that the transmission of packet 1654 completes at the same time as the transmission of data packet 1652.

FIG. 17A is a flowchart of one exemplary method of wireless communication in the wireless communications system 1500. In some aspects, process 1700 may be performed by the wireless device 402, illustrated in FIG. 4. In some aspects, process 1700 may be performed by the STA 106 described in FIG. 16.

In block 1705, a preamble of a first message is received. In the example provided in FIG. 16, the first message is message 1602. In block 1710, a source device of the first message is determined based on the preamble. In the example provided in FIG. 16, the source device of the message 1602 is the AP 1504. In some aspects, the preamble of the first message may be decoded before reception of the first message is complete. In block 1715, at least a portion of a second message is generated and output for transmission (i.e., transmitted) to the source device during at least a portion of a reception of a remaining portion of the first message. In the example of FIG. 16, the second message is the message 1604.

In some aspects, process 1700 includes determining a first duration of the first message. In some aspects, process 1700 also includes determining a second duration of the second message. In some aspects, process 1700 also includes transmitting an acknowledgement message to the first message based on the first duration and the second duration. For example, in some aspects, acknowledgement of the first message may be delayed until both transmission of the first and second messages is complete. In the example of FIG. 16, the transmitted acknowledgment message is the acknowledgment 1608.

Some aspects of process 1700 may further include performing channel estimation on the wireless network and buffering an undecoded portion of the first wireless message as it is received while the channel estimation is in progress. After the channel estimation is complete, the buffered portion of the first message may be decoded based on the channel estimate.

In some aspects of process 1700, process 1700 transmits dummy data to the destination device prior to transmitting the at least a portion of the first message.

In some aspects, process 1700 may only transmit the second message if the transmission of the second message can be completed before reception/transmission of the first wireless message is complete. Therefore, process 1700 may, in some aspects, base the transmission of the second message on a remaining duration of the first message relative to a duration of the second message. If the duration of the second message is less than a remaining duration of the first message, then the second message is transmitted in some aspects.

In some aspects, if the duration of the second message is such that transmission of the second message can be completed before transmission/reception of the first message, process 1700 may pad the second message such that completion of the transmission of the second message occurs substantially coincident with completion of the transmission/reception of the first message. In some aspects, process 1700 may determine a duration of the first message based on the preamble.

FIG. 17B is a functional block diagram of an exemplary wireless device 1720 that may be employed within the wireless communication system 1500. The device 1720 comprises a receiving circuit 1725, a determining circuit 1726, and a generating and transmitting circuit 1728. The receiving circuit 1725 may be configured to perform one or more of the functions discussed above with respect to the block 1705 illustrated in FIG. 17A. The receiving circuit 1725 may include the receiver 412. The device 1720 further comprises a determination circuit 1726. The determination circuit 1726 may be configured to perform one or more of the functions discussed above with respect to block 1710 illustrated in FIG. 17A. In some aspects, the determination circuit 1726 may include the processor 404. The device 1720 further comprises a transmitting circuit 1728. The generating and transmitting circuit 1728 may be configured to perform one or more of the functions discussed above with respect to block 1715 illustrated in FIG. 17A. In some aspects, the transmitting circuit 1728 may include the transmitter 410 and/or processor 404.

Figure 17C:
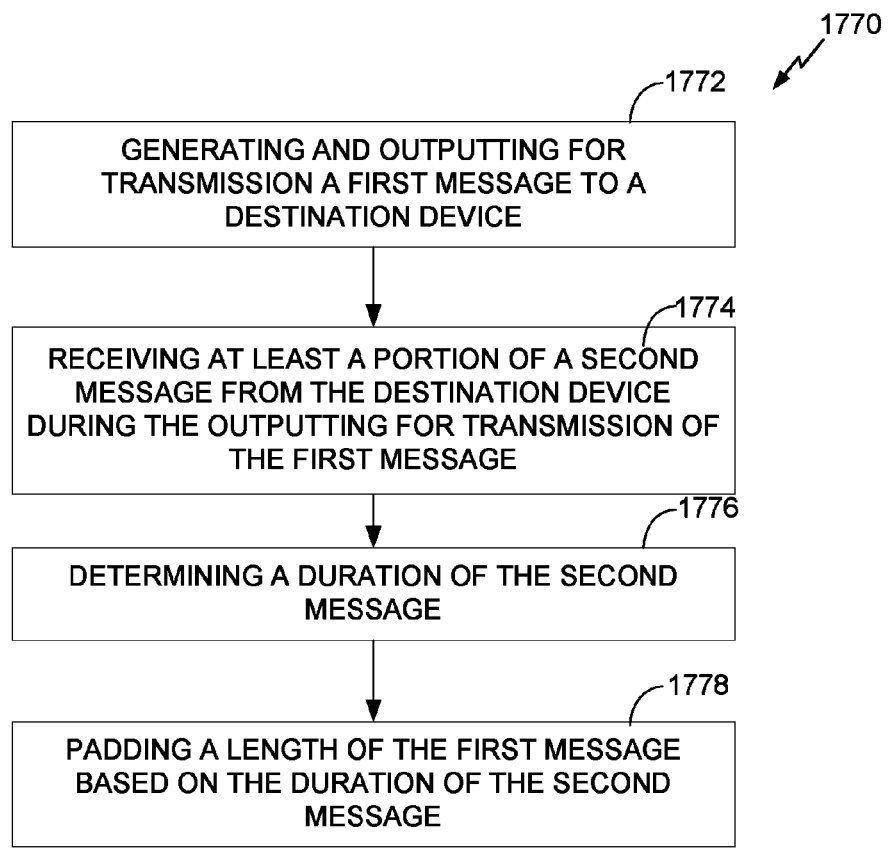
FIG. 17C is a flowchart of one exemplary method of wireless communication.

FIG. 17C is a flowchart of one exemplary method of wireless communication within the wireless communications system 1500. In some aspects, process 1700 may be performed by the wireless device 402, illustrated in FIG. 4. In some aspects, process 1770 may be performed by the AP 1504 described in FIG. 16A.

In block 1772, a first message is generated and output for transmission (i.e., transmitted) to a destination device. In the example of FIG. 16A, the destination device is the STA 106, and the first message is the message 1602. In block 1774, at least a first portion of a second message from the destination device is received during output for transmission of the first message. In the example of FIG. 16a, the second message is the message 1604. In block 1776, a duration of the second message is determined. For example, the duration of the second message may be determined by decoding a preamble of the second message while the reception of the second message is still in progress. In block 1776, a length of the first message is padded based on the duration of the second message. For example, as described with respect to the example of FIG. 16A, the length of the first message may be padded such that completion of the transmission of the first message occurs at substantially the same time as a completion of the transmission of the second message. This may prevent a third wireless device from initiating transmission during reception of the second wireless message, if its position in the network enables it to detect transmission of the first message but not transmissions of the second message. For example, a received signal strength of the first wireless message may be above a detection threshold while a received signal strength of the second wireless message may be below the detection threshold. Therefore, by padding the first wireless message, process 1770 may prevent this third wireless device from transmitting and potentially interfering with reception of the second wireless message.

Figure 17D:
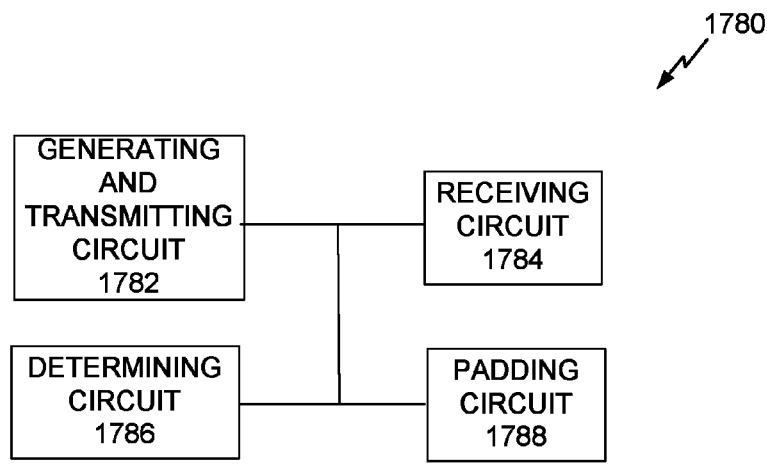
FIG. 17D is a functional block diagram of an exemplary wireless device that may be employed within one or more of the disclosed wireless communication systems.

FIG. 17D is a functional block diagram of an exemplary wireless device 1780 that may be employed within the wireless communication system 1500. The device 1780 comprises a generating and transmitting circuit 1782, a receiving circuit 1784, a determining circuit 1786, and a padding circuit 1788. The generating and transmitting circuit 1782 may be configured to perform one or more of the functions discussed above with respect to the block 1772 illustrated in FIG. 17C. The generating and transmitting circuit 1782 may include the transmitter 410 and/or processor 404. The device 1780 further comprises a receiving circuit 1784. The receiving circuit 1784 may be configured to perform one or more of the functions discussed above with respect to block 1774. In some aspects, the receiving circuit 1784 may include the receiver 412. The device 1780 further comprises a determining circuit 1786. The determining circuit 1786 may be configured to perform one or more of the functions discussed above with respect to block 1776 illustrated in FIG. 17C. In some aspects, the determining circuit 1776 may include the processor 404. The device 1780 further comprises a padding circuit 1788. The padding circuit 1788 may be configured to perform one or more of the functions discussed above with respect to block 1778 illustrated in FIG. 17C. In some aspects, the padding circuit 1788 may include the processor 404.

Figure 18:
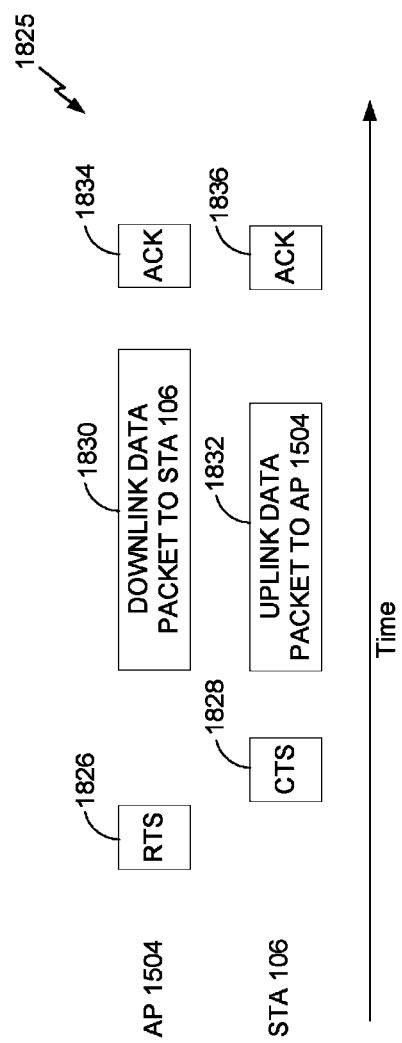
FIG. 18 illustrates a full duplex message exchange between an AP and a STA in one exemplary embodiment.

FIG. 18 illustrates a full duplex message exchange between an AP 1504 and a STA 106 in one exemplary embodiment of the wireless communications system 1500. The message exchange shown in FIG. 18 may be implemented when both the AP and the STA are capable of full duplex transmissions. Note that while communication exchange 1825 illustrates communication between an AP and a STA, the communication exchange 1825 could be performed between two STAs in some aspects.

Full duplex message exchange 1825 begins with the AP 1504 transmitting a modified RTS message 1826. In some aspects, the modified RTS message 1826 may substantially conform to the format of RTS message 1000 shown in FIG. 10A. The modified RTS message 1826 indicates an uplink transmission from the STA 106 is permitted during a duration indicated by the RTS message 1826.

In response to receiving the RTS message 1826, STA 106 transmits a CTS message 1828. The CTS message may substantially conform with the CTS message 1050 shown in FIG. 10B. The CTS message 1828 indicates whether the STA 106 will perform uplink transmission during the time period indicated by the duration field included in the RTS message 1826. If the STA 106 indicates it will not perform an uplink transmission in the CTS message 1828, the AP 1504 may be able to turn off or disable its full duplex reception to save power during at least the transmission of data packet 1830 discussed below. FIG. 18 assumes that STA 106 indicates in CTS message 1828 that it will perform an uplink transmission during a time period indicated by the duration field of the RTS message 1926.

AP 1504 then transmits the downlink data packet 1830 to the STA 106, while the STA 106 transmits uplink packet 1832 to the AP 1504. In the illustrated aspect of FIG. 18, any uplink transmission of the STA 106 in response to the RTS 1826, such as uplink data packet 1832, must be completed before or at the same time as a completion of a corresponding downlink transmission from AP 1504 (such as downlink data packet 1830). By completing the uplink transmission before or at the same time as the downlink transmission, the NAV set by the RTS 1826 covers the maximum duration of both the downlink and the uplink transmission. The uplink packet may be padded with dummy data so that the duration exactly matches that of the downlink packet.

Acknowledgement packets 1834 and 1836 are then transmitted by the AP 1504 and STA 106 respectively to acknowledge each of the uplink data packets 1832 and downlink data packets 1830 respectively. Because both STA 106 and AP 1504 are capable of full duplex transmissions, the acknowledgement packets 1834 and 1836 may be transmitted at least partially simultaneously.

Figure 19:
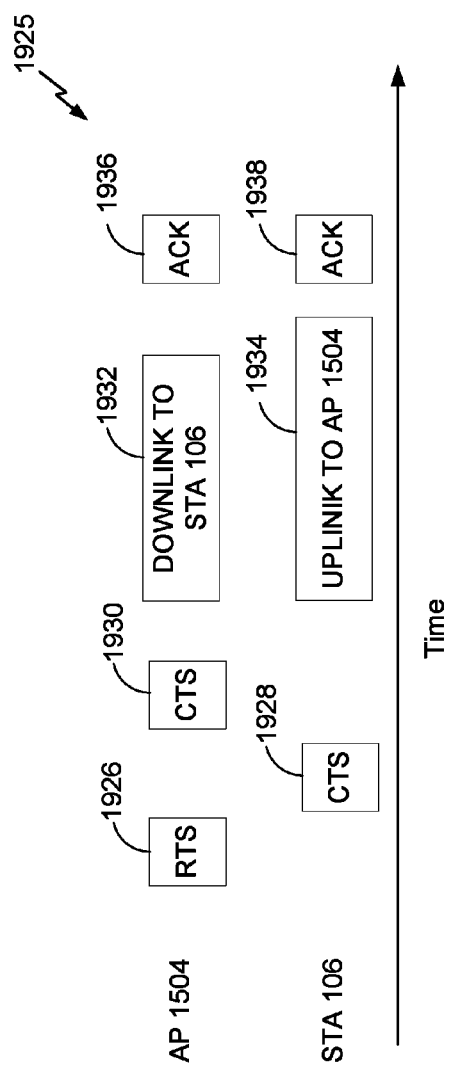
FIG. 19 illustrates a full duplex message exchange between an AP and a STA in one exemplary embodiment.

FIG. 19 illustrates a full duplex message exchange between an AP 1504 and a STA 106 in one exemplary embodiment of the wireless communications system 1500. The message exchange shown in FIG. 19 may be implemented when both the AP and the STA are capable of full duplex transmissions. Note that while communication exchange 1925 illustrates communication between an AP and a STA, the communication exchange 1925 could be performed between two STAs in some aspects.

Full duplex message exchange 1925 begins with the AP 1504 transmitting a modified RTS message 1926. In some aspects, the modified RTS message 1926 may substantially conform to the format of RTS message 1000 shown in FIG. 10A. The modified RTS message 1926 indicates an uplink transmission from the STA 106 is permitted during a duration indicated by the RTS message 1926.

In response to receiving the RTS message 1926, STA 106 transmits a CTS message 1928. The CTS message may substantially conform with the CTS message 1900 shown in FIG. 19A. The CTS message 1928 indicates whether the STA 106 will perform uplink transmission during the time period indicated by the duration field included in the RTS message 1926. If the STA 106 indicates it will not perform an uplink transmission in the CTS message 1928, the AP 1504 may be able to turn off or disable its full duplex reception to save power during at least the transmission of data packet 1932 discussed below.

If STA 106 indicates, via CTS message 1928, it will transmit uplink data during the time period indicated by the RTS 1926, then, consistent with CTS message format 1050, the CTS message 1928 further indicates a duration of the uplink transmission. The duration of the uplink transmission indicated by the CTS 1928 may be less than, equal to, or greater than the duration indicated by the RTS message 1926. If the duration indicated by the CTS message 1928 is greater than the duration of the downlink transmission indicated by the RTS message 1928, the NAV set by the RTS message 1926 will be insufficient to protect the entire uplink transmission. Therefore, upon receiving the CTS message 1928 indicating an uplink transmission duration longer than a downlink transmission duration, the AP 1504 may transmit a CTS 1930 indicating the duration also indicated by the CTS 1928. The CTS 1930 updates the NAV to protect the full duration of the uplink transmission by the STA 106, thus being set to cover the maximum duration of both the uplink and downlink transmissions.

Next, the AP 1504 transmits downlink data 1932 to the STA 106, while the STA 106 transmits uplink data 1934 to the AP 1504. Each of downlink data 1932 and uplink data 1934 are then acknowledged by acknowledgment packets 1938 and 1936 respectively.

The AP 1504 and the STA 106 may also pre-evaluate self-interference cancellation qualities by checking the self-interference of the RTS message 1926 and CTS messages 1928 and 1930 communicated. In some aspects, the AP 1504 may transmit a CTS 1930 to indicate no full-duplex transmissions will take place. In some aspects, the RTS message 1926 and CTS messages 1928/1930 may be used to predict a full duplex rate. The AP 1504 and the STA 106 may be configured to measure residual self-interference based on the RTS 1926 and CTS messages 1928/1930 and determine a signal-to-interference-noise ratio (i.e., an upper limit of information transfer rate). Once the full duplex rate is determined, the transmission rate may be communicated by the CTS message 1930 along with the NAV for both the AP 1504 and the STA 106. However, if the CTS message 1928 from the STA 106 indicates no full duplex communication, then the communications between AP 1504 and STA 106 may be similar to conventional RTS/CTS communications, which may comprise the AP 1504 transmitting an RTS message 1926 and the STA 106 responding with a CTS message 1928. Then, the AP 1504 may transmit a data packet while the STA 106 only receives the data packet, after which the STA 106 transmits an acknowledgement message, and the message repeat. In some aspects, the RTS message 1926 and the CTS message 1928/1930 may be implemented in new standalone frames or messages that may be used only for full duplex communication setup. The RTS message 1926 may also be referred to as a full duplex request and the CTS message 1928 may be referred to as a full duplex response, and the CTS message 1930 may be referred to as a full duplex control message. In some aspects, these full duplex request and response messages may be combined with existing RTS and CTS messages, respectively.

In some aspects, the RTS message 1926 and CTS messages 1928/1930 may not be standalone message, but rather may be incorporated or integrated into other messages or communications. For example, the RTS message 1926 and the CTS messages 1928/1930 may be incorporated or integrated into at least one of a beacon, a full duplex request, a full duplex response, an association request, an association response, a probe request, or a probe response. In some other aspects, some combination of the RTS message 1926 and the CTS messages 1928/1930 may be incorporated or integrated into any other communication or message between the AP 1504 and the STA 106.

In some aspects, the AP 1504 or the STA 106 may be configured to indicate a capability to communicate via a full duplex communication via a message or communication. In some aspects, this indication may be in the form of a field communicated in the header or in an additional field in any of the frames of FIGS. 10A-10D, or in a field of any other message as described above (i.e., full duplex request/response, beacon, etc.). In some aspects, the AP 1504 or the STA 106 may be configured to only participate in full duplex communications. Accordingly, the AP 1504 may only transmit a first message concurrent with receiving a second message from the STA 106, wherein the STA 106 is capable of full duplex communication.

In some aspects, the AP 1504 and the STA 106 may indicate full duplex capabilities in either the RTS or CTS messages, in the MAC header of a data packet, or upon association with each other. In some aspects, if AP 1504 and STA 106 know data packet 1932 availability and message durations in advance, the communications may proceed without the CTS message 1930 being communicated from the AP 1504 to the STA 106. In some aspects, the RTS (i.e., request messages) and CTS (i.e., response messages) may be implicitly incorporated into other messages communicated. For example, the RTS may be incorporated into a data packet communicated from the AP 1504 to the STA 106, while the CTS may be incorporated into the ACK packet communicated to the AP 1504 from the STA 106.

Figure 20:
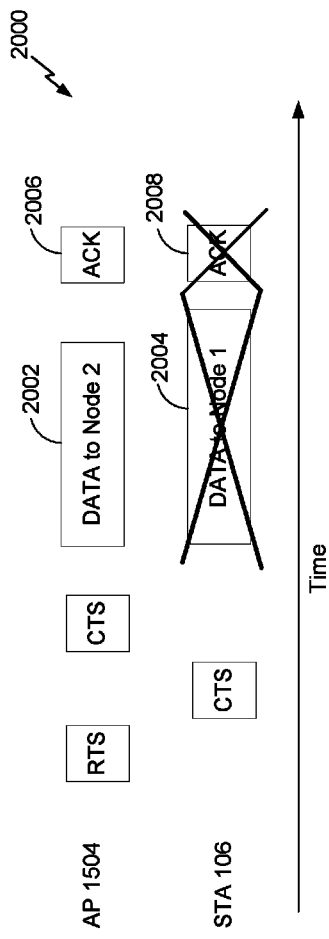
FIG. 20 illustrates a full duplex message exchange between an AP and a STA in one exemplary embodiment.

FIG. 20 illustrates a full duplex message exchange between an AP 1504 and a STA 106 in one exemplary embodiment of the wireless communications system 1500. The message exchange shown in FIG. 20 may be implemented when both the AP and the STA are capable of full duplex transmissions. Note that while communication exchange 2000 illustrates communication between an AP and a STA, the communication exchange 2000 could be performed between two STAs in some aspects.

FIG. 20 illustrates that in some aspects, simultaneous transmission of downlink data 2002 and uplink data 2004 within the wireless communications system 1500 may result in corruption of uplink data 2004 at the AP 1504 due to high self-interference. This may be caused by poor self-interference cancellation by the AP 1504. Because each of acknowledgment packets 2006 and 2008 are also transmitted simultaneously using full duplex transmission, the high self-interference may also result in corruption of downlink acknowledgement packet 2008 sent on the uplink (due to self-interference with uplink acknowledgement packet 2006), as shown in FIG. 20. Accordingly, both data packets 2002 and 2004 are lost due to the high self-interference and poor self-interference cancellation of AP 1504.

Figure 21:
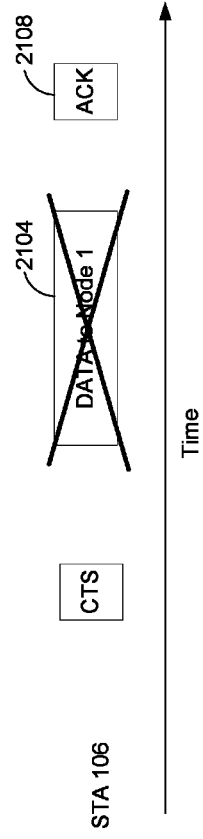
FIG. 21 illustrates another full duplex message exchange between an AP and a STA in one exemplary embodiment.

FIG. 21 illustrates another full duplex message exchange between an AP 1504 and a STA 106 in one exemplary embodiment of the wireless communications system 1500. The message exchange shown in FIG. 21 may be implemented when both the AP and the STA are capable of full duplex transmissions. Note that while communication exchange 2100 illustrates communication between an AP and a STA, the communication exchange 2100 could be performed between two STAs in some aspects.

In contrast to communication exchange 2000 shown in FIG. 20, the acknowledgements 2106 and 2108 transmitted in communication exchange 2100 are staggered. For example, uplink acknowledgement packet 2106 is transmitted before downlink acknowledgement packet 2108. In some aspects, the acknowledgement packet 2108 may be transmitted a given inter-frame spacing after the end of acknowledgment packet 2106. In some aspects, because the acknowledgment packets are staggered, reception of downlink acknowledgement packet 2108 by the AP 1504 may not be subject to the self-interference caused by transmission of an uplink acknowledgement packet, as occurred in communication exchange 2000. Because of this, downlink acknowledgement packet 2208 may be received correctly by the AP 1504. While the uplink packet 2104 may still be subject to self-interference caused by transmission of the downlink data packet 2102, the acknowledgement packets 2106 and 2108 may not be affected by high self-interference when staggered in time. Thus, only the data packet 2104 is lost where the acknowledgement packets 2106 and 2108 are staggered.

Figure 22:
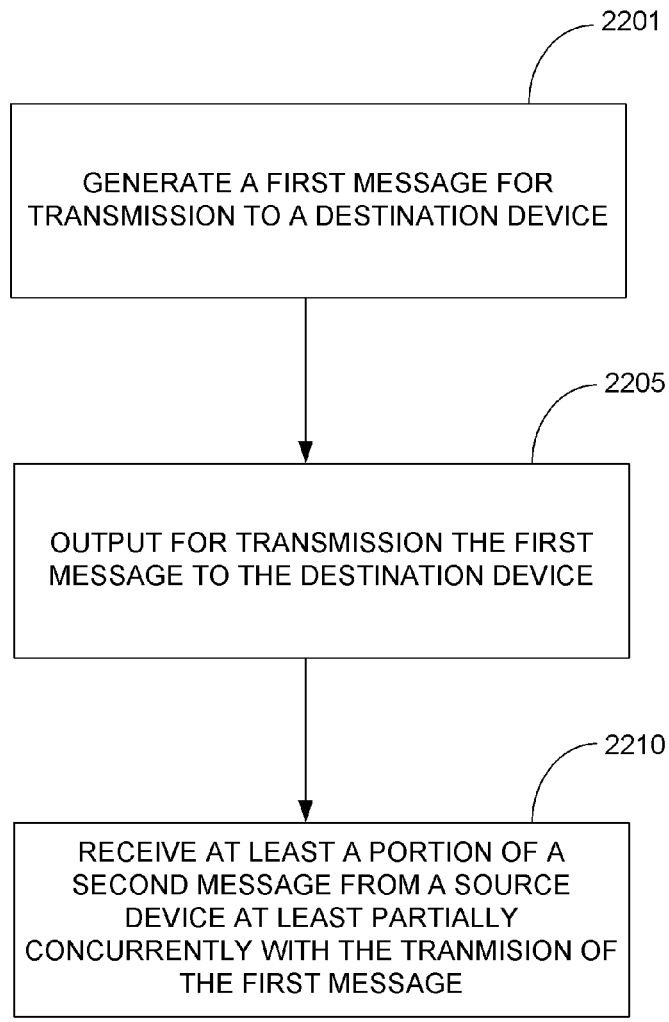
FIG. 22 is a flowchart of one exemplary method of wireless communication.

FIG. 22 is a flowchart of one exemplary method of wireless communication in one or more of the wireless communications systems 100, 200, 250 or 1500. In some aspects, process 2200 may be performed by the wireless device 402, illustrated in FIG. 4.

In block 2201, a first message is generated for transmission to a destination device. In block 2205, the first message is output for transmission (i.e., transmitted) to a destination device. In block 2210, at least a portion of a second message is received from a source device at least partially concurrently with the transmission of the first message.

In some aspects, a preamble of the second message is received and decoded to determine that the source device is the source of the second message. In some aspects, the destination device is determined based on the decoded preamble. In some aspects, a duration of the second message is determined based on the decoded preamble. The first message may be padded in some aspects based on the decoded preamble. For example, in some aspects, the first message may be padded to ensure that the transmission of the first message completes within a threshold period of time of the completion of the transmission/reception of the second message.

In some aspects, the source device is determined by first determining the destination device, and then determining a plurality of signal strength metrics based on the destination device. Each of the signal strength metrics may represent a strength of a signal received at the destination device. The source device may then be determined based on the signal strength metrics. For example, in some aspects, a device with a signal strength at the destination device below a threshold may be selected as the source device.

In some aspects, process 2200 further includes receiving an acknowledgment to the first message. In some aspects, process 2200 includes generating and transmitting an acknowledgment to the second message.

In some aspects, a duration of the first message and the second message is determined, and the acknowledgment of the second message is transmitted based on the durations. For example, in some aspects, the acknowledgment of the second message will be transmitted after transmission/reception of the first and second messages is complete.

In some aspects, for example, in access point devices performing process 2200, process 2200 includes generating and transmitting a scheduling message, the scheduling message indicating the source device is granted permission to transmit the second message during a transmission opportunity identified by the scheduling message. In some aspects, the scheduling message is generated as a request-to-send message. In some aspects, process 2200 generates and transmits an acknowledgment timing message, the acknowledgement timing message indicating a time period for acknowledging the first message and/or the second message. In some aspects, the acknowledgment timing message and the scheduling message are the same message. Therefore, in some aspects, the acknowledgment timing message is a request-to-send message.

In some of these aspects, the scheduling message is generated to indicate a duration of the first message. For example, as shown in FIGS. 18-19, a request-to-send message may indicate the duration of a downlink transmission that an originating access point plans to send to a station. In some aspects, the scheduling message may define a plurality of transmission opportunities, with different downlink receivers and/or uplink transmitters scheduled for communication during each of the plurality of transmission opportunities. In some aspects, one downlink transmission may span multiple transmission opportunities, while multiple uplink transmissions are performed during the single downlink transmission. Similarly, one uplink transmission may be scheduled to span multiple transmission opportunities, while multiple downlink transmissions are performed during the single uplink transmission. These scheduling messages may also define time period for acknowledging the multiple uplink and/or downlink transmissions identified by the scheduling message.

In some of these aspects, a clear-to-send message is received from the source device. This clear-to-send message may be received in response to transmission of the scheduling message (as the scheduling message is a request-to-send message in some aspects). In these aspects, process 2200 may include decoding the clear-to-send message to determine whether the source device will transmit the second message during the transmission opportunity identified by the scheduling message discussed above.

In some of these aspects, the clear to-send message may also be decoded to determine a requested duration of the second message. In some aspects the first message is padded based on the requested duration.

In some of these aspects, process 2200 transmits a second scheduling message, the second scheduling message indicating a maximum of the requested duration and a duration of the first message. By transmitting the second scheduling message, a device performing process 2200 may extend the NAV to ensure a longer uplink transmission has sufficient protection.

In some other aspects, for example, in a station device operating on a wireless network and performing process 2200, a scheduling message is received. These aspects may decode the scheduling message to determine that the apparatus performing process 2200 is granted permission to transmit the first message during a transmission opportunity identified by the scheduling message. In some of these aspects, process 2200 decodes the scheduling message as a request-to-send message. In some aspects, the scheduling message is decoded to determine a duration of the transmission opportunity. In some aspects, for example, if the first message is shorter than the duration indicated in the scheduling message, process 2200 may include padding the length of the first message to increase its duration to be closer to the duration indicated in the scheduling message. For example, process 2200 may pad the first message such that a completion time of the first message is within a threshold time of a completion of the second message, or within a threshold period of time of a time indicated by the duration.

In some of these aspects, process 2200 includes receiving an acknowledgment timing message, and the acknowledgement timing message is decoded to determine when to acknowledge the second message. In some aspects, the acknowledgment timing message and the scheduling message are the same message. Therefore, the acknowledgment timing message may be a request-to-send message with additional data fields defining the timing of one or more acknowledgments.

In some of these aspects, process 2200 includes generating and transmitting a clear-to-send message. The clear-to-send message is generated to indicate a device or apparatus performing process 2200 will transmit the first message during the transmission opportunity. In some of these aspects, the clear-to-send message is further generated to indicate a requested duration of the first message. For example, in some aspects, the duration indicated by the received scheduling message, described above, may be insufficient to cover the duration needed to transmit the first message. By indicating a requested duration in the clear-to-send message, a device performing process 2200 may be able to obtain a transmission opportunity of an increased duration that will provide enough time to transmit the first message in this embodiment.

In some aspects requesting a longer duration by using the clear-to-send message, a second scheduling message may be received after the clear-to-send message is transmitted. This second scheduling message may indicate an updated duration of the transmission opportunity. The updated duration may be longer than the original duration indicated in the first scheduling message. This updated duration may be sufficiently long such that the first message may be transmitted within the updated duration.

Figure 23:
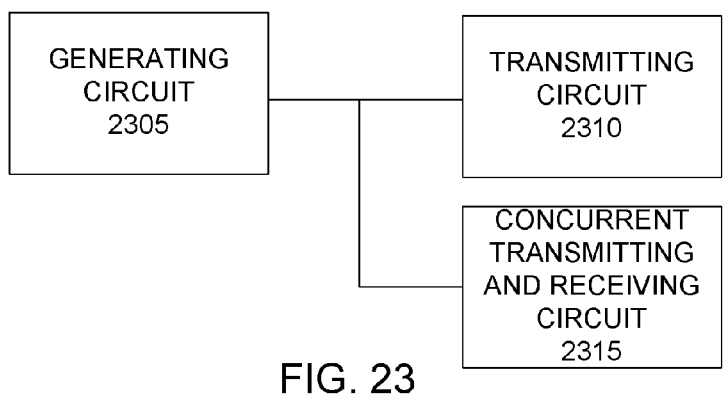
FIG. 23 is a functional block diagram of an exemplary wireless device that may be employed within one or more of the disclosed wireless communication systems.

FIG. 23 is a functional block diagram of an exemplary wireless device 2300 that may be employed within one or more of the wireless communication systems 100, 200, 250 and/or 1500. The device 2300 comprises a generating circuit 2305, transmitting circuit 2310, and a concurrent transmitting and/or receiving circuit 2315. The generating circuit 2305 may be configured to perform one or more of the functions discussed above with respect to block 2201. In some aspects, the generating circuit 2305 may be configured to generate a scheduling message, generate an acknowledgement timing message, and generate a clear-to-send message. In some aspects, the generating circuit 2305 may include the processor 404 and/or DSP 420. In some aspects, the means for generating may include the generating circuit 2305.

The transmitting circuit 2310 may be configured to perform one or more of the functions discussed above with respect to block 2205. In some aspects, the means for transmitting may be further configured to transmit an acknowledgement for the second message, transmit a scheduling message, and transmit a clear-to-send message. In some aspects, the transmitting circuit 2310 may include the transmitter 410. In some other aspects, the transmitting circuit 2310 may include the processor 404. In some aspects, means for transmitting may include the transmitting circuit 2310.

The device 2300 further comprises a concurrent transmitting and/or receiving circuit 2315. The concurrent transmitting and/or receiving circuit 2315 may be configured to perform one or more of the functions discussed above with respect to block 2210. In some aspects, the concurrent transmitting and/or receiving circuit 2315 may be configured to receive a preamble of a second message, receive a clear-to-send message from the source device, receive a scheduling message, an acknowledgement timing message, In some aspects, the concurrent transmitting and/or receiving circuit 2315 may include the receiver 412 and/or the processor 404. In some other aspects, the concurrent transmitting and/or receiving circuit 2315 may include the processor 404 and/or DSP 420. In some aspects, means for receiving may include the concurrent transmitting and/or receiving circuit 2315. In some aspects, means for decoding may include the receiving circuit 2310.

Some aspects of the device 2300 further comprise a determining circuit (not shown). The determining circuit may be configured to perform one or more of the functions discussed above with respect to process 2200 and/or determine the destination device, a plurality of signal strength metrics based on the destination device, or the source device based on the signal strength metrics. In some aspects, the determining circuit may be configured to determine a second duration of the second message. In some aspects, the determining circuit may include the processor 204 and/or DSP 420. In some aspects, the means for determining may include the determining circuit.

Some aspects of the device 2300 further comprise an identifying circuit (not shown). The identifying circuit may be configured to identify one or more of a plurality of devices with a signal strength below or equal to a first threshold value. In some aspects, the identifying circuit may include the processor 204 and/or DSP 420. In some aspects, the means for identifying may include the identifying circuit.

Some aspects of the device 2300 further comprise an selecting circuit (not shown). The selecting circuit may be configured to select the source device from a plurality of identified devices. In some aspects, the selecting circuit may include the processor 204 and/or DSP 420. In some aspects, the means for selecting may include the selecting circuit.

Some aspects of the device 2300 further comprise an selecting circuit (not shown). The selecting circuit may be configured to select the source device from a plurality of identified devices. In some aspects, the selecting circuit may include the processor 204 and/or DSP 420. In some aspects, the means for selecting may include the selecting circuit.

Some aspects of the device 2300 further comprise an padding circuit (not shown). The padding circuit may be configured to pad a length of a first message based on the duration of a second message, pad the length of a first message so that a difference in a completion time of the transmission of the first message and a completion of a reception of a second message is below or equal to a second threshold value, and pad the first message based on a duration. In some aspects, the padding circuit may include the processor 204 and/or DSP 420. In some aspects, the means for padding may include the padding circuit.

Some aspects of the device 2300 further comprise an decoding circuit (not shown). The decoding circuit may be configured to decode a clear-to-send message, decode a scheduling message, and decode an acknowledgment timing message. In some aspects, the decoding circuit may include the processor 204 and/or DSP 420. In some aspects, the means for decoding may include the decoding circuit.

Figure 24A:
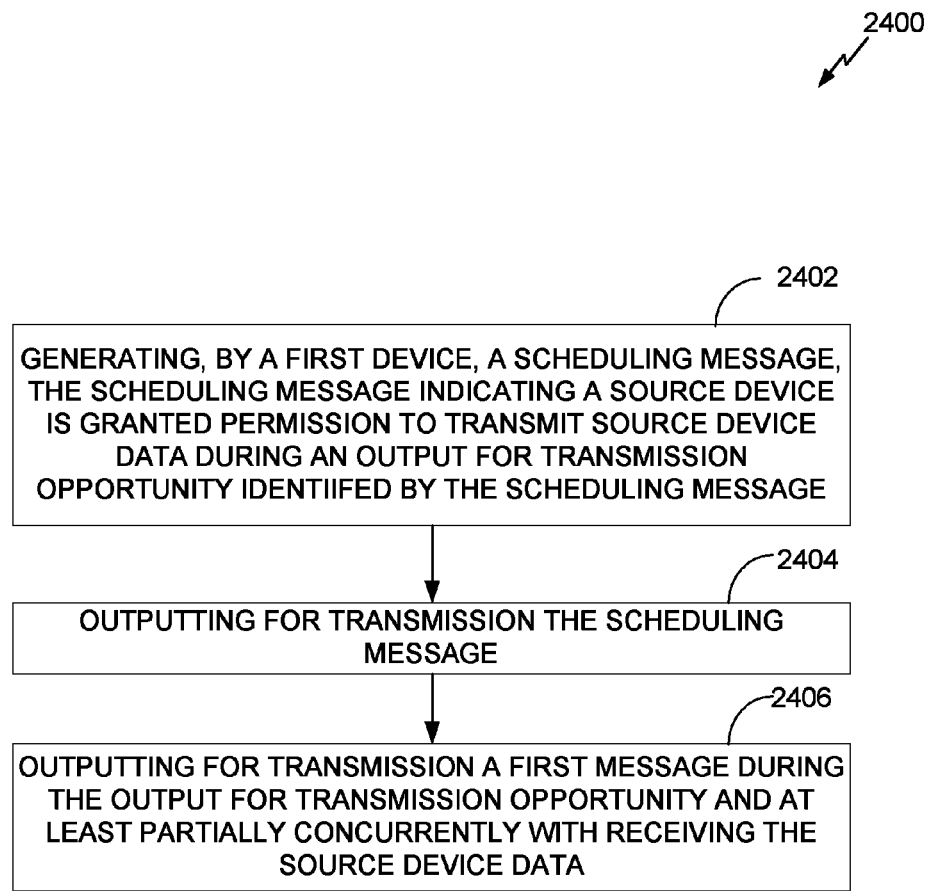
FIG. 24A is a flowchart of one exemplary method of wireless communication.

FIG. 24A is a flowchart of one exemplary method of wireless communication within the wireless communications system 1500. In some aspects, process 2400 may be performed by the wireless device 402, illustrated in FIG. 4. In some aspects, process 2400 may be performed by an access point. Process 2400 demonstrates the use of a scheduling message to schedule full duplex communications on the wireless communications system 1500. In some aspects, the scheduling message may be any of the scheduling messages shown in FIGS. 10A-D.

In block 2402, a scheduling message is generated by a first device. The scheduling message indicates a source device is granted permission to transmit source device data during a transmission opportunity identified by the scheduling message. In some aspects, the scheduling message may be a request-to-send message. In some other aspects, the scheduling message may not be a request-to-send message. For example, the scheduling message may be a message dedicated to providing information associated with transmission scheduling information. In some aspects, process 2400 generates the scheduling message to indicate a maximum duration of the transmission opportunity.

In block 2404, the scheduling message is output for transmission (i.e., transmitted). In some aspects, the scheduling message may be broadcast or multicast. In some aspects, the scheduling message may be unicast to the source device.

In some aspects, process 2400 includes receiving a clear-to-send message from the source device. The clear-to-send message may be transmitted by the source device in response to the source device receiving the scheduling message. In these aspects, the clear-to-send message may be decoded to indicate whether the source device will transmit data during the transmission opportunity. In some aspects, the clear-to-send message may be decoded to indicate a duration of a transmission by the source device during the transmission opportunity.

In some aspects, process 2400 may further include generating and transmitting a second clear-to-send message. The second clear-to-send message may be generated to indicate a maximum of the duration of the transmission indicated by the source device in the first clear-to-send message, and the duration of the first message.

In block 2406, a first message is transmitted during the transmission opportunity identified by the scheduling message. The message is transmitted at least partially concurrently with receiving the source device data. Therefore, full duplex transmission occurs for at least a portion of the transmission of the first message.

In some aspects, process 2400 further includes generating an acknowledgement timing message. The acknowledgement timing message indicates one or more time periods for acknowledging messages transmitted during the transmission opportunity. For example, the one or more time periods may indicate when the first message and/or the source device data should be acknowledged. In some aspects, process 2400 includes transmitting an acknowledgement of the source device data during a time period indicated by the acknowledgment timing message. In some aspects, the acknowledgment timing message is the scheduling message. In some aspects, the acknowledgment timing message is a request-to-send message. In some aspects, the acknowledgement timing message is a clear-to-send message.

Figure 24B:
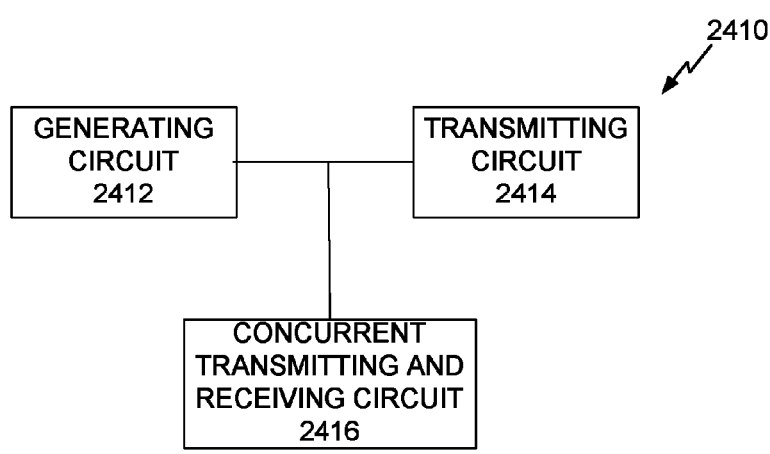
FIG. 24B is a functional block diagram of an exemplary wireless device that may be employed within one or more of the disclosed wireless communication systems.

FIG. 24B is a functional block diagram of an exemplary wireless device 2410 that may be employed within the wireless communication system 1500. The device 2410 comprises a generating circuit 2412, a transmitting circuit 2414, and a concurrent transmitting and receiving circuit 2416. The generating circuit 2412 may be configured to perform one or more of the functions discussed above with respect to the block 2402 illustrated in FIG. 24A. In some aspects, the generating circuit 2412 may include the processor 404. The device 2410 further comprises a transmitting circuit 2414. The transmitting circuit 2414 may be configured to perform one or more of the functions discussed above with respect to block 2404. In some aspects, the transmitting circuit 2414 may include the transmitter 410. The device 2410 further comprises a concurrent transmitting and receiving circuit 2416. The concurrent transmitting and receiving circuit 2416 may be configured to perform one or more of the functions discussed above with respect to block 2406. In some aspects, the concurrent transmitting and receiving circuit 2416 may include the transmitter 410 and/or the receiver 412.

Figure 25A:
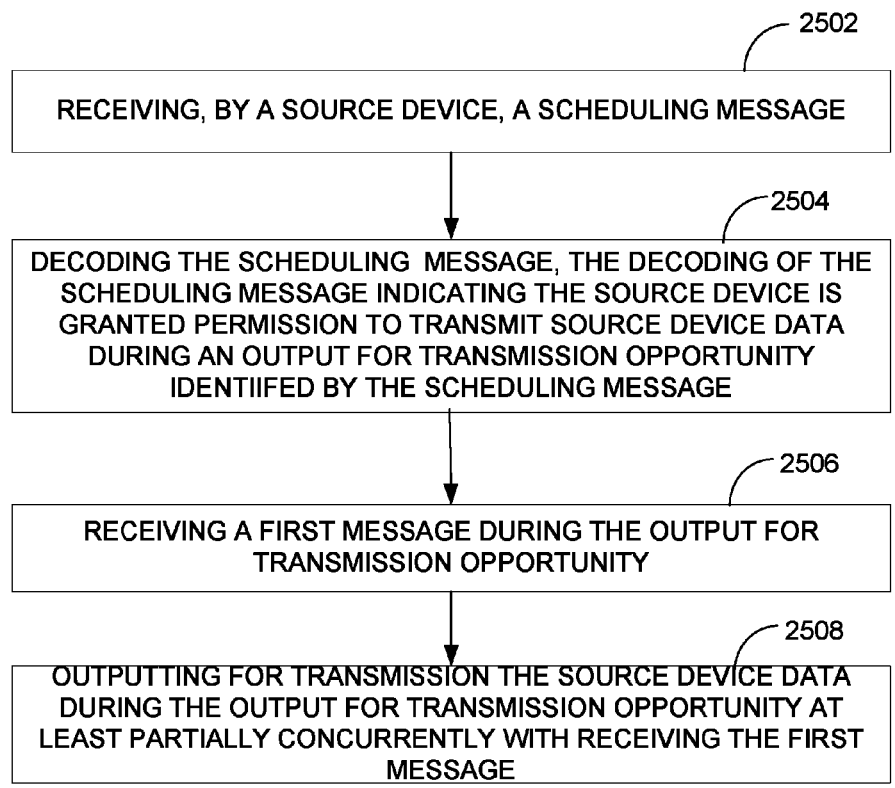
FIG. 25A is a flowchart of one exemplary method of wireless communication.

FIG. 25A is a flowchart of one exemplary method of wireless communication within aspects of the wireless communications system 1500. In some aspects, process 2500 may be performed by the wireless device 402, illustrated in FIG. 4. In some aspects, process 2500 may be performed by a station. Process 2500 provides a method of performing full duplex communication based on reception of a scheduling message, such as any of the scheduling messages illustrated in FIGS. 10A-D. In some aspects, the scheduling message may be a request-to-send message.

In block 2502, a scheduling message is received by a source device. In block 2504, the scheduling message is decoded. When decoded, the scheduling message indicates the source device is granted permission to transmit source device data during a transmission opportunity identified by the scheduling message. In some aspects, the scheduling message may be a request-to-send message. In some other aspects, the scheduling message may not be a request-to-send message. For example, the scheduling message may be a message dedicated to providing information associated with transmission scheduling information.

In some aspects, when process 2500 decodes the scheduling message, it indicates a maximum duration of the transmission opportunity.

In some aspects, process 2500 includes transmitting a clear-to-send message to a transmitter of the scheduling message. The clear-to-send message may be transmitted in response to the source device receiving the scheduling message. In these aspects, the clear-to-send message may be generated by process 2500 to indicate whether the source device will transmit data during the transmission opportunity. In some aspects, the clear-to-send message may be generated to indicate a duration of a transmission by the source device during the transmission opportunity.

In some aspects, process 2500 may further include receiving a second clear-to-send message. The second clear-to-send message may be decoded to indicate a maximum of the duration of the transmission of the source device and a duration of the first message, discussed below.

In block 2506, a first message is received during the transmission opportunity identified by the scheduling message. In block 2508, the source device data is output for transmission (i.e., transmitted) during the transmission opportunity at least partially concurrently with receiving the first message. Therefore, full duplex transmission occurs for at least a portion of the transmission of the source device data.

In some aspects, process 2500 further includes receiving an acknowledgement timing message. The acknowledgement timing message is decoded in process 2500 and indicates one or more time periods for acknowledging messages transmitted during the transmission opportunity. For example, the one or more time periods may indicate when the first message and/or the source device data should be acknowledged. In some aspects, process 2500 includes transmitting an acknowledgement of the first message during a time period indicated by the acknowledgment timing message. In some aspects, the acknowledgment timing message is the scheduling message. In some aspects, the acknowledgment timing message is a request-to-send message. In some aspects, the acknowledgement timing message is a clear-to-send message.

Figure 25B:
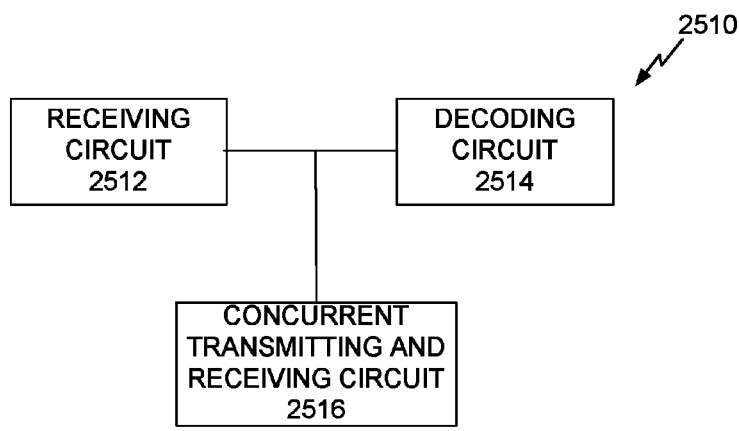
FIG. 25B is a functional block diagram of an exemplary wireless device that may be employed within one or more of the disclosed wireless communication systems.

FIG. 25B is a functional block diagram of an exemplary wireless device 2510 that may be employed within the wireless communication system 1500. The device 2510 comprises a receiving circuit 2512, a decoding circuit 2514, and a concurrent transmitting and receiving circuit 2516. The receiving circuit 2512 may be configured to perform one or more of the functions discussed above with respect to the block 2502 and/or block 2506. In some aspects, the receiving circuit 2512 may include the receiver 412. The device 2510 further comprises a decoding circuit 2514. The decoding circuit 2514 may be configured to perform one or more of the functions discussed above with respect to block 2504. In some aspects, the decoding circuit 2514 may include the processor 404. The device 2510 further comprises a concurrent transmitting and receiving circuit 2516. The concurrent transmitting and receiving circuit 2516 may be configured to perform one or more of the functions discussed above with respect to block 2508. In some aspects, the concurrent transmitting and receiving circuit 2516 may include the transmitter 410 and/or the receiver 412.

In some aspects, to reduce overhead, multiple data packets and acknowledgement packets may be sent back to back in both uplink and downlink directions (i.e., in both directions of a full duplex system) in a scheduled duration. For example, if two STAs 106A and 106B have symmetric traffic in both directions, i.e., both STAs are participating in a video chat or other mutually equivalent communication, or if one STA is acting as a continuous relay between two other STAs. In such an embodiment, the staggered acknowledgement packets discussed above may serve multiple purposes and may be used to communicate information regarding the next transmission packet duration. The packet duration of the subsequent data transmission may allow the STA to determine the duration of both transmitted data packets and allow it to calculate the next acknowledgement packet start time. Additionally, the acknowledgement packet may include the full duplex rate based on the SINR of the previously received data packet, thus using the previous rate to estimate or suggest a subsequent rate. Additionally, the acknowledgement packet may be used by one STA to terminate full duplex communications. For example, one STA or AP may terminate full duplex communications with another STA or AP if it has no more data to communicate, if it has high self-interference that is causing high PER or low SINR, or if the full duplex rate is less than the half duplex rate, which may be estimated via the acknowledgement frames.

In some aspects, when one or more channels are involved, interference may be prevented by assigning the same bandwidths between downlink connections and uplink connections for each STA 106. For example, each STA 106 should have the same bandwidth assigned for use with both downlink and uplink communications. Otherwise, interference may occur where STA 106A uses a first channel in downlink while STA 106B uses the first channel in uplink, thus causing interference with and jamming STA 106A's downlink. In some aspects, where bandwidths are unmatched in downlink and uplink assignments, the AP should schedule STAs that are far from each other.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some aspects, an interface may comprise a receiver configured to receive information or communications from a device at another device. The interface (e.g., of a processor or a bus) may receive information or data processed by a front end or another device or may process information received. In some aspects, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communication, comprising:
   determining a plurality of signal strength metrics based on a destination device to which a first message is to be transmitted;
   determining a source device based on the signal strength metrics;
   generating a scheduling message, the scheduling message indicating the source device is granted permission to transmit a second message during a first transmission opportunity identified by the scheduling message;
   outputting the scheduling message for transmission to the source device;

generating the first message for transmission to the destination device, wherein the generation comprises:
    determining a desired length of the first message so that a difference in a completion time of the transmission of the first message and a completion time of receiving the second message is below or equal to a threshold value, and
    padding the first message to have the desired length;
outputting the first message for transmission to the destination device; and
receiving at least a portion of the second message from the source device at least partially concurrently with the outputting of the first message for transmission to the destination device, the second message being different than the first message.

2. An apparatus for wireless communication, comprising:
a processing system configured to:
    determine a plurality of signal strength metrics based on a destination device to which a first message is to be transmitted,
    determine a source device based on the signal strength metrics,
    generate a first scheduling message, the first scheduling message indicating the source device is granted permission to transmit a second message during a first transmission opportunity identified by the first scheduling message,
    generate the first message for transmission to the destination device, wherein the generation comprises to:
        determine a desired length of the first message so that a difference in a completion time of the transmission of the first message and a completion time of receiving the second message is below or equal to a threshold value, and
        pad the first message to have the desired length, and
    receive at least a portion of the second message from the source device at least partially concurrently with outputting of the first message for transmission to the destination device, the second message being different than the first message; and
an interface for outputting the first scheduling message for transmission to the source device and the first message for transmission to the destination device.

3. The apparatus of claim 2, wherein the processing system is further configured to:
    determine the destination device to which the first message is output for transmission.

4. The apparatus of claim 2, wherein the processing system is configured to determine the source device based on the plurality of signal strength metrics by:
    identifying one or more of a plurality of devices with a signal strength below or equal to a first threshold value; and
    selecting the source device from the identified devices.

5. The apparatus of claim 3, wherein at least a portion of the second message comprises a preamble of the second message and wherein the processing system is further configured to:
    determine the source device from which the at least a portion of the second message was transmitted based on the preamble of the second message; and
    determine a plurality of signal strength metrics based on the source device.

6. The apparatus of claim 3, wherein the at least a portion of the second message comprises a preamble of the second message, and wherein the processing system is configured to determine the destination device based at least in part on the preamble.

7. The apparatus of claim 6, wherein the processing system is further configured to determine a duration of the second message based at least in part on the preamble of the second message and wherein the processing system pads a first length of the first message based on the determined duration of the second message when the processing system generates the first message for transmission to the destination device.

8. The apparatus of claim 2, wherein the processing system is further configured to:
    determine a first duration of the first message; and
    determine a second duration of the second message,
    wherein the interface is further configured to output for transmission an acknowledgement for the second message based at least in part on the determined first and second durations.

9. The apparatus of claim 2, wherein the processing system is further configured to generate the first scheduling message to indicate a duration of the first message.

10. The apparatus of claim 2, wherein the processing system is further configured to:
    receive a response message from the source device; and
    decode the response message to determine whether the source device will transmit the second message during the first transmission opportunity identified in the first scheduling message.

11. The apparatus of claim 10, wherein the processing system is further configured to decode the response message to determine a duration of the second message, wherein the processing system pads the first message such that outputting for transmission of the first message completes at a same time as reception of the second message based on the duration of the second message.

12. The apparatus of claim 10, wherein the processing system is further configured to decode the response message to determine a duration of the second message, wherein the processing system outputs the first message for transmission based on the duration of the second message.

13. The apparatus of claim 12, wherein the processing system is configured to pad the first message based at least in part on the duration of the second message from the source device.

14. The apparatus of claim 2, wherein the processing system is further configured to generate and output for transmission a control message based at least in part on the determination that the source device will transmit the second message during the first transmission opportunity.

15. The apparatus of claim 14, wherein the control message comprises a new duration of the first transmission opportunity and a transmission rate for each of the source device and the destination device, wherein the new duration is based at least in part on a duration of the first message and the duration of the second message.

16. The apparatus of claim 2, wherein the processing system is further configured to generate an acknowledgement timing message, the acknowledgement timing message indicating a time period to send an acknowledgement associated with the first message.

17. The apparatus of claim 2, wherein the processing system is configured to receive a second scheduling message and decode the second scheduling message to determine that the apparatus is granted permission to output the first message for transmission to the destination device during a transmission opportunity identified by the second scheduling message.

18. The apparatus of claim 17, wherein the processing system is further configured to decode the second scheduling message to determine a duration of the transmission opportunity for outputting the first message for transmission to the destination device.

19. The apparatus of claim 18, wherein the processing system is configured to pad the first message based at least in part on the determined duration of the transmission opportunity.

20. The apparatus of claim 18, wherein the processing system is further configured to receive a control message, determine a transmission rate indicated by the control message, and update the duration of the transmission opportunity identified by the second scheduling message with a new duration indicated in the control message.

21. The apparatus of claim 17, wherein the processing system is further configured to generate a response message to indicate the interface will output the first message for transmission to the destination device during the transmission opportunity and to indicate a duration of the first message, and wherein the interface is further configured to output the response message for transmission to a device that transmitted the second scheduling message.

22. The apparatus of claim 2, wherein the processing system is further configured to receive an acknowledgement timing message and decode the acknowledgement timing message to determine when to acknowledge the second message received from the source device.

23. The apparatus of claim 22, wherein the acknowledgment timing message comprises a second scheduling message indicating when to output the first message for transmission.

24. The apparatus of claim 2, wherein the processing system is configured to indicate a full duplex capability in a communication generated by the processing system, including a beacon, an association request, an association response, a probe request, or a probe response.

25. The apparatus of claim 2, wherein the interface for outputting is configured to output for transmission the first message concurrent with receiving the second message from the source device if the source device is capable of full duplex communication.

26. A non-transitory computer readable storage device encoded thereon with instructions that when executed cause an apparatus to perform a method of wireless communication, the method comprising:
    determining a plurality of signal strength metrics based on a destination device to which a first message is to be transmitted;
    determining a source device based on the signal strength metrics;
    generating a scheduling message, the scheduling message indicating the source device is granted permission to transmit a second message during a first transmission opportunity identified by the scheduling message;
    outputting the scheduling message for transmission to the source device;
    generating the first message for transmission to the destination device, wherein the generation comprises:
        determining a desired length of the first message so that a difference in a completion time of the transmission of the first message and a completion time of receiving the second message is below or equal to a threshold value, and
        padding the first message to have the desired length;
    outputting the first message for transmission to the destination device; and
    receiving at least a portion of the second message from the source device at least partially concurrently with the outputting of the first message for transmission to the destination device, the second message being different than the first message.

27. An apparatus for wireless communication, comprising:
    means for determining a plurality of signal strength metrics based on a destination device to which a first message is to be transmitted;
    means for determining a source device based on the signal strength metrics;
    means for generating a scheduling message, the scheduling message indicating the source device is granted permission to transmit a second message during a first transmission opportunity identified by the scheduling message;
    means for outputting the scheduling message for transmission to the source device;
    means for generating the first message for transmission to the destination device, wherein the means for generation comprises:
        means for determining a desired length of the first message so that a difference in a completion time of the transmission of the first message and a completion time of receiving the second message is below or equal to a threshold value, and
        means for padding the first message to have the desired length;
    means for outputting the first message for transmission to the destination device; and
    means for receiving at least a portion of the second message from the source device at least partially concurrently with the outputting of the first message for transmission to the destination device, the second message being different than the first message.

28. A wireless node, comprising:
    at least one antenna;
    a processing system configured to:
        determine a plurality of signal strength metrics based on a destination device to which a first message is to be transmitted,
        determine a source device based on the signal strength metrics,
        generate a scheduling message, the scheduling message indicating the source device is granted permission to transmit a second message during a first transmission opportunity identified by the scheduling message,
        generate the first message for transmission to the destination device, wherein the generation comprises to:
            determine a desired length of the first message so that a difference in a completion time of the transmission of the first message and a completion time of receiving the second message is below or equal to a threshold value, and
            pad the first message to have the desired length, and
        receive, via the at least one antenna, at least a portion of the second message from the source device at least partially concurrently with transmitting the first message to the destination device, the second message being different than the first message; and
    an interface for outputting the scheduling message for transmission to the source device and the first message for transmission to the destination device.

* * * * *